United States Patent
Fujimura et al.

(10) Patent No.: US 9,473,236 B2
(45) Date of Patent: Oct. 18, 2016

(54) RELAY APPARATUS, RELAY SATELLITE, AND SATELLITE COMMUNICATION SYSTEM

(71) Applicant: Mitsubishi Electric Corporation, Chiyoda-ku (JP)

(72) Inventors: Akinori Fujimura, Tokyo (JP); Tsuyoshi Sasaki, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/440,794

(22) PCT Filed: Jan. 10, 2014

(86) PCT No.: PCT/JP2014/050359
§ 371 (c)(1),
(2) Date: May 5, 2015

(87) PCT Pub. No.: WO2014/112442
PCT Pub. Date: Jul. 24, 2014

(65) Prior Publication Data
US 2015/0295636 A1    Oct. 15, 2015

(30) Foreign Application Priority Data
Jan. 15, 2013    (JP) .................... PCT/JP2013/050581

(51) Int. Cl.
*H04J 1/10* (2006.01)
*H04B 7/185* (2006.01)
*H04B 17/40* (2015.01)

(52) U.S. Cl.
CPC .......... *H04B 7/18515* (2013.01); *H04B 17/40* (2015.01)

(58) Field of Classification Search
None
See application file for complete search history.

(56) References Cited

U.S. PATENT DOCUMENTS

| | | | |
|---|---|---|---|
| 7,120,516 B2 | 10/2006 | Hagino et al. | |
| 7,542,716 B2 | 6/2009 | Bell et al. | |
| 8,064,920 B2 | 11/2011 | Bell et al. | |
| 2010/0220778 A1 | 9/2010 | Fuse et al. | |
| 2012/0002701 A1* | 1/2012 | Morris | H04B 1/707 375/130 |
| 2012/0002703 A1 | 1/2012 | Yamashita et al. | |
| 2014/0036765 A1 | 2/2014 | Fujimura et al. | |
| 2015/0244450 A1* | 8/2015 | Wajcer | H04B 7/15585 375/214 |

FOREIGN PATENT DOCUMENTS

| | | |
|---|---|---|
| EP | 2 224 611 A1 | 9/2010 |
| JP | 2004-73229 A | 3/2004 |
| JP | 2006-516867 A | 7/2006 |
| JP | 2009-290763 A | 12/2009 |
| JP | 2011-205449 A | 10/2011 |
| WO | 2010/113499 A1 | 10/2010 |
| WO | 2012/147753 A1 | 11/2012 |

OTHER PUBLICATIONS

International Search Report Issued Feb. 4, 2014 in PCT/JP14/050359 Filed Jan. 10, 2014.
U.S. Appl. No. 14/767,790, filed Aug. 13, 2015, Fujimura.
Extended Search Report mailed Aug. 4, 2016 in European Patent Application No. 14740628.4.

* cited by examiner

*Primary Examiner* — Minh-Trang Nguyen
(74) *Attorney, Agent, or Firm* — Oblon, McClelland, Maier & Neustadt, L.L.P

(57) ABSTRACT

A reply apparatus includes: a reception analog switch matrix that outputs, to reception processing units, a wideband reception signal in a band wider than the bandwidth processable by the reception processing unit; a connecting unit that outputs demultiplexed signals to transmission processing units; a transmission analog switch matrix that outputs, to the same transmission antennas, signals subjected to transmission processing; a local generating unit that generates and transmits local signals having different frequencies to the reception processing units; a local-phase-difference calculating unit that calculates a phase difference between the local signals and inputs the phase difference to the reception processing units; and reception-phase correcting units that perform phase correction on the basis of the phase difference. The reception processing units, when the wideband reception signal is input, apply reception processing to divided signals obtained by extracting a part of bands of input signals on the basis of the local signals.

18 Claims, 28 Drawing Sheets

RELAY APPARATUS, RELAY SATELLITE, AND SATELLITE COMMUNICATION SYSTEM

FIELD

The present invention relates to a relay apparatus, a relay satellite, and a satellite communication system.

BACKGROUND

In a relay satellite mounted with a digital channelizer that relays data from a plurality of beams to a plurality of beams, relaying data in wideband signals from each of the beams can be performed by increasing sampling speeds of the AD (Analog to Digital) converter (A/D), the DA (Digital to Analog) converter (D/A), and the digital-signal processing unit. A technology concerning such a relay satellite provided with a digital channelizer is disclosed in Patent Literature 1 described below.

CITATION LIST

Patent Literature

Patent Literature 1: Japanese Translation of International Patent Application No. 2006-516867

SUMMARY

Technical Problem

With the conventional technology, when a wideband signal is processed, high-speed sampling at, for example, 1.4 Gsps is needed. Therefore, there is a problem in that the power consumption of a satellite increases along with increases in the sampling speeds of the A/D and the D/A converters and in the processing speed of the digital-signal processing unit, which includes a demultiplexing unit, a multiplexing unit, and a switch unit.

Devices used in space having high radiation resistance are generally operated with lower sampling speeds and processing speeds compared with those of a consumer device operated on the ground. Therefore, there is a problem in that it is difficult to make a relay satellite capable of using a wider band communication because the performance of the device used in space is limited.

There is a further problem in the conventional technology. Because one wideband signal is processed in a set of processing units (the A/D converter, the D/A converter, and the digital demultiplexer/multiplexer), the communication thereof is disabled if at least one of the A/D converter, the D/A converter, and the digital demultiplexer/multiplexer in the set is down or an input signal is saturated by an unexpected interference wave that is input or the like.

The present invention has been made in view of the above and it is an objective of the present invention to obtain a relay apparatus, a relay satellite, and a satellite communication system that can relay a wideband signal even if the performance of a device is limited and that can reduce deterioration in communication quality due to a failure or interference.

Solution to Problem

In order to solve the problem and achieve the objective, the present invention relates to a relay apparatus that includes: a plurality of reception processing units; a plurality of transmission processing units; a connecting unit that outputs signals processed by the reception processing units to the transmission processing units; a local generating unit that generates two or more local signals having different frequencies and supplies the local signals to the reception processing units, respectively; and a local-phase calculating unit that calculates a phase difference between the local signals and inputs the phase difference to the reception processing unit. The reception processing units include a reception-side-phase correcting unit that performs phase correction on the basis of the phase difference, the transmission processing units subject the signals from the connecting unit to transmission processing, and when a wideband reception signal with a band that is wider than a processable bandwidth is input, one or more of the reception processing units process the reception signal.

Advantageous Effects of Invention

The relay satellite, the relay apparatus, and the satellite communication system according to the present invention has an effect in that it is possible to relay a wideband signal even when the performance of the device is limited and to reduce deterioration in communication quality due to a failure or interference.

DESCRIPTION OF EMBODIMENTS

Embodiments of a relay apparatus, a relay satellite, and a satellite communication system according to the present invention are described in detail below with reference to the drawings. Note that the present invention is not limited to these embodiments.

First Embodiment

Figure 1:
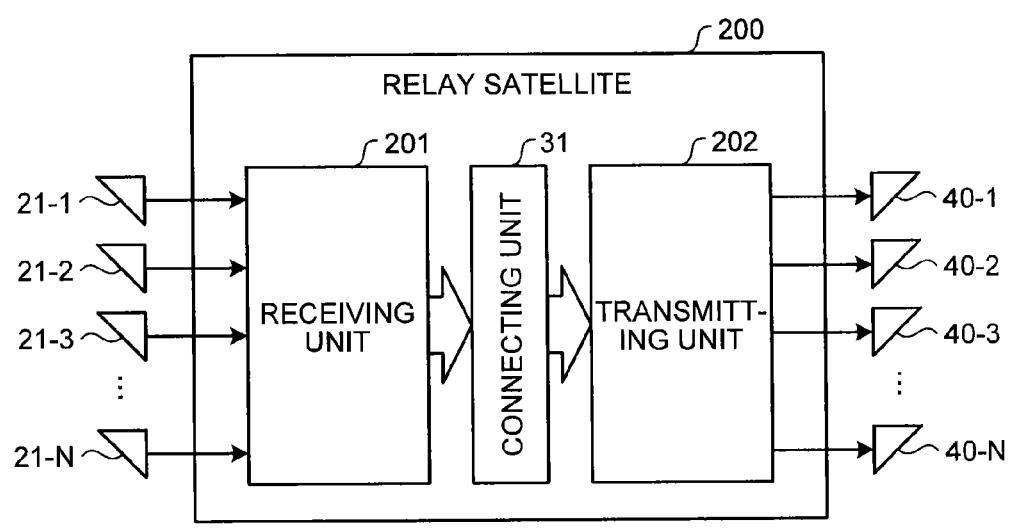
FIG. 1 is a diagram illustrating a configuration example of a relay satellite in a first embodiment.

FIG. 1 is a diagram illustrating a configuration example of a first embodiment of the relay satellite according to the present invention. As illustrated in FIG. 1, a relay satellite 200 in the embodiment includes reception antennas 21-1 to 21-N(N is an integer equal to or larger than 2), a receiving unit 201, a connecting unit 31, a transmitting unit 202, and transmission antennas 40-1 to 40-N. In FIG. 1, the configuration of a relay apparatus provided in the relay satellite in the entire configuration of the relay satellite is illustrated. In the embodiment, the number of reception antennas and the number of transmission antennas are set the same. However, the number of reception antennas and the number of transmission antennas can be different.

The relay satellite in the embodiment carries out signal processing described below for signals received by the reception antennas 21-1 to 21-N and relays the signals by transmitting the signals from the transmission antennas 40-1 to 40-N.

In the embodiment, a relay satellite and a satellite communication system capable of relaying a wideband signal while using a device having a low sampling speed and processing speed are described.

Figure 2:
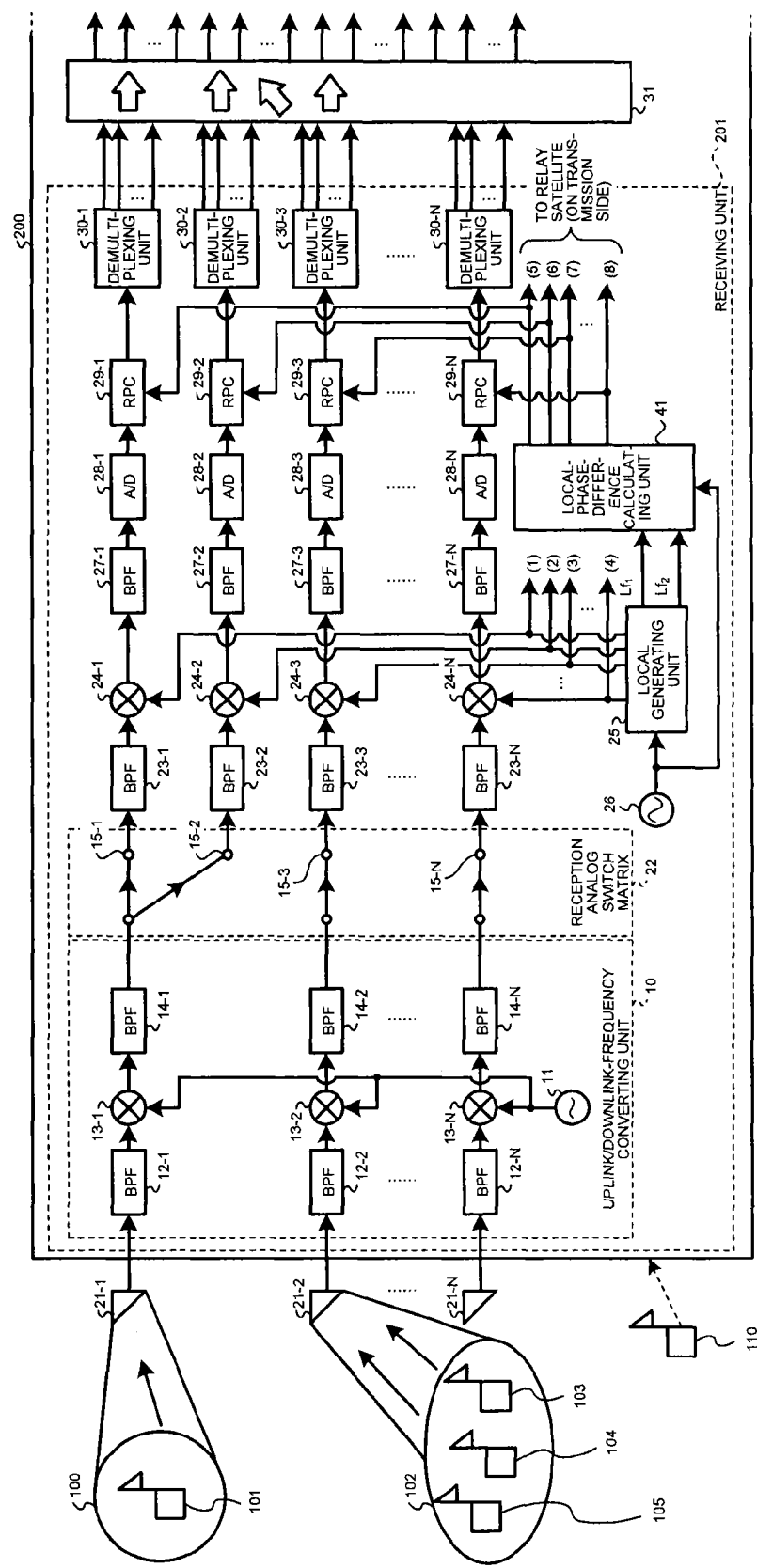
FIG. 2 is a diagram illustrating a configuration example of a receiving unit in the relay satellite illustrated in FIG. 1.

FIG. 2 is a diagram illustrating a configuration example of the receiving unit in the relay satellite 200 illustrated in FIG. 1. For convenience of description, in FIG. 2, the connecting unit 31, transmitting stations 101, 103, 104, and 105, which are transmission source apparatuses for relay target signals, and a control station 110, which is a ground station that transmits a command signal to the relay satellite, are also illustrated. The reception antennas 21-1 to 21-N receive signals from beam areas of reception beams. In FIG. 2, an example is illustrated in which two beam areas, i.e., a wideband beam area 100 and a narrowband beam area 102, are set. In the wideband beam area 100, a transmitting station 101 that transmits a wideband signal is provided. In the narrowband beam area 102, transmitting stations 103, 104, and 105 that transmit narrowband signals are provided. Note that, in the embodiment, the wideband signal indicates a signal having bandwidth exceeding a bandwidth processable by an AD converter, a demultiplexing unit, a multiplexing unit, and a DA converter as described below.

As illustrated in FIG. 2, the receiving unit 201 of the relay satellite 200 includes an uplink/downlink-frequency converting unit 10; a reception analog switch matrix (a first switch unit) 22; band-pass filters (BPFs) 23-1 to 23-N; mixers 24-1 to 24-N; a local generating unit 25; an original oscillator 26; band-pass filters 27-1 to 27-N; AD converters (A/Ds) 28-1 to 28-N; reception-phase correcting units (RPCs) 29-1 to 29-N; demultiplexing units 30-1 to 30-N; and a connecting unit (a digital switch matrix) 31.

The uplink/downlink-frequency converting unit 10 includes band-pass filters (BPFs) 12-1 to 12-N on an input side; mixers 13-1 to 13-N; a local oscillator 11; and band-pass filters (BPFs) 14-1 to 14-N on an output side.

Figure 3:
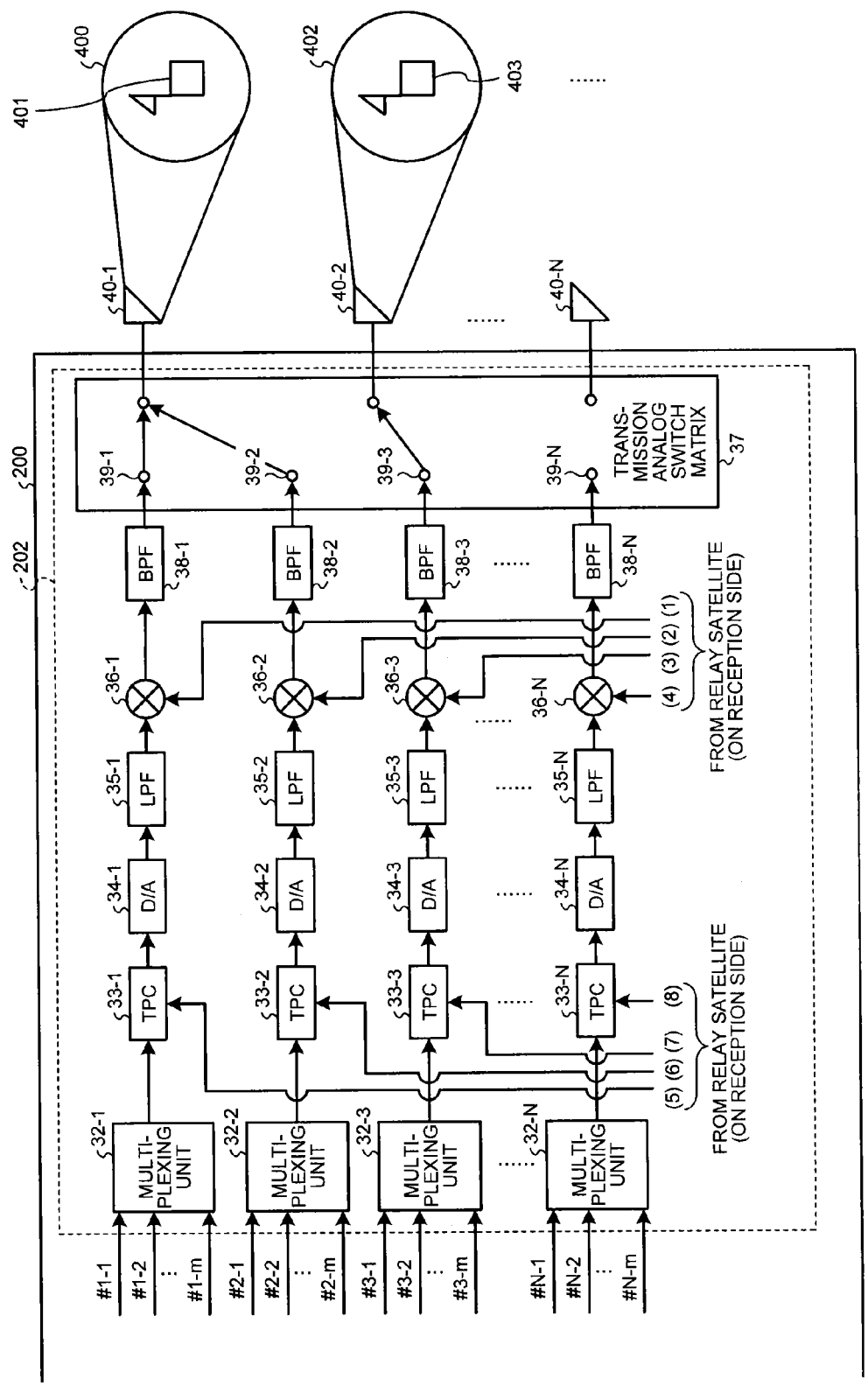
FIG. 3 is a diagram illustrating a configuration example of a transmitting unit in the relay satellite illustrated in FIG. 1.

FIG. 3 is a diagram illustrating a configuration example of the transmitting unit in the relay satellite illustrated in FIG. 1. For convenience of description, in FIG. 3, beam areas 400 and 402 and receiving stations 401 and 403, which are receiving apparatuses for relay target signals, are also illustrated. In FIG. 3, an example is illustrated in which the receiving station 401 is provided in the beam area 400 and the receiving station 403 is provided in the beam area 402.

As illustrated in FIG. 3, the transmitting unit 202 of the relay satellite 200 includes multiplexing units 32-1 to 32-N; transmission-phase correcting units 33-1 to 33-N; DA converters (D/As) 34-1 to 34-N; low-pass filters 35-1 to 35-N; mixers 36-1 to 36-N; a transmission analog switch matrix (a second switch unit) 37; and band-pass filters 38-1 to 38-N.

Note that, in FIGS. 2 and 3, an example is illustrated in which the relay satellite relays four uplink signals transmitted from transmitting stations in the two beam areas (the wideband beam area 100 and the narrowband beam area 102) to the two beam areas (the beam areas 400 and 402). However, the number of beams and the number of uplink signals to be relayed are not limited to the example illustrated in FIGS. 2 and 3.

The connecting unit 31 is, for example, a digital switch matrix. The connecting unit 31 receives inputs of signals that are output from the demultiplexing units 30-1 to 30-N, and it distributes the input signals to the multiplexing units 32-1 to 32-N as a later stage.

Figure 4:
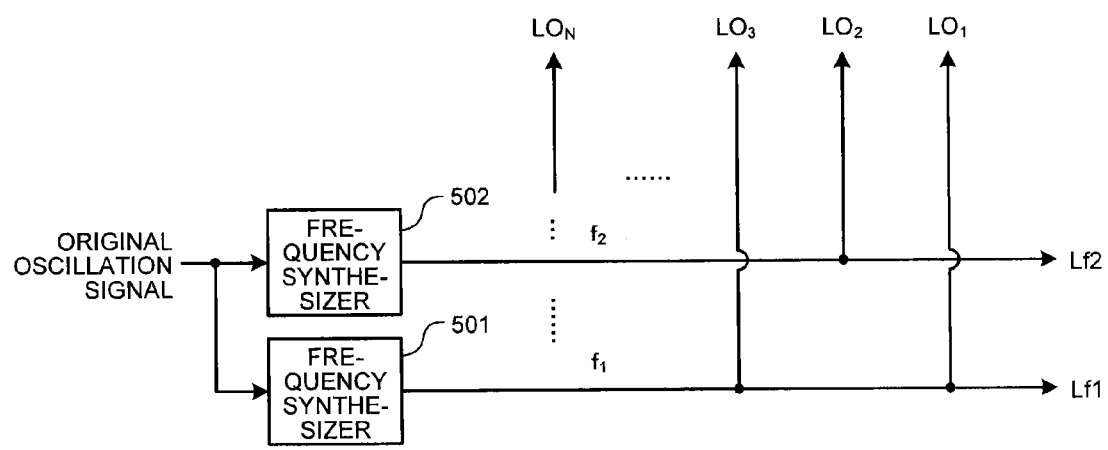
FIG. 4 is a diagram illustrating a configuration example of a local generating unit.

FIG. 4 is a diagram illustrating a configuration example of the local generating unit 25 included in the receiving unit 201 of the relay satellite 200 in the embodiment. As illustrated in FIG. 4, the local generating unit 25 in the embodiment includes frequency synthesizers 501 and 502.

Figure 5:
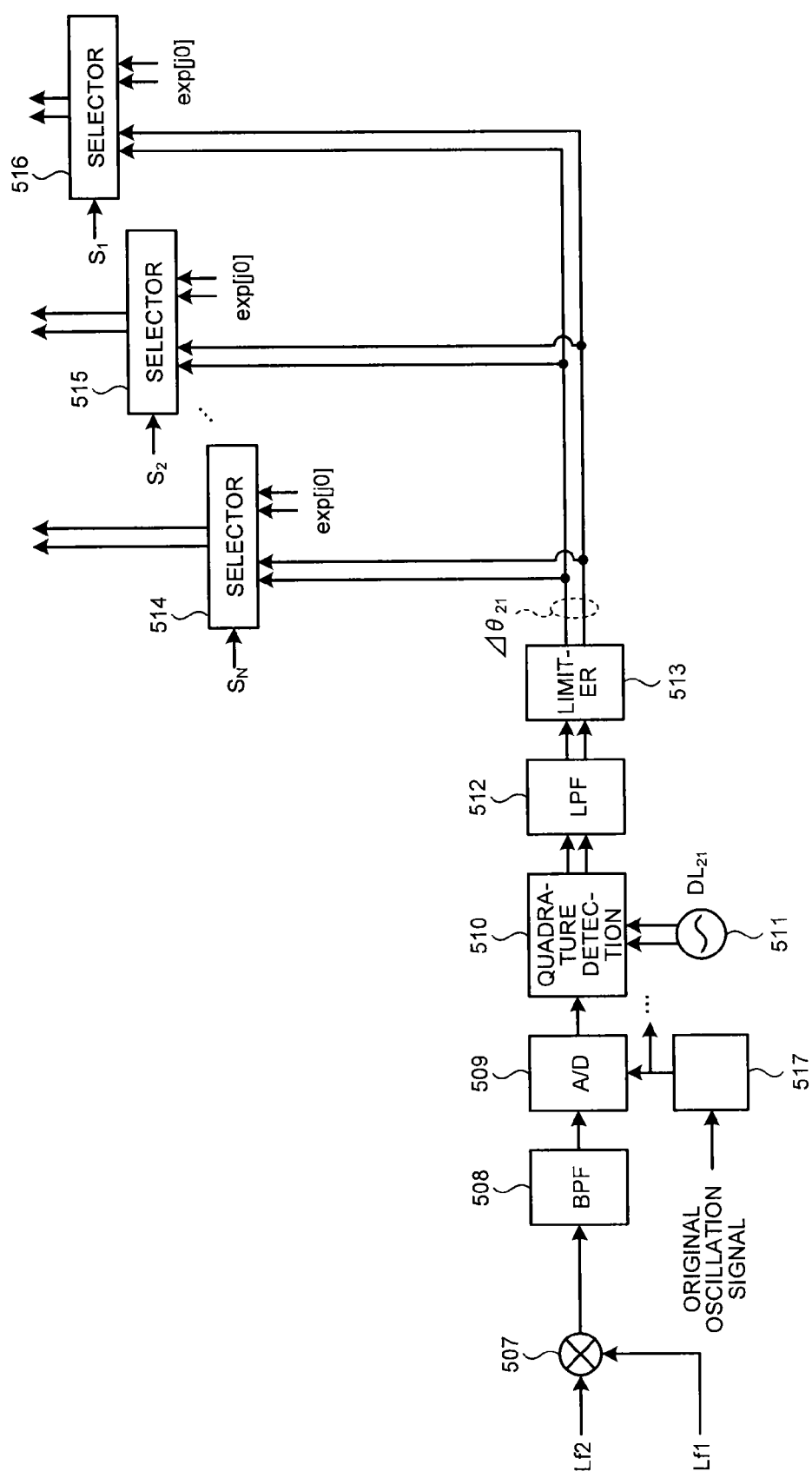
FIG. 5 is a diagram illustrating a configuration example of a local-phase-difference calculating unit.

FIG. 5 is a diagram illustrating a configuration example of a local-phase-difference calculating unit 41. As illustrated in FIG. 5, the local-phase-difference calculating unit 41 in the embodiment includes a mixer 507; a band-pass filter 508; an AD converter (A/D) 509; a quadrature detection unit 510; a (digital) local generating unit 511; a (digital) low-pass filter 512; a limiter 513; selectors 514, 515, and 516; and a clock generator 517.

Figure 6:
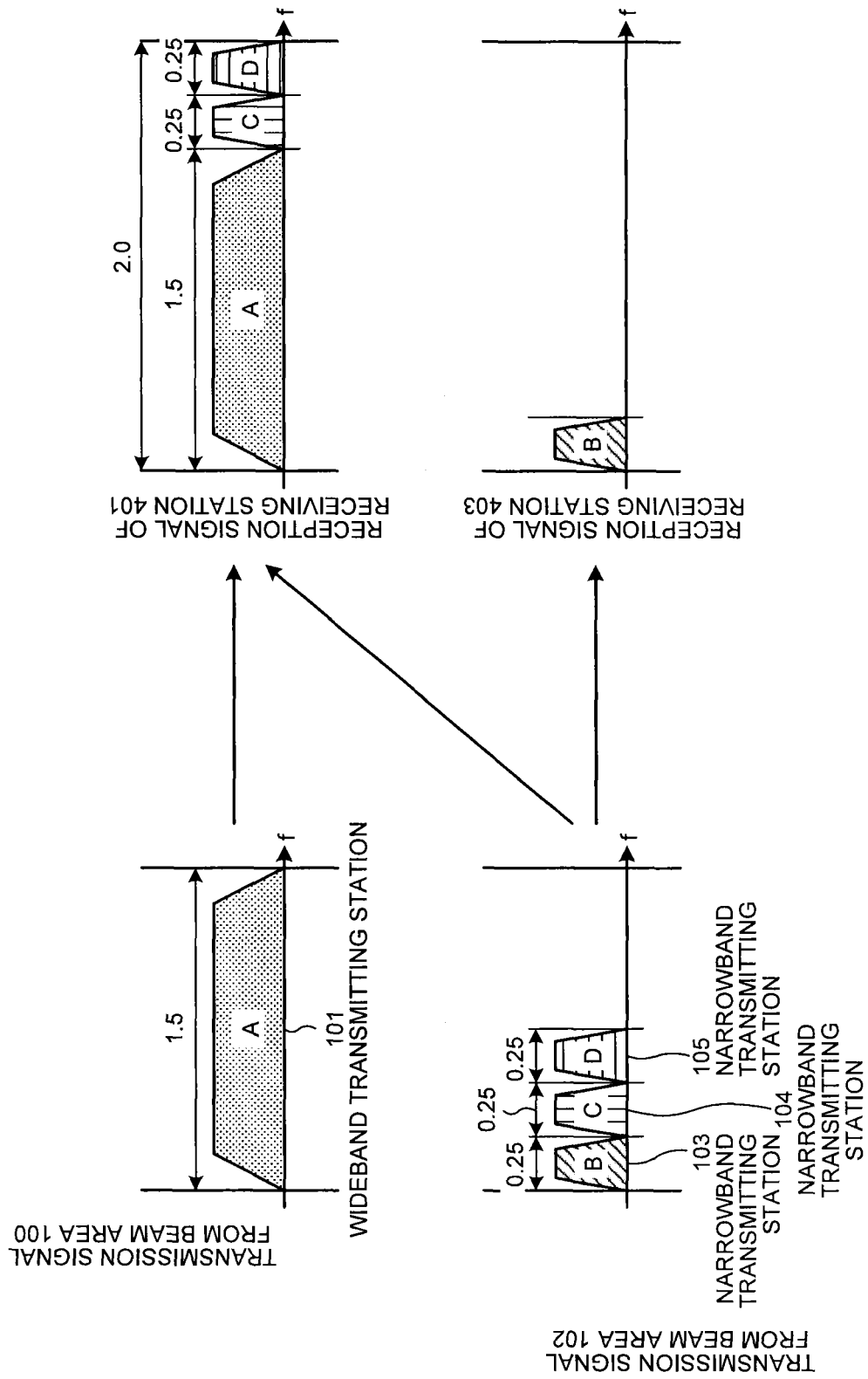
FIG. 6 is a diagram illustrating an overview of a signal relay operation by the relay satellite in the first embodiment.

Here, the signal relay processing, processed by the relay satellite in the embodiment, is specifically described. FIG. 6 is a diagram illustrating an overview of a signal relay operation by the relay satellite in the embodiment.

In the following description in the embodiment, the relay satellite 200 simultaneously relays signals A, B, C, and D, which are received from the transmitting stations 101, 103, 104, and 105, respectively, to relay destinations described below in a frequency arrangement illustrated in FIG. 6.

<1> +A signal A, which is a wideband signal, from the transmitting station 101 provided in the wideband beam area 100 is transmitted to the receiving station 401 provided in the beam area 400.

<2> A signal B, which is a narrowband signal, from the transmitting station 103 in the narrowband beam area 102 is transmitted to the receiving station 403 in the beam area 402.

<3> A signal C, which is a narrowband signal, from the transmitting station 104 in the narrowband beam area 102 is transmitted to the receiving station 401 in the beam area 400.

<4> A signal D, which is a narrowband signal, from the transmitting station 105 in the narrowband beam area 102 is transmitted to the receiving station 401 in the beam area 400.

As illustrated in FIG. 6, an uplink frequency of the signals B, C, and D is the same frequency as the left half of the signal A.

An upper limit of signal bandwidth that is processable by a set of an AD converter, a demultiplexing unit, a multiplexing unit, and a DA converter in the relay satellite 200 is set to 1. As illustrated in FIG. 6, it is assumed that the bandwidth of the signal A is 1.5, the bandwidths of the signals B, C, and D is 0.25 when compared with this set upper limit of signal bandwidth. Because the bandwidth of the signal A is larger than 1, in the conventional technology, the signal A cannot be digitally demultiplexed, multiplexed, and switched. However, in the embodiment, as described in detail below, it is possible to relay the signals (A, B, C, and D) including a wideband signal having a bandwidth larger than 1 while preventing deterioration of communication quality.

Figure 7:
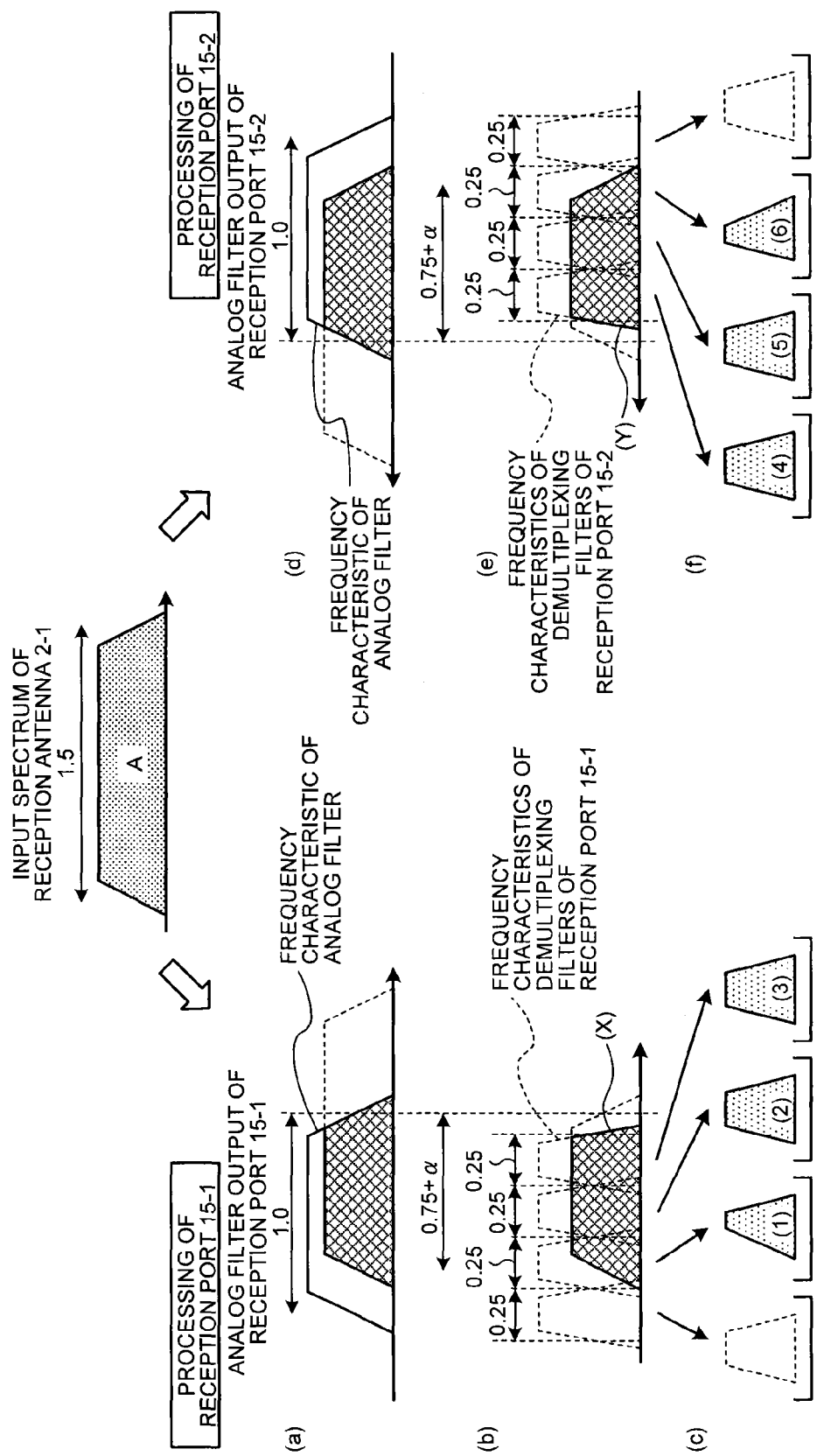
FIG. 7 is a diagram illustrating an example of a signal relay operation procedure by the satellite in the first embodiment.

Reception processing of the relay satellite 200 is described below with reference to FIGS. 2 and 7. FIG. 7 is a diagram illustrating an example of a signal relay operation procedure by the relay satellite in the embodiment. Note that, in the following description, the value of a specific frequency bandwidth written in the sentences below is a value normalized by setting the upper limit of the signal bandwidth that is processable by the AD converter, the demultiplexing unit, the multiplexing unit, and the DA converter to 1.

As illustrated in FIG. 2, the signal A, which is a wideband signal, is received by the reception antenna 21-1 and input to the input band-pass filter 12-1 in the uplink/downlink-frequency converting unit 10.

The signals B, C, and D, which are narrowband signals, are received by the reception antenna 21-2 and are input to the input band-pass filter 12-2 of the uplink/downlink-frequency converting unit 10.

In general, in a satellite communication system, an uplink radio frequency and a downlink radio frequency are different. The uplink/downlink-frequency converting unit 10 carries out frequency conversion from the uplink radio frequency to the downlink radio frequency.

Specifically, in the uplink/downlink-frequency converting unit 10, first, the input band-pass filter 12-1 extracts the signal A without missing a signal band of the signal A but does remove signals of adjacent communication systems.

Subsequently, when a radio frequency of an uplink signal is represented as fr and a radio frequency of a downlink signal is represented as ft, the mixer 13-1 multiplies the signal A that has passed through the input band-pass filter 12-1 with a local signal that has a frequency (fr−ft), which is output from the local oscillator 11. The band-pass filter 14-1 removes a component of an unnecessary wave 2fr−ft out of two frequency components ft and 2fr−ft generated by the multiplication in the mixer 13-1. According to the series of the processing, the radio frequency of the wideband signal A is converted from an uplink frequency into a downlink frequency.

Similarly, in the uplink/downlink-frequency converting unit 10, the frequencies of the narrowband signals {B, C, and D} are converted from the radio frequency fr of the uplink signal into the radio frequency ft of the downlink signal by the input band-pass filter 12-2, the mixer 13-2, and the output band-pass filter 14-2.

Subsequently, the signal A and the signals B, C, and D are input to the reception analog switch matrix 22. The reception analog switch matrix 22 is controlled according to a command signal from the control station 110 on the ground. The command signal is transmitted from the control station 110 to the relay satellite 200 through a separate line.

The reception analog switch matrix 22 simultaneously inputs, according to the command signal from the control station 110, the signal A from the band-pass filter 14-1 to a reception port 15-1 (the BPF 23-1) and a reception port 15-2 (the BPF 23-2).

The signal A input to the reception port 15-1 passes through the BPF 23-1, the mixer 24-1, and the BPF 27-1 to thereby be frequency-converted from a radio frequency band into an intermediate frequency band or a baseband. Here as illustrated in FIG. 7($a$), nearly a half band higher than the center frequency of the signal A is removed by analog filters (pass-band width 1.0) in the BPF 23-1 and BPF 27-1. The bandwidth is reduced from 1.5 to 0.75+α. A local signal $LO_1$ (frequency: $f_1$) from the local generating unit 25 is separately supplied to the mixer 24-1.

Similarly, the signal A input to the reception port 15-2 passes through the BPF 23-2, the mixer 24-2, and the BPF 27-2 at a later stage thereby to be frequency-converted from the radio frequency band into the intermediate frequency and or the baseband. A local signal $LO_2$ (frequency: $f_2$) is supplied from the local generating unit 25 to the mixer 24-2. Here as illustrated in FIG. 7($d$), nearly a half band lower than the center frequency of the signal A is removed by an analog filter (pass-band width 1.0) in the BPF 27-2. The bandwidth is reduced from 1.5 to 0.75+α.

Note that, when the radio frequency input to the reception port 15-1 is converted into the baseband frequency, not into the intermediate frequency, the analog BPFs 27-1 to 27-N are changed to analog low-pass filters of two systems of I and Q.

According to the analog filter processing described above, the signal bandwidths respectively input to the AD converters 28-1 and 28-2 at a later stage change becomes equal to or lower than 1 (=0.75+α). Therefore, operation can be realized at a processing speed equal to or lower than the upper limit of the processing speed of the digital devices (the AD converter, the DA converter, and the digital circuit). Note that, in the example described above, the bandwidth of the signal A is processed in two halves. However, the bandwidth does not have to be processed in two halves. The signal A can be processed at any ratio (e.g., 0.9+α:0.6+α) as long as the signal bandwidths that are input to the AD converters 28-1 and 28-2 at the later stage are equal to or lower than 1 (equal to or lower than the upper limit of the processing speed). The signal A is output to the two reception ports. However, when the signal bandwidths are equal to or larger than 2, the signal A can be output to, for example, three or more reception ports.

A frequency interval ($f_1$-$f_2$) between the local signal $LO_1$ (the frequency $f_1$) input to the mixer 24-1 and the local signal $LO_2$ (the frequency $f_2$) input to the mixer 24-2 is set to 1. That is, the frequency interval between the local signals $LO_1$ and $LO_2$ can be set to a value the same as the upper limit value 1 of the signal bandwidth that is processable by a set including the AD converter, the demultiplexer, the multiplexer, and the DA converter. Consequently, the relay satellite 200 can realize relay processing of a wideband signal having maximum bandwidth of 2 by inputting reception signals to both of the reception ports 15-1 and 15-2 illustrated in FIG. 2.

When the relay processing of the wideband signal having the maximum bandwidth of 2 is realized, the local generating unit 25 has a function of supplying any one of the two kinds of local signals ($f_1$ and $f_2$) to the mixers 24-1 to 24-N. Similarly, when relay processing of a wideband signal having maximum bandwidth of 3 is realized, the local generating unit 25 has a function of supplying any one of three kinds of local signals $f_2$, and $f_3$), a frequency interval among which is 1, to the mixers 24-1 to 24-N. The local signals generated from the local generating unit 25 are generated with reference to the original oscillator 26 so that the frequency relation among the local signals is stable and a frequency shift does not occur.

As described above, in the embodiment, the relay satellite 200 includes reception processing units (BPFs 23-$i$, mixers 24-$i$, BPFs 27-$i$, AD converters 28-$i$, and demultiplexing units 30-$i$) each connected to reception ports 15-$i$ ($i$=1, 2, ..., and N) and includes transmission processing units (multiplexing units 32-$i$, DA converters 34-$i$, LPFs 35-$i$, mixers 36-$i$, and BPFs 38-$i$) each connected to transmission ports 39-$i$ ($i$=1, 2, ..., and N). The same reception signal is input to a plurality of the reception processing units. The reception processing units, to which the same reception signal is input, each extract the input reception signal in different bands to thereby generate divided signals having different bands, and they carry out AD conversion and demultiplexing processing on the divided signals. The digital switch matrix 31 switches demultiplexed signals and inputs the demultiplexed signals to the transmission processing units. The transmission analog switch matrix 37 inputs signals output from two or more transmission processing units, to which the demultiplexed signal corresponding to the same reception signal is input, to the transmission antennas 40-1 to 40-N that form the same transmission beam. Therefore, it is possible to realize relay processing of a wideband signal having a maximum bandwidth greater than 1.

Although not illustrated in FIG. 2, clocks that are input to digital units (components that perform digital signal processing) in the relay satellite are also generated by the original oscillator 26. Therefore, given that a local frequency interval (a difference between frequencies of a plurality of local signals generated by the local generating unit 25), for example, is represented as $f_c$=$f_1$-$f_2$, the local frequency interval $f_c$ and $f_c$ generated inside the digital units are frequency-synchronized. The configuration and the like of the local generating unit 25 are described below.

When a signal input to the AD converter 28-1 is an intermediate frequency (IF) signal, the AD converter 28-1 samples the IF signal. When the signal input to the AD converter 28-1 is a baseband signal, the AD converter 28-1 samples the baseband signal as two types: in-phase (I) and quadrature (Q).

Subsequently, a signal illustrated in FIG. 7(a) sampled by the AD converter 28-1 is phase-corrected by the reception-phase correcting unit (RPC) 29-1. A correction signal for the phase correction is input from the local-phase-difference calculating unit 41 described below. The operations of the phase correction are also described below.

When a signal input to the reception-phase correcting unit 29-1 is the intermediate frequency (IF) signal, the RPC 29-1 performs the phase correction while converting, with digital quadrature detection, the intermediate frequency into the baseband frequency. The conversion processing is described using expressions that are described later.

An output signal of the BPF 27-1 illustrated in FIG. 7(a), after having been sampled by the AD converter 28-1 and applied with the phase correction by the reception-phase correcting unit 29-1, is decomposed into four signals including an out-of-band signal by the demultiplexing unit 30-1.

Note that, in the embodiment, for convenience of description, the number of demultiplexed waves is four. However, the number of demultiplexed waves is not limited to this and can be any value as long as the value is an integer equal to or larger than 2.

Characteristics of the respective four filters used in the demultiplexing unit 30-1 are indicated by the dotted lines illustrated in FIG. 7(b). Due to the filtering by the four filters of the demultiplexing unit 30-1, the demultiplexing unit 30-1 deletes a from the bandwidth 0.75+α illustrated in FIG. 7(a), and it decomposes a signal (X) having bandwidth of 0.75 illustrated in FIG. 7(b) into three signals (1), (2), and (3) each having a bandwidth of 0.25 as illustrated in FIG. 7(c). Note that, as illustrated in FIG. 7(c), the demultiplexing unit 30-1 demultiplexes the signals that include the out-of-band signal.

Similarly, a signal (bandwidth 0.75+α), which is illustrated in FIG. 7(d) and is sampled by the AD converter 28-2, is applied with the phase correction by the reception-phase correcting unit 29-2. Thereafter, the signal illustrated in FIG. 7(d) is decomposed into four signals including an out-of-band signal, as illustrated in FIG. 7(f), by the demultiplexing unit 30-2 on the basis of the four filter characteristics indicated by the dotted lines in FIG. 7(e). That is, the demultiplexing unit 30-2 deletes a from the signal having the bandwidth of 0.75+α illustrated in FIG. 7(d), and it decomposes a signal (Y) having the bandwidth of 0.75 illustrated in FIG. 7(e) into three signals (4), (5), and (6) having the bandwidth of 0.25 as illustrated in FIG. 7(f).

Figure 8:
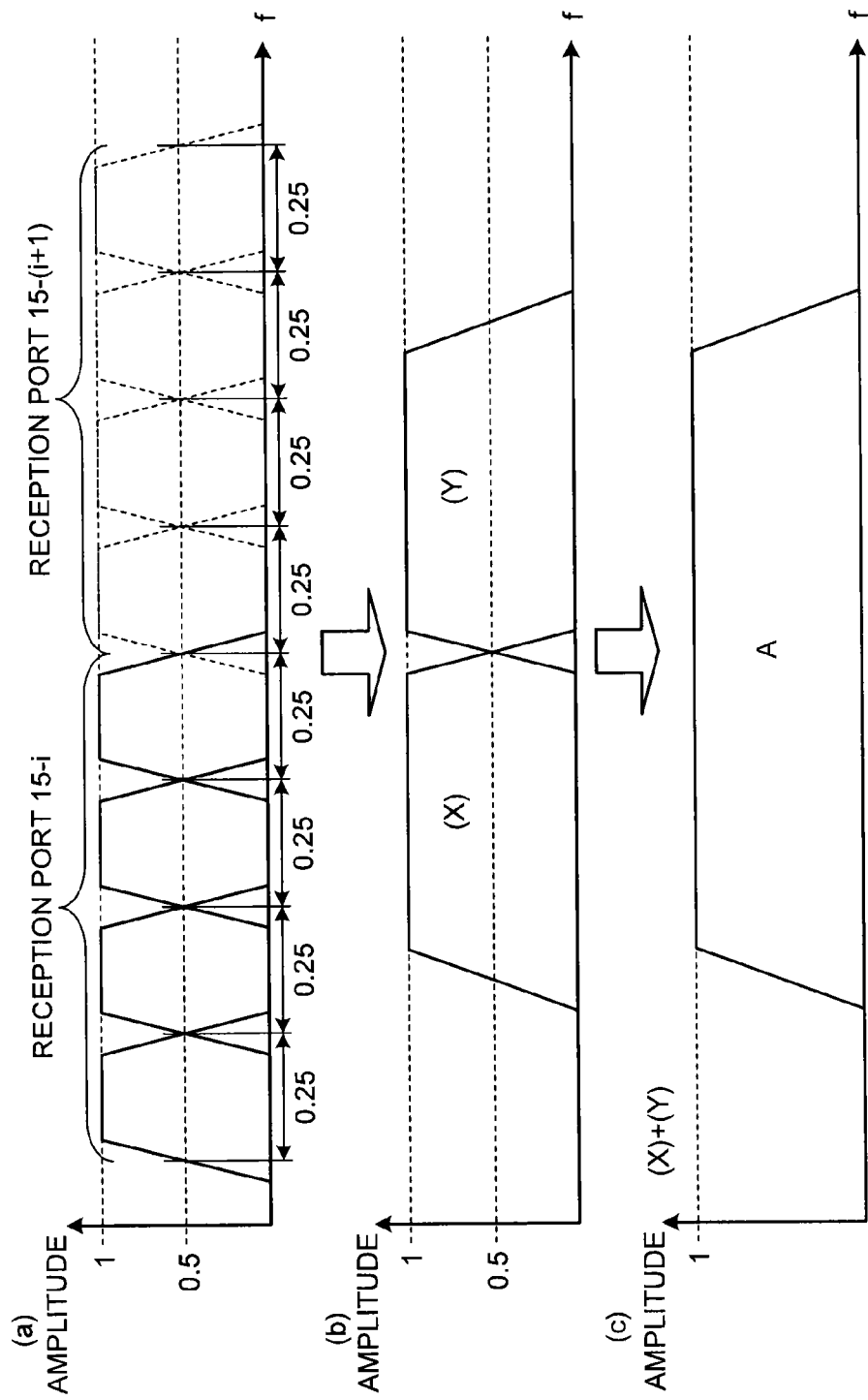
FIG. 8 is a diagram illustrating an example of the relation among spectra of signals processed by demultiplexing units.

FIG. 8 is a diagram illustrating an example of a relation among spectra of signals processed by demultiplexing units. Here, a relation among frequency-to-amplitude characteristics of demultiplexing units corresponding to different reception ports is described with reference to FIG. 8. In FIG. 8, two reception ports, from which one signal (the signal A in the example illustrated in FIG. 6) is output, are represented as reception ports 15-$i$ and 15-($i$+1). In FIG. 8(a), four frequency-to-amplitude characteristics indicated by solid lines indicate characteristics of four filters included in the demultiplexing unit 30-$i$ corresponding to the reception port 15-$i$. Four frequency-to-amplitude characteristics indicated by dotted lines are characteristics of four filters included in a demultiplexing unit 30-(i+1) corresponding to the reception port 15-(i+1).

As illustrated in FIG. 8(a), the characteristics of the filters used in the demultiplexing units are designed to overlap with each adjacent filter, including the overlapping characteristics of reception port 15-i and the reception port 15-(i+1). Amplitude at crossings of the characteristics of the filters is set to 0.5. A sum of the frequency-to-amplitude characteristics of the filters is set to 1.

Further, if frequency-to-phase characteristics of filters illustrated in FIG. 8(a) are designed to be linear without being discontinuous, even if the signal A is once decomposed into, for example, six signals (1), (2), (3), (4), (5), and (6) (see FIGS. 7(c) and 7(f)), a signal (X) and a signal (Y) are restored by multiplexing processing by the multiplexing units 32-1 to 32-N at the later stage (FIG. 8(b)). Further, the original signal A is restored by signal multiplexing processing in the transmission analog switch matrix 37 (FIG. 8(c)).

Because the demultiplexing units 30-1 to 30-N are configured by digital circuits, it is possible to set the frequency-to-phase characteristics of the filters illustrated in FIG. 8(a) to be linear at the reception ports (the reception port 15-i and the reception port 15-(i+1)). However, in general, the reception local signals are not synchronized in phases, and the phases of the local signals dynamically fluctuate due to the influence of phase noise and the like. Therefore, it is difficult to set the frequency-to-phase characteristics of the filters to be linear between the filters including the reception port 15-i and the reception port 15-(i+1) that are adjacent. In the embodiment, this local phase fluctuation is reduced by digital processing inside the relay satellite. Details of the reduction of the local phase fluctuation are described below.

A description is given here of the relay satellite 200 that processes narrow band signals (the signals B, C, and D), which are uplink signals, from the narrowband beam area 102. The uplink/downlink-frequency converting unit 10 converts the frequency of the signals B, C, and D input from the reception antenna 21-2 into a downlink frequency.

Figure 9:
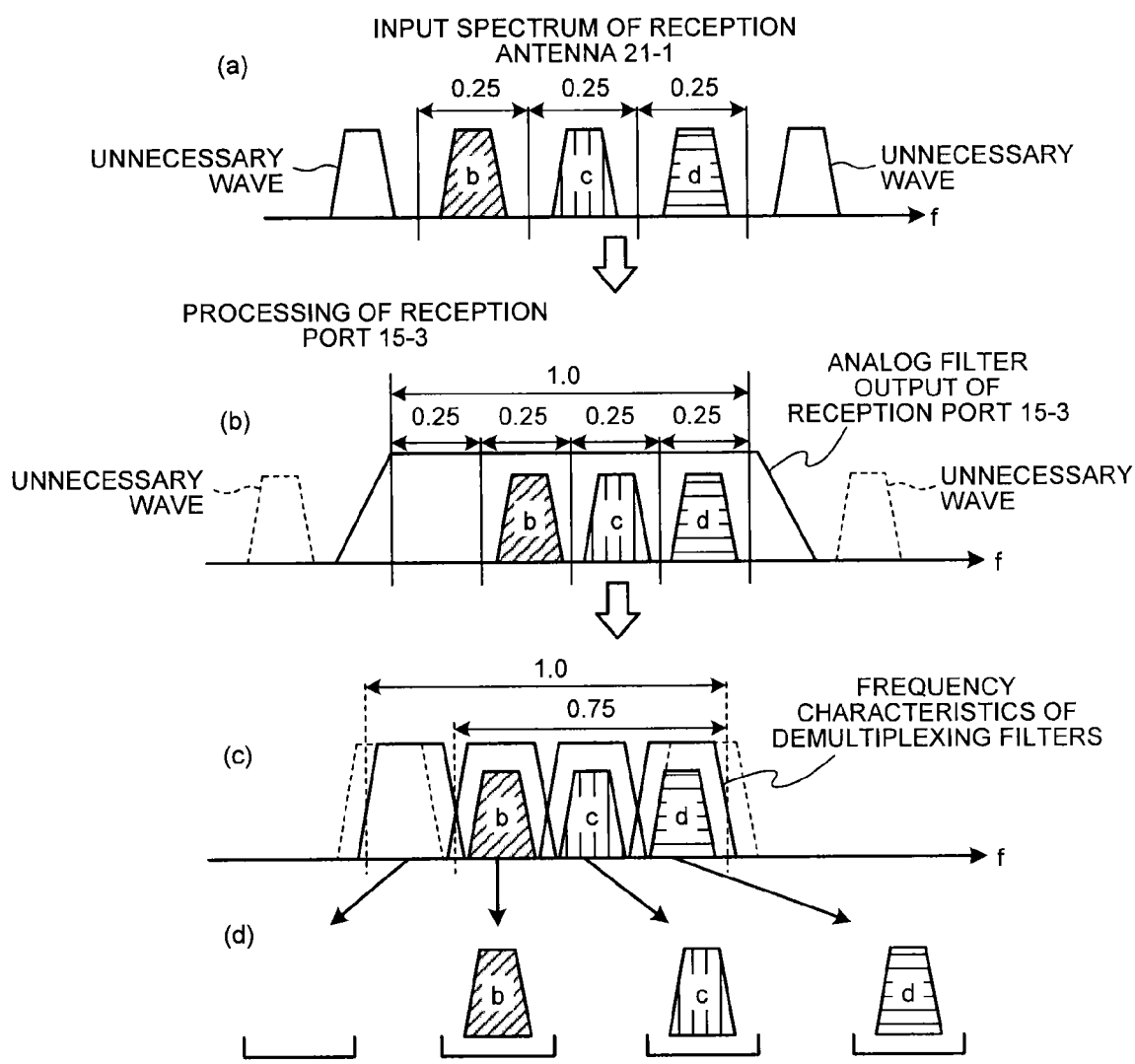
FIG. 9 is a diagram illustrating an example of signals received by a reception port.

Subsequently, the reception analog switch matrix 22 inputs the signals B, C, and D to the BPF 23-3 corresponding to the reception port 15-3 according to a command signal from the control station 110. FIG. 9 is a diagram illustrating an example of signals received by the reception port 15-3.

The signals B, C, and D input to the BPF 23-3 are frequency-converted from the radio frequency band to the intermediate frequency band or the baseband via the mixer 24-3 and the BPF 27-3. Here, analog filters in the BPFs 23-3 and 27-3 extract the signals B, C, and D and, and, when an unnecessary wave is present in an adjacent frequency band, remove the unnecessary wave (see FIGS. 9(a) and 9(b)). A local signal $LO_3$ (frequency: $f_1$) from the local generating unit 25 is separately supplied to the mixer 24-3.

The signals B, C, and D illustrated in FIG. 9(b) sampled by the AD converter 28-3 are not shared as a part of these signal components by the other reception ports and are independent. Therefore, the reception-phase correcting unit 29-3 does not need to apply the phase correction to the signals B, C, and D. The demultiplexing unit 30-3 directly decomposes the signals B, C, and D into four signals including an out-of-band signal, as illustrated in FIG. 9(d), according to the four filter characteristics indicated by dotted lines in FIG. 9(c). In this way, the demultiplexing unit 30-3 decomposes (demultiplexes) the signals B, C, and D illustrated in FIG. 9(c) into three signals B, C, and D.

Figure 10:
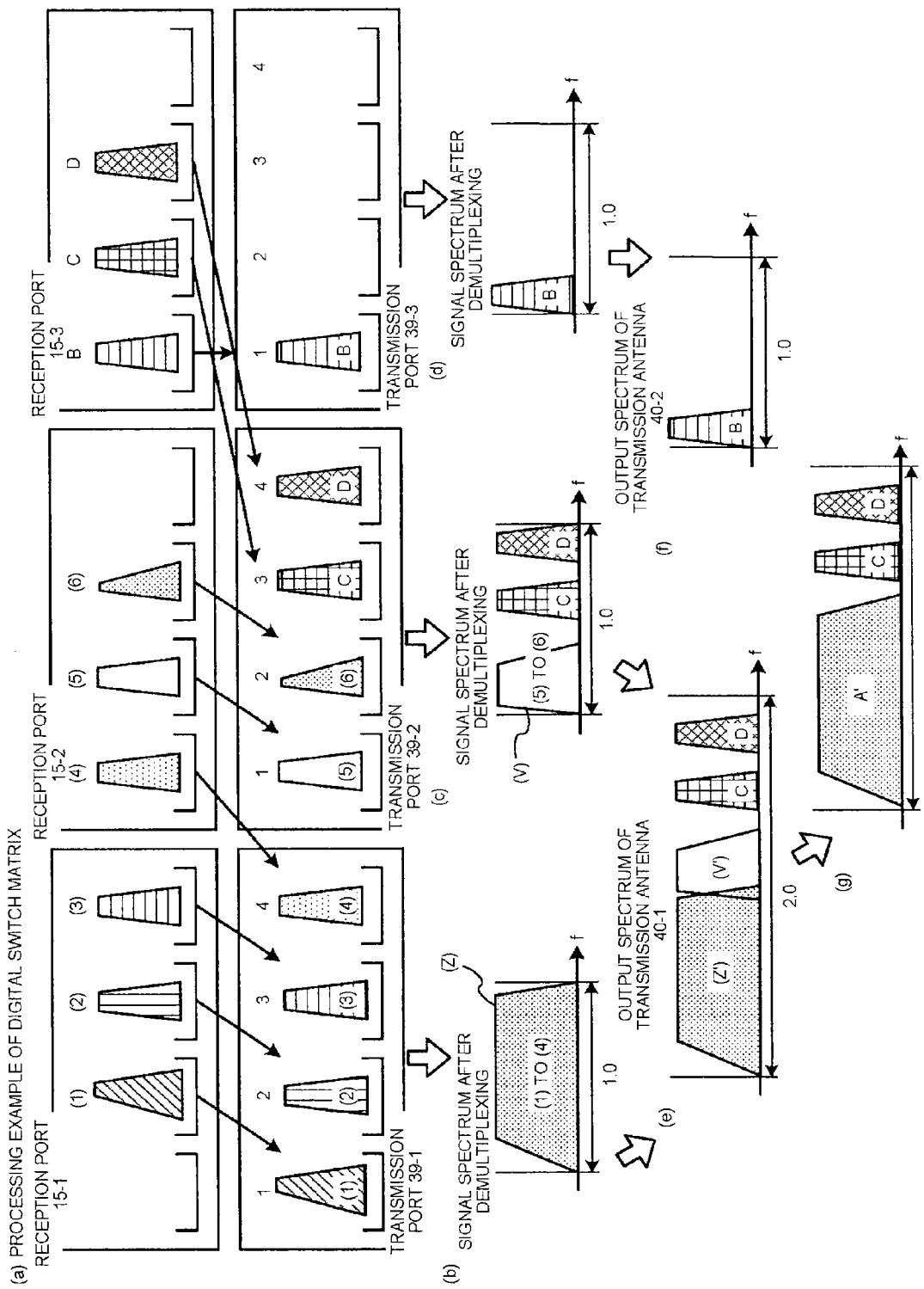
FIG. 10 is a diagram illustrating an example of a signal relay operation (on a transmission side).

Here, an operation example of the relay satellite 200 in transmitting signals is described with reference to FIG. 3 and FIG. 10. FIG. 10 is a diagram illustrating an example of a signal relay operation (on the transmission side).

The digital switch matrix 31 receives inputs of signals that are output from the demultiplexing units at a pre-stage, and it distributes the input signals to the multiplexing units 32-1 to 32-N at a posterior stage. In the embodiment, the digital switch matrix 31 receives inputs of the signals (1), (2), and (3) output from the demultiplexing unit 30-1; the signals (4), (5), and (6) output from the demultiplexing unit 30-2; and the signals B, C, and D output from the demultiplexing unit 30-3.

The digital switch matrix 31 then performs switch processing illustrated in FIG. 10(a).

In the example illustrated in FIG. 10, specifically, the signal (1) is output to a terminal #1-1, that is, a first terminal among first to m-th (m is an integer equal to or larger than 1) m terminals corresponding to a transmission port 39-1. The signal (2) is output to a terminal #1-2 (a second terminal corresponding to the transmission port 39-1). The signal (3) is output to a terminal #1-3 (a third terminal corresponding to the transmission port 39-1). The signal (4) is output to a terminal #1-4 (a fourth terminal corresponding to the transmission port 39-1). The signal (5) is output to the terminal #2-1 (a first terminal corresponding to a transmission port 39-2). The signal (6) is output to a terminal #2-2 (a second terminal corresponding to the transmission port 39-2). The signal B is output to a terminal #3-1 (a first terminal corresponding to a transmission port 39-3). The signal C is output to a terminal #2-3 (a third terminal corresponding to the transmission port 39-2). The signal D is output to a terminal #2-4 (a fourth terminal corresponding to the transmission port 39-2). These switch connections are controlled by a command signal from the control station 110 on the ground. Note that, in the example illustrated in FIG. 10, the m is 4, i.e., a case is described where four terminals (the first terminal to the fourth terminal) are associated with one transmission port. However, the m is not limited to 4.

Each of the multiplexing units (the multiplexing units 32-1 to 32-N) arranges four input signals at a frequency interval of 0.25 and combines the input signals. The multiplexing units are designed, as are the demultiplexing units 30-1 to 30-N, to have linear frequency-to-phase characteristics of signals after multiplexing.

In the example illustrated in FIG. 10, the multiplexing unit 32-1 multiplexes the signals (1), (2), (3), and (4) input from the digital switch matrix 31 and generates a signal (Z) illustrated in FIG. 10(b). The multiplexing unit 32-2 multiplexes the signals (5), (6), C, and D and generates signals (V), C, and D in frequency arrangement illustrated in FIG. 10(c). The multiplexing unit 32-3 generates the signal B in the frequency arrangement illustrated in FIG. 10(d) by processing the multiplexing of the signal B and signals in three idle channels.

The signal (Z) after the multiplexing is converted into the radio frequency band by the transmission-phase correcting unit (TPC) 33-1, the DA converter 34-1, the LPF 35-1, the mixer 36-1, and the BPF 38-1. The signals (V), C, and D after the multiplexing are similarly converted into the radio frequency band by the transmission-phase correcting unit 33-2, the DA converter 34-2, the LPF 35-2, the mixer 36-2, and the BPF 38-2. The signal B after the multiplexing is converted into the radio frequency band by the transmission-phase correcting unit 33-3, the DA converter 34-3, the LPF 35-3, the mixer 36-3, and the BPF 38-3.

Note that, for convenience of description of the embodiment, the number of multiplexed waves is four in the example described above. However, the number of multiplexed waves is not limited to this and can be any value as long as the value is an integer equal to or larger than 2.

Outputs of the DA converters 34-1 to 34-N only have to be signals in the intermediate frequency band or the baseband. In the case of the baseband, each of the DA converters 34-1 to 34-N and each of the LPFs 35-1 to 35-N are configured as two sets of (I, Q).

A correction signal input to the transmission-phase correcting unit 33-1 is the same as the correction signal input to the reception-phase correcting unit 29-1 and is input from the local-phase-difference calculating unit 41 described below.

Similarly, a correction signal input to the transmission-phase correcting unit 33-2 is the same as the correction signal input to the reception-phase correcting unit 29-2. A correction signal input to the transmission-phase correcting unit 33-N is the same as the correction signal input to the reception-phase correcting unit 29-N. Both the correction signals are input from the local-phase-difference calculating unit 41 described below. Note that the correction signals are complex numbers and the transmission-phase correcting units address the correction signals as complex conjugates. The details are described below using expressions.

The conversion of the transmission signals into the radio frequency band is realized by sending transmission local signals generated by the local generating unit 25 to the mixers 36-1 to 36-N.

In the embodiment, the local signal $LO_1$ (the frequency $f_1$), which is the same as the local signal supplied to the mixer 24-1 on the reception side, is supplied to the mixer 36-1. The local signal $LO_2$ (the frequency $f_2$), which is the same as the local signal supplies to the mixer 24-2 on the reception side is supplied to the mixer 36-2. The local signal $LO_3$ (the frequency $f_1$), which is the same as the local signal supplied to the mixer 24-3 on the reception side, is supplied to the mixer 36-3.

<Advantages of Local Signal Commonization>

After the uplink radio frequency fr is converted into the downlink radio frequency ft in advance as described above, a local signal for converting the radio frequency ft into an intermediate frequency $f_{IF}$ (or a baseband frequency) and a local signal for converting the intermediate frequency $f_{IF}$ (or the baseband frequency) into the radio frequency ft are commonized (set as the same). Consequently, it is possible to realize not only inter-port phase synchronization on the reception side but also inter-port phase synchronization on the transmission side with one local generating unit 25 and one local-phase-difference calculating unit 41.

When the local signal cannot be made common because of a structural problem or the like, although the circuit size slightly increases, the same advantages are obtained by separately providing the local generating unit 25 and the local-phase-difference calculating unit 41 used on the reception side and the local generating unit 25 and the local-phase-difference calculating unit 41 used on the transmission side.

Note that, in the embodiment, the uplink/downlink-frequency converting unit 10, which converts the uplink radio frequency fr into the downlink radio frequency ft, is provided between the reception antennas 21-1 to 21-N and the reception analog switch matrix 22. However, the uplink/downlink-frequency converting unit 10 does not always need to be located at this position, but can be provided at the transmitting unit, i.e., between the transmission analog switch matrix 37 and the transmission antennas 40-1 to 40-N illustrated in FIG. 3. In this case, a local signal for converting the uplink radio frequency fr into the intermediate frequency $f_{IF}$ (or a baseband frequency) and a local signal for converting the intermediate frequency $f_{IF}$ (or the baseband frequency) into the radio frequency fr are made common, and a series of processes is performed. Thereafter, the uplink radio frequency fr is to be converted into the downlink radio frequency ft.

In general, a transmission signal possesses large electric power due to amplification and the like. Therefore, in some case, a component of the transmission signal bleeds into the reception side and interferes with a reception signal. However, by providing the uplink/downlink-frequency converting unit 10 between the transmission analog switch matrix 37 and the transmission antennas 40-1 to 40-N illustrated in FIG. 3, it is possible to shift the frequency ft of the large power signal bleeding into the reception side and the frequency (=fr) input to the reception analog switch matrix 22. Therefore, it is possible to reduce the influence of interference due to the bleeding.

The connection of the transmission analog switch matrix 37 is controlled by a command signal from the control station 110 on the ground. In the example illustrated in FIG. 10, the signal (Z) from the transmission port 39-1 (the BPF 38-1) and the signals (V), C, and D from the transmission port 39-2 (the BPF 38-2) are simultaneously output to the antenna 40-1. In a signal spectrum output from the antenna 40-1, the signal (Z') and the signal (V') partially overlap, as illustrated in FIG. 10(e). A combined signal A' obtained by combining the signal (Z) and the signal (V) has a signal spectrum shape that is the same as the original signal A from the transmitting station 101 as illustrated in FIG. 10(g). This is because of the frequency interval of the transmission local signals being 1 and because of the characteristics of the demultiplexing filters illustrated in FIG. 7. The combined signal A' is transmitted to the receiving station 401 in the beam area 400.

The transmission analog switch matrix 37 outputs the signal B (FIG. 10(f)), which is converted into the radio frequency band and is output from the transmission port 39-3 (the BPF 38-3), to a transmission antenna 40-2 and transmits the signal B to the receiving station 403 in the beam area 402.

After receiving the signals A', C, and D, the receiving station 401 on the ground demodulates the signals A', C, and D. After receiving the signal B, the receiving station 403 on the ground demodulates the signal B.

Note that the receiving station 401 receives a wideband signal configured by the signals A', C, and D having a total bandwidth of 2. In general, the operating speed of a consumer digital device used on the ground is higher than the operating speed of a digital device used in space by several-fold. Therefore, the receiving station 401 does not have a problem of having a performance upper limit of the digital device and can demodulate the signals A', C, and D.

<Advantages of the Analog Switch Matrix>

In the embodiment, the beam area that requires wide bandwidth exceeding 1 is described as the beam area 100 in the uplink and as the beam area 400 in the downlink. However, even when the beam area that requires wide bandwidth exceeding 1 changes from the beam area 100 to the beam area 102 in the uplink, the relay satellite of the present embodiment can easily cope with the change simply by changing the connection of the reception analog switch matrix. That is, by controlling the connection of an output of the BPF 14-1 such that it is to only the reception port 15-1 and the connection of an output of the BPF 14-2 such that it is to both of the reception port 15-2 and the reception port 15-3, it is possible to process signals from the beam area 100 of which the bandwidth is within 1 and signals from the beam area 102 of which the bandwidth exceeds 1.

Similarly, when the beam area requiring wide bandwidth exceeding 1 changes from the beam area 400 to the beam area 402 in the downlink, the relay satellite can easily cope with the change simply by changing connection of the transmission analog switch matrix. That is, by controlling the connecting an output of the BPF 38-1 (the transmission port 39-1) such that it is only to the transmission antenna 40-1 and connecting both of an output of the BPF 38-2 (the transmission port 39-2) and an output of the BPF 38-3 (the transmission port 39-3) to the transmission antenna 40-2, it is possible to realize signal transmissions to the beam area 400 with the bandwidth within 1 and signal transmissions to the beam area 402 with the bandwidth exceeding 1.

By adopting such a configuration, when, for example, although a wideband signal relay service is not necessary for all of the beam areas, when a beam area that sometimes requires the wideband signal relay service due to traffic fluctuations changes on the time lapse, there is an advantage that a circuit size can be reduced therein. For example, when a wideband signal relay could occur in any one of two beam areas, in a configuration in which analog switch matrix is not provided, a maximum of two ports are provided in one beam area in preparation for occurrence of wideband signal relay in beams. Therefore, four ports are necessary in total. On the other hand, in a configuration in which an analog switch matrix is provided, the port #1 is shared by two beams as described in the embodiment so that it is adequate to function by providing three ports. Note that, when the wideband signal relay service is realized by always using two ports for any beam, such configurations in which the transmission analog switch matrix and the reception analog switch matrix are used are unnecessary. A configuration in which two ports are permanently allocated per each beam is adequate to address such a case.

In the following description, the operations of the local-phase-difference calculating unit 41, the reception-phase correcting units (RPCs) 29-1 to 29-N, and the transmission-phase correcting units 33-1 to 33-N are described, which are feature of the embodiment.

Figure 11:
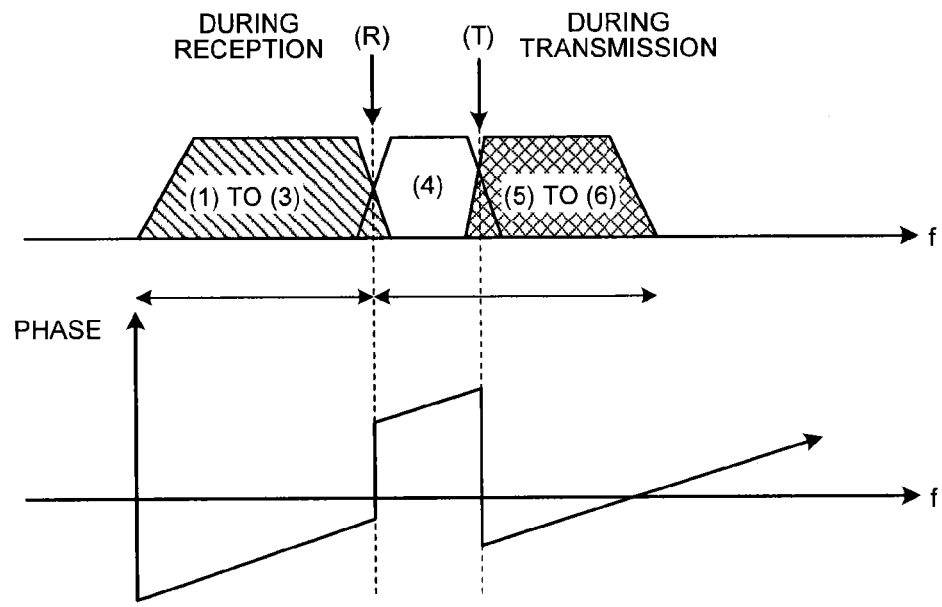
FIG. 11 is a diagram illustrating an example of a wideband signal transmitted from the relay satellite to a receiving station.

First, a problem is described in a case where a correction is not performed by the reception-phase correcting units 29-1 to 29-N and the transmission-phase correcting units 33-1 to 33-N. FIG. 11 is a diagram illustrating an example of a wideband signal transmitted from the relay satellite to the receiving station. When correction is not performed by the reception-phase correcting units 29-1 to 29-N and the transmission-phase correcting units 33-1 to 33-N, the frequency-to-phase characteristic of the combined signal A' output from the transmission antenna 40-1 has discontinuity in two places {(R), (T)}, indicated by the down arrows illustrated in FIG. 11. The down arrow (R) illustrated in FIG. 11 indicates a position of discontinuity that occurs between the reception port 15-$i$ and the port 15-($i$+1) (in the example illustrated in FIG. 10, the reception port 15-1 and the reception port 15-2). Similarly, the down arrow (T) illustrated in FIG. 11 indicates a position of discontinuity that occurs between the transmission side port 15-$i$ and the port 15-($i$+1) (in the example illustrated in FIG. 10, the transmission port 39-1 and the transmission port 39-2).

Even when phase discontinuity occurs within the band of the combined signal A', in the embodiment, due to the control by the local-phase-difference calculating unit 41, the reception-phase correcting units 29-1 to 29-N, and the transmission-phase correcting units 33-1 to 33-N, a reception sensitivity characteristic can be realized that is equivalent to a reception sensitivity characteristic in receiving the original signal A without deterioration of communication quality.

The phase discontinuity illustrated in FIG. 11 is caused mainly by a local phase difference that occurs when a frequency is down-converted or up-converted by different local signals (the frequencies $f_1$ and $f_2$). Accordingly, in the embodiment, a local phase difference continuously changing, which is a dominant factor of the phase discontinuity, is detected and corrected by digital processing so as to cancel a local phase difference between ports by digital processing and to synchronize local phases with one local signal.

First, in the local generating unit 25, the frequency synthesizer 501 generates a local signal Lf1 having the frequency $f_1$ on the basis of an original oscillation signal output from the original oscillator 26. Similarly, the frequency synthesizer 502 generates a local signal Lf2 having the frequency $f_2$. A frequency difference ($f_2-f_1$) between both the local signals Lf1 and Lf2 is "1", as described above.

The local signal Lf1 is referred to as $LO_1$ and is supplied to the mixer 24-1 on the reception side and the mixer 36-1 on the transmission side. The local signal Lf1 is referred to as $LO_3$ and is supplied to the mixer 24-3 on the reception side and the mixer 36-3 on the transmission side. That is, $LO_1$ and $LO_3$ are the same as the local signal Lf1 having the frequency f1. The local signal Lf2 is referred to as $LO_2$ and is supplied to the mixer 24-2 on the reception side and the mixer 36-2 on the transmission side.

Similarly, the local generating unit 25 supplies any one of the local signal Lf1 and the local signal Lf2 to the mixer 24-N on the reception side and the mixer 36-N on the transmission side.

That is, when the reception port 15-N and the transmission port 39-N process a higher frequency band, the local generating unit 25 supplies the local signal Lf2 having the frequency f2 to the mixer 24-N on the reception side and the mixer 36-N on the transmission side. When the reception port 15-N and the transmission port 39-N process a lower frequency band, the local generating unit 25 supplies the local signal Lf1 having the frequency $f_1$ to the mixer 24-N on the reception side and the mixer 36-N on the transmission side.

Note that, in FIG. 4, connection performed when frequencies treated by the ports are fixed is illustrated. However, a configuration for outputting any frequencies rather than the fixed frequencies can be adopted. For example, a configuration is adopted in which sectors are additionally provided in the respective $LO_1$, $LO_2$, $LO_3$, ..., in FIG. 4. Thus, the sectors can select any one of the output (Lf1) of the frequency synthesizer 501 and the output (Lf2) of the frequency synthesizer 502. Consequently, it is possible to select any one of the frequency $f_1$ and the frequency $f_2$ for each of the ports. An instruction signal for switching the frequencies $f_1$ and $f_2$ is performed according to a command signal transmitted from the control station 110 to the relay satellite 200 through a separate line.

Figure 12:
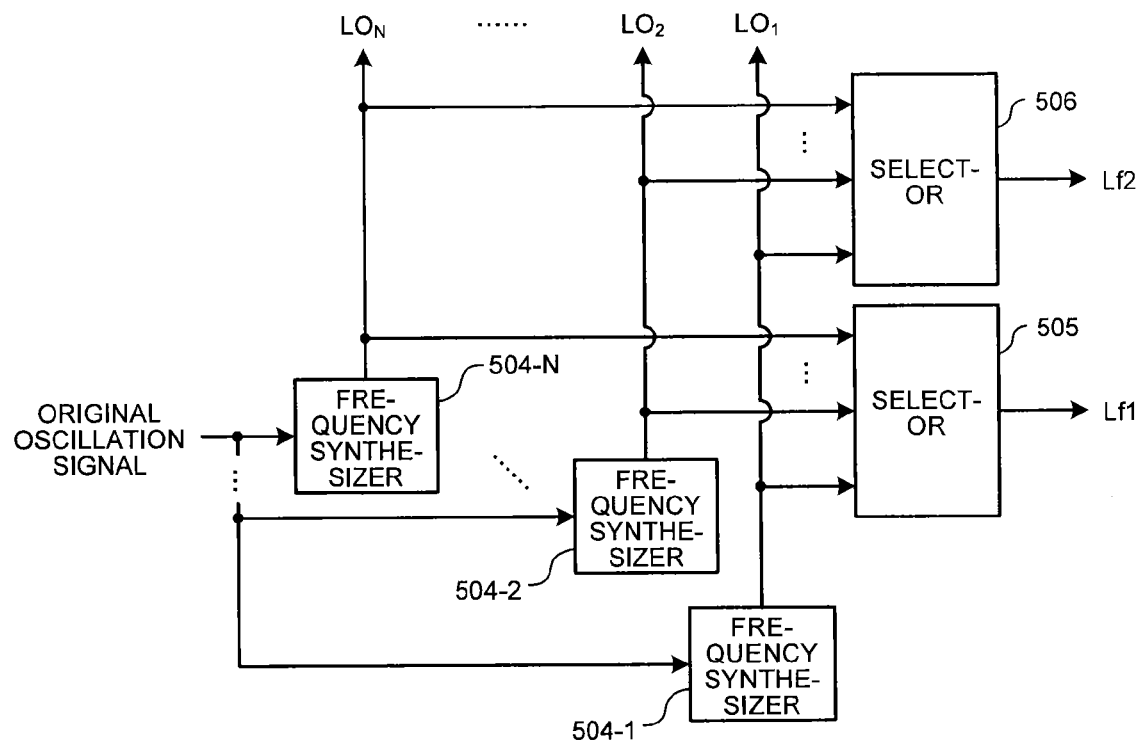
FIG. 12 is a diagram illustrating another configuration example of the local generating unit.

The local generating unit 25 can be configured as illustrated in FIG. 12 making use of the characteristics of frequency synthesizers. FIG. 12 is a diagram illustrating another configuration example of the local generating unit 25. In the configuration example illustrated in FIG. 12, the local generating unit 25 includes frequency synthesizers 504-1, 504-2, ..., and 504-N and selectors 505 and 506. The frequency synthesizers 504-1, 504-2, ..., and 504-N are capable of each selecting and outputting one of a plurality of local frequencies. In the embodiment, the frequency synthesizers 504-1, 504-2, ..., and 504-N are capable of a selecting a local signal having any one of the frequencies $f_1$ and $f_2$. Therefore, in the configuration described above, $LO_1$, $LO_2$, $LO_3$, . . . are each capable of respectively selecting any one of the frequencies $f_1$ and $f_2$. When the frequencies of $LO_1$, $LO_2$, $LO_3$, . . . are different, the selectors 505 and 506 respectively select and output local signals having different frequencies. For example, the selector 505 selects a local signal having the frequency $f_1$ and outputs the local signal as Lf1. The selector 506 selects a local signal having the frequency $f_2$ and outputs the local signal as Lf2. Signals with an instruction for switching the frequencies $f_1$ and $f_2$ and for controlling the selectors are performed by a command signal transmitted from the control station 110 to the relay satellite 200 via a separate line.

By selecting and outputting any local frequencies as $LO_1$, $LO_2$, $LO_3$, . . . in this way, the ports of the relay satellite can process signals in any frequency band. Therefore, it is possible to flexibly cope with fluctuations and the like of frequency bands in use due to traffic changes of the beam areas on the ground.

The local-phase-difference calculating unit 41 receives inputs of the local signal Lf1 and the local signal Lf2 from the local generating unit 25; detects a phase of the local signal Lf2 with the local signal Lf1 so as to extract a phase difference signal $\Delta\theta_{21}$ between both the local signals; and corrects reception signals and reversely corrects transmission signals on the basis of the extracted phase difference signal. In the following descriptions, processing content is described using mathematical expressions. Note that, in a process for developing the expressions, the addition theorem of the trigonometric function, the sum-to-product formula, the product-to-sum formula, and the like are used.

<Processing on the Reception Side>

Figure 13:
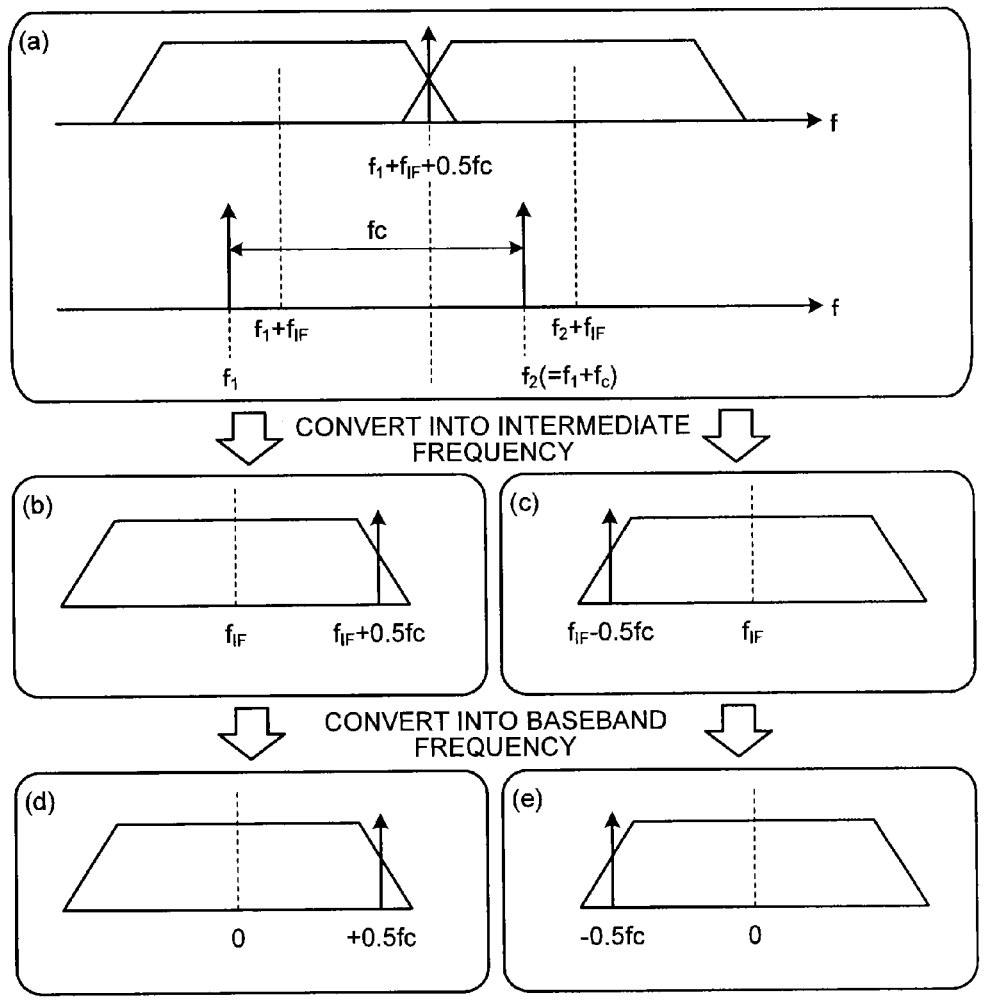
FIG. 13 is a diagram illustrating the flow of the frequency conversion process on a reception side.

FIG. 13 is a diagram illustrating a flow of frequency conversion processing on the reception side. The local signal Lf1 is expressed by the following Expression (1) and the local signal Lf2 is expressed by the following Expression (2). In the expression, $\theta(t)$ is a phase fluctuation component due to phase noise and the like observed in the local signal Lf2 when the local signal Lf1 is set as a reference.

$$Lf1 = \cos(2\pi f_1 t) \quad (1)$$

$$Lf2 = \cos(2\pi f_2 t + \theta(t)) \quad (2)$$

First, a processing process until the dynamic phase difference signal $\Delta\theta_{21}$ has been extracted by the local-phase-difference calculating unit 41 is expressed by an expression. The mixer 507 multiplies the local signal Lf1 with the local signal Lf2 and obtains a multiplication result $M_{21}$ expressed by the following Expression (3). As expressed by the following Expression (3), a frequency component of $f_1+f_2$ and a frequency component of $f_1-f_2$ are generated.

$$M_{21} = \cos(2\Pi f_1 t) * \cos(2\Pi f_2 t + \theta(t)) \quad (3)$$
$$= (1/2)\{\cos[2\Pi(f_1 + f_2)t + \cos[2\Pi(f_1 - f_2)t - \theta(t)]\}$$

The BPF 508 extracts the frequency component of $f_1-f_2$ from an output of the mixer 507. An extracted result by the BPF 508 is expressed by the following Expression (4) as $B_{21}$. A result obtained by removing a former half term (the frequency component of $f_1+f_2$) of the above Expression (3) with the BPF 508 is Expression (4). In Expression (4), $f_C=f_2-f_1$ and $f_2-f_1$ are converted into $f_C$.

$$B_{21} = (1/2)\{\cos[2\Pi(f_1 - f_2)t - \theta(t)]\} \quad (4)$$
$$= (1/2)\{\cos[2\Pi(-f_C)t - \theta(t)]\}$$
$$= (1/2)\{\cos[2\Pi f_C t + \theta(t)]\}$$

A complex local signal for quadrature detection C generated by the digital local generating unit 511 is expressed by the following Expression (5). In the expression, $\theta_C$ is a fixed phase difference based on the frequency component $f_C$ extracted by the BPF 508 and is determined according to the operation start timing of the local signal C. Note that clocks given to the digital units are generated by the original oscillator 26. Therefore, the frequency $f_C$ generated by the complex local signal C and the frequency $f_C$ of Expression (4) are frequency-synchronized.

$$C = \exp[-j(2\pi f_C t + \theta_C)] \quad (5)$$

The quadrature detection unit 510 multiplies the output $B_{21}$ of the BPF 508 with the complex local signal for quadrature detection C. Here, $\cos\alpha * \exp[-j(\beta)]$ can be developed as expressed by the following Expression (6).

$$\cos\alpha * \exp[-j(\beta)] = \cos\alpha * (\cos\beta - j\sin\beta) \quad (6)$$
$$= \cos\alpha * \cos\beta - j\cos\alpha\sin\beta$$
$$= (1/2)\{\cos(\alpha + \beta) + \cos(\alpha - \beta)\} -$$
$$j((1/2)\{\sin(\alpha + \beta) + \sin(-\alpha + \beta)\})$$
$$= (1/2)\{\cos(\alpha + \beta) + \cos(\alpha - \beta)\} -$$
$$j((1/2)\{\sin(\alpha + \beta) - \sin(\alpha - \beta)\}$$

A high frequency component $H_f$ of $\alpha+\beta$ is $$H_f = (1/2)\{\cos(\alpha + \beta)\} - j((1/2)\{\sin(\alpha + \beta)\}) \quad (7)$$
$$= (1/2)\exp[-j(\alpha + \beta)]$$

A low frequency component $L_f$ of $\alpha-\beta$ is $$L_f = (1/2)\{\cos(\alpha - \beta)\} - j((1/2)\{-\sin(\alpha - \beta)\}) \quad (8)$$
$$= (1/2)\exp[j(\alpha - \beta)]$$

When the above Expression (8) is used, the component $F_{21}$ obtained by extracting an output $(D_{21}-B_{21}*c)$ of the quadrature detection unit 510 by the LPF 512 is expressed by Expression (9).

$$F_{21} = (1/4)\{\exp[j(2\Pi f_C t + \theta(t) = (2\Pi f_C t + \theta_C))]\} \quad (9)$$
$$= (1/4)\{\exp[j(2\Pi f_C t + \theta(t) - 2\Pi f_C t - \theta_C)]\}$$
$$= (1/4)\{\exp[j(\theta(t) - \theta_C)]\}$$

Figure 14:
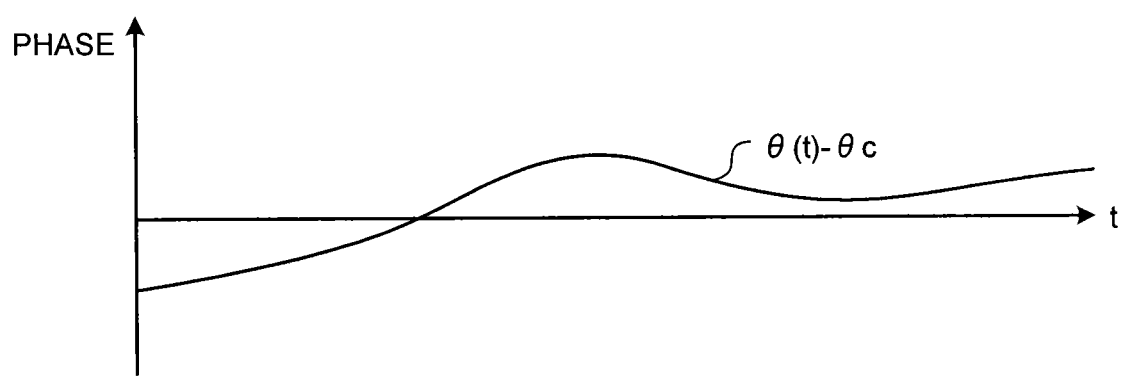
FIG. 14 is a diagram illustrating an example of a phase change of a signal after passing a limiter.

Finally, the phase difference signal $\Delta\theta_{21}$ after passing through the limiter 513 is fixed in amplitude as expressed by the following Expression (10). FIG. 14 is a diagram illustrating an example of a phase change of a signal after passing through the limiter 513.

$$\Delta\theta_{21} = \exp[j(\theta(t) - \theta_C)] \quad (10)$$

Then, the reception signal is expressed by expressions. The reception signal after passing through the BPF 14-1 is, as illustrated in FIG. 13, set to be a non-modulated carrier (CW) arranged at a boundary frequency $f_1 + f_{IF} + 0.5f_C$ between two ports. When the CW signal is down-converted into the baseband in the ports, a frequency relation between both signals is $+0.5f_C$ and $-0.5f_C$, and initial phases need to be aligned. If the initial phases are not aligned, when both the signals are up-converted again, combined, and transmitted, an energy loss occurs and the signals become deteriorated. But, if the initial phases are aligned, when both the signals are up-converted again, the phases of both signals are aligned. Therefore, when both signals are combined, the original signals can be transmitted without an energy loss.

The reception signal R is expressed by Expression (11). In the expression, $\theta_r$ is a phase offset value based on the local signal Lf1 $(=\cos(2\pi f_1 t))$ as a reference.

$$R = \cos(2\pi(f_1 + f_{IF} + 0.5f_C)t + \theta_r) \quad (11)$$

First, processing by the reception port 15-1 is described. In the reception port 15-1, the reception signal R expressed by Expression (11) is multiplied with a local signal Lf1 $(=\cos(2\pi f_1 t))$ by the mixer 24-1. A signal after the multiplication is expressed by the following Expression (12) as $M_{n1}$.

$$M_{n1} = \cos(2\Pi(f_1 + f_{IF} + 0.5f_C)t + \theta_r) * \cos 2\Pi(f_1 t) \quad (12)$$

$$= (1/2)\{\cos(2\Pi(2f_1 + f_{IF} + 0.5f_C)t + \theta_r) + \cos(2\Pi(f_{IF} + 0.5f_C)t + \theta_r)\}$$

The BPF 27-1 removes a harmonic component of $M_{n1}$ expressed by the above Expression (12). Therefore, a signal $B_{n1}$ after passing through the BPF 27-1 is expressed by Expression (13). A spectrum of a signal output from the BPF 27-1 is illustrated in FIG. 13(b).

$$B_{n1} = (1/2)\{\cos(2\pi(f_{IF} + 0.5f_C)t + \theta_r)\} \quad (13)$$

The signal output from the BPF 27-1 is sampled by the A/D converter 28-1 and input to the reception-phase correcting unit 29-1. The reception-phase correcting unit 29-1 converts the input signal from the intermediate frequency $f_{IF}$ into the baseband using the internal local signal $\exp[-j(2\pi f_{IF} t)]$.

First, the reception-phase correcting unit 29-1 converts the input signal $B_{n1}$ into a baseband frequency through multiplication with an intermediate frequency component $f_{IF}$ $(=\exp[-j(2\pi f_{IF} t)])$ digitally generated in the reception-phase correcting unit 29-1. This conversion is performed according to the above Expression (8) for extracting a low frequency of a multiplied signal component. That is, a signal $QL_{n1}$ after being converted into the baseband frequency is represented by the following Expression (14).

$$QL_{n1} = (1/4)\{\exp[j(2\Pi(f_{IF} + 0.5f_C)t + \theta_r - (2\Pi f_{IF} t))]\} \quad (14)$$

$$= (1/4)\{\exp[j(2\Pi(0.5f_C)t + \theta_r)]\}$$

Note that, in the embodiment, signals of the ports are synchronized with Lf1 through digital correction with reference to the local signal Lf1. However, because the signal $QL_{n1}$ is a signal converted from the intermediate frequency signal into the baseband signal by the local signal Lf1, the reception-phase correcting unit 29-1 does not need to apply phase correction to the signal $QL_{n1}$. Therefore, the initial phase value $L_{n1} = \exp[j(0)]$ is given to the reception-phase correcting unit 29-1, and the phase correction is not performed in the reception-phase correcting unit 29-1. This means that the signal $S_{n1}$ after the phase correction is the same as the above Expression (14) ($S_{n1} = QL_{n1}$). A spectrum of a signal output from the reception-phase correcting unit 29-1 is illustrated in FIG. 13(d).

Processing by the reception port 15-2 is described here. The reception signal R expressed by Expression (11) that is input to the reception port 15-2 is multiplied with the local signal Lf2 $(=\cos(2\pi f_2 t + \theta(t)))$ by the mixer 24-2. A signal after the multiplication is expressed by Expression (15) as $M_{n2}$. Here, the transforming the expression is performed using the relation of $f_2 = f_1 + f_C$.

$$M_{n2} = \cos(2\Pi(f_1 + f_{IF} + 0.5f_C)t + \theta_r) * \cos 2\Pi(2\Pi f_2 t + \theta(t)) \quad (15)$$

$$= (1/2)\{\cos(2\Pi(f_1 + f_{IF} + 0.5f_C)t + \theta_r + 2\Pi(f_1 + f_C)t + \theta(t)) +$$

$$\cos(2\Pi(f_1 + f_{IF} + 0.5f_C)t + \theta_r - 2\Pi(f_1 + f_C)t - \theta(t))\}$$

$$= (1/2)\{\cos(2\Pi(2f_1 + f_{IF} + 1.5f_C)t + \theta_r + \theta(t)) +$$

$$\cos(2\Pi(f_{IF} - 0.5f_C)t + \theta_r - \theta(t))\}$$

The BPF 27-2 removes harmonic components of the signal $M_{n2}$ expressed by the above Expression (15). Therefore, the signal $B_{n2}$ after passing through the BPF 27-2 is expressed by the following Expression (16). A spectrum of a signal output from the BPF 27-2 is illustrated in FIG. 13(c).

$$B_{n2} = (1/2)\{\cos(2\pi(f_{IF} - 0.5f_C)t + \theta_r - \theta(t))\} \quad (16)$$

Subsequently, the local-phase-difference calculating unit 41 gives the baseband phase difference signal $\Delta\theta_{21}$ calculated by the above Expression (10) for the reception port 15-2 to the reception-phase correcting unit 29-2. The reception-phase correcting unit 29-2 converts an input signal from the intermediate frequency $f_{IF}$ to the baseband using the internal local signal $\exp[-j(2\pi f_{IF} t)]$. In this conversion, the reception-phase correcting unit 29-2 corrects a phase difference with the reception port 15-1.

First, the reception-phase correcting unit 29-2 multiplies the signal $B_{n2}$ input in the same manner as the input to the reception-phase correcting unit 29-1 with the intermediate frequency component $f_{IF}$ $(=\exp[-j(2\pi f_{IF} t)])$ digitally generated inside the reception-phase correcting unit 29-2 so as to convert the signal $\beta_{n2}$ into the baseband frequency. A signal $QL_{n2}$ after being converted into the baseband frequency is represented by the following Expression (17). Note that, as the intermediate frequency component $f_{IF}$, an intermediate frequency component that is the same as the intermediate frequency component $f_{IF}$ used in the processing of the signal input to the reception port 15-1 can be used.

$$QL_{n2} = (1/4)\{\exp[j(2\Pi(f_{IF} - 0.5f_C)t + \theta_r - \theta(t) - (2\Pi f_{IF} t))]\} \quad (17)$$

$$= (1/4)\{\exp[j(2\Pi(-0.5f_C)t + \theta_r - \theta(t))]\}$$

The reception-phase correcting unit 29-2 multiplies the signal $QL_{n2}$ converted from the intermediate frequency signal into the baseband signal with the baseband phase difference signal $\Delta\theta_{21}$ and performs the phase correction. A signal after having been phase-corrected is expressed by the following Expression (18) as $S_{n2}$.

$$S_{n2} = (1/4)\{\exp[j(2\Pi(-0.5f_C)t + \theta_r - \theta(t))]\} * \exp[j(\theta(t) - \theta_C)] \quad (18)$$
$$= (1/4)\{\exp[j(2\Pi(-0.5f_C)t + \theta_r - \theta_C)]\}$$

As expressed by the above Expression (18), a dynamic phase fluctuation component $\theta(t)$ is cancelled. In the reception port 15-2, the reception signal R is converted into a negative frequency component $-0.5f_C$ while keeping a phase offset $\theta_r$-$\theta_C$. A spectrum of a signal output from the reception-phase correcting unit 29-2 is illustrated in FIG. 13(*e*).

As expressed by the above Expression (14), at the reception port 15-1, the reception signal R is converted into a positive frequency component $+0.5f_C$ while maintaining a phase offset $\theta_r$. Therefore, as illustrated in FIGS. 13(*d*) and 13(*e*), a frequency relation between a signal after the phase correction of the reception port 15-1 and a signal after the phase correction of the reception port 15-2 is $+0.5f_C$, $-0.5f_C$. Furthermore, an initial phase is $\theta_r$ in Expression (14), and is $\theta_r$-$\theta_C$ in Expression (18). A shift of $-\theta_C$ remains between the signal after the phase correction of the reception port 15-1 and the signal after the phase correction of the reception port 15-2.

Although the shift of $-\theta_C$ remains, the dynamic phase fluctuation component $\theta(t)$ is cancelled by the series of processes described above. Note that, if the phase shift of $-\theta_C$ remains between the signals, when the frequencies of the signals are up-converted and combined as expressed by the following Expression (19) in a transmission process, an amplitude decrease occurs due to the phase shift ($-\theta_C$). Therefore, $-\theta_C$ is desirably corrected separately. As a correction method for the fixed value $-\theta_C$, any method can be used. Further, $-\theta_C$ can be automatically cancelled by, for example, a method described below in a fourth embodiment.

$$QL_{n1} * \exp[j(2\Pi f_1 t)] + S_{n2} * \exp[j(2\Pi(f_1 + f_C)t)] = \quad (19)$$
$$\{1/4\}\{\exp[j(2\Pi(0.5f_C)t + \theta_r)]\} * \exp[j(2\Pi f_1 t)] +$$
$$(1/4)\{\exp[j(2\Pi(-0.5f_C)t + \theta_r - \theta_C)]\} * \exp[j(2\Pi(f_1 + f_C)t)] =$$
$$(1/4)\{\exp[j(2\Pi(f_1 + 0.5f_C)t + \theta_r)]\} +$$
$$(1/4)\{\exp[j(2\Pi(f_1 + 0.5f_C)t + \theta_r - \theta_C)]\}$$

<Processing on the Transmission Side>

Processing on the transmission side is represented by expressions. On the transmission side, processing opposite to the processing on the reception side is performed. Expression (20) expresses a transmission signal output from the multiplexing unit 32-1 corresponding to the transmission port 39-1. Expression (21) expresses a transmission signal output from the multiplexing unit 32-2 corresponding to the transmission port 39-2.

$$S'_{n1} = \{\exp[j(2\pi(+0.5f_C)t)]\} \quad (20)$$

$$S'_{n2} = \{\exp[j(2\pi(-0.5f_C)t)]\} \quad (21)$$

Figure 15:
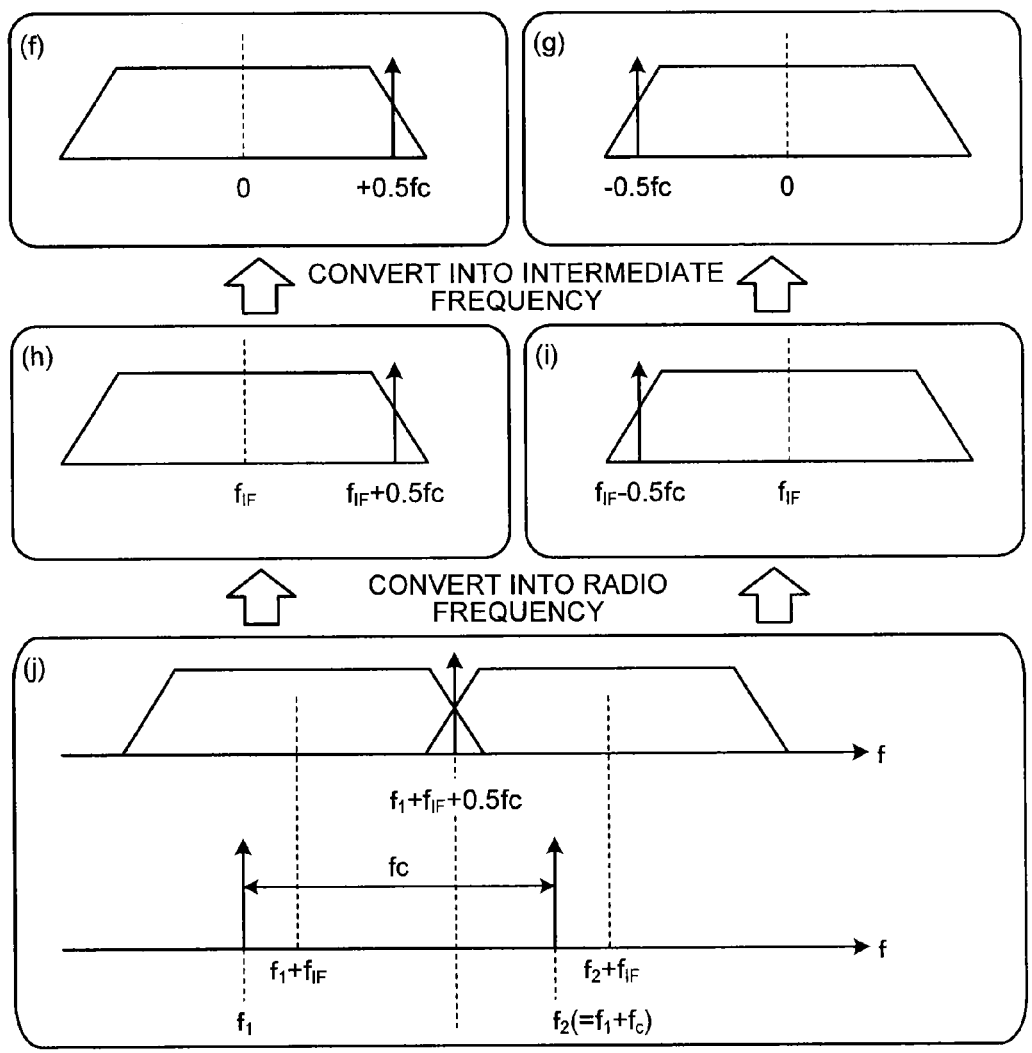
FIG. 15 is a diagram illustrating an example of the flow of frequency conversion on the transmission side.

FIG. 15 is a diagram illustrating an example of the flow of frequency conversion on the transmission side. A spectrum of $S'_{n1}$ expressed by Expression (20) is represented as a figure illustrated in FIG. 15(*f*). A spectrum of $S'_{n2}$ expressed by Expression (21) is represented by a figure as illustrated in FIG. 15(*g*).

A frequency relation between $S'_{n1}$ and $S'_{n2}$ is $+0.5f_C$, $-0.5f_C$, and initial phases of the signals are aligned. Therefore, an ideal frequency conversion into a radio frequency is performed without local phase difference fluctuation at the transmission ports, and when the signals are combined by the transmission analog switch matrix 37, a non-modulated wave having amplitude of 1 is output with a center frequency f1+$f_{IF}$+$0.5f_C$ illustrated in FIG. 13(*a*). However, actually, because local phase difference fluctuation occurs between transmission ports, the phase and the amplitude of a transmission signal after the combination fluctuate unless processing described below is performed.

First, the transmission-phase correcting unit 33-1 converts the input signal $S'_{n1}$ from the baseband into the intermediate frequency $f_{IF}$ using the internal local signal $\exp[-j(2\pi f_{IF}t+\theta_U)]$. $\theta_U$ is an initial phase offset. The transmission-phase correcting unit 33-1 is of a system that uses the local signal Lf1. Therefore, it is unnecessary to apply the phase correction to the input signal $S'_{n1}$. In this case, the transmission-phase correcting unit 33-1 gives $\exp[j(0)]$ to the input signal $S'_{n1}$.

An input signal $U_1$ that is converted into the intermediate frequency $f_{IF}$ by the transmission-phase correcting unit 33-1 is expressed by the following Expression (22). Here, Re[x] indicates a real part of a complex number x. A spectrum of $U_1$ is illustrated in FIG. 15(*h*).

$$U_1 = \text{Re}[S'_{n1} * \exp[j(0)] * \exp[j(2\Pi f_{IF} t + \theta_U)]] \quad (22)$$
$$= \text{Re}[\exp[j(2\Pi(+0.5f_C)t)] * \exp[j(0)] * \exp[j(2\Pi f_{IF} t + \theta_U)]]$$
$$= \text{Re}[\exp[j(2\Pi(f_{IF} + 0.5f_C)t + \theta_U)]]$$
$$= \cos(2\Pi(f_{IF} + 0.5f_C)t + \theta_U)$$

Similarly, the transmission-phase correcting unit 33-2 converts the input signal $S'_{n2}$ from the baseband into the intermediate frequency $f_{IF}$ by using the same internal local signal $\exp[-j(2\pi f_{IF}t+\theta_U)]$. In this conversion, the transmission-phase correcting unit 33-2 gives a reverse correction value ($=\exp[j(-\theta(t)+\theta_C)]$) to the input signal $S'_{n2}$ by using the value $\Delta\theta_{21}$ ($=\exp[j(\theta(t)-\theta_C)]$) obtained by the above Expression (10) so as to perform reverse correction. This reverse correction is realized by simply multiplying the input signal $S'_{n2}$ with a complex conjugate of a correction value as expressed by the following Expression (23). An input signal $U_2$ that is converted into the intermediate frequency $f_{IF}$ is expressed by the following Expression (23). A spectrum of $U_2$ at this point is illustrated in FIG. 15(*i*).

$$U_2 = \text{Re}[S'_{n2} * \exp[j((-\theta(t) + \theta_C))] * \exp[j(2\Pi f_{IF} t + \theta_U)]] \quad (23)$$
$$= \text{Re}[\exp[j(2\Pi(-0.5f_C)t)] * \exp$$
$$\exp[j((-\theta(t) + \theta_C))] * \exp[j(2\Pi f_{IF} t + \theta_U)]]$$
$$= \text{Re}[\exp[j(2\Pi(f_{IF} - 0.5f_C)t - \theta(t) + \theta_C + \theta_U)]]$$
$$= \cos(2\Pi(f_{IF} - 0.5f_C)t - \theta(t) + \theta_C + \theta_U)$$

Subsequently, the signal $U_1$ that is converted into the intermediate frequency $f_{IF}$ is multiplied with the local signal $\cos(2\pi f_1 t)$ expressed by Expression (1). A signal after the multiplication is expressed by the following Expression (24) as $W_1$.

$$W_1 = \cos(2\Pi(f_{IF} + 0.5f_C)t + \theta_U) * \cos(2\Pi f_1 t) \quad (24)$$
$$= (1/2)\{\cos(2\Pi(f_1 + f_{IF} + 0.5f_C)t + \theta_U) +$$
$$\cos(2\Pi(f_{IF} - f_1 + 0.5f_C)t + \theta_U)\}$$

As expressed by Expression (24), two frequency components are generated as $W_1$. The BPF 38-1 allows only a high frequency component of the two frequency components to pass. Therefore, a signal component $Y_1$ after passing through the BPF 38-1 is expressed by the following Expression (25).

$$Y_1 = (\tfrac{1}{2})\{\cos(2\pi(f_{IF}-f_1+0.5f_C)t+\theta_U)\} \quad (25)$$

Similarly, the signal $U_2$ that is converted into the intermediate frequency $f_{IF}$ is multiplied with the local signal $\cos(2\pi f_2 t+\theta(t))$ expressed by Expression (2) at the mixer 36-2. A signal after the multiplication is expressed by Expression (26) as $W_2$. Two frequency components are generated as $W_2$.

$$W_2 = \cos(2\Pi(f_{IF} - 0.5f_C)t - \theta(t) + \theta_C + \theta_U) * \cos(2\Pi f_2 t + \theta(t)) \quad (26)$$
$$= (1/2)\{\cos(2\Pi(f_{IF} - 0.5f_C)t - \theta(t) + \theta_C + \theta_U + 2\Pi f_2 t + \theta(t)) +$$
$$\cos(2\Pi(2\Pi(f_{IF} - 0.5f_C)t - \theta(t) + \theta_C + \theta_U - 2\Pi f_2 t - \theta(t))\}$$
$$= (1/2)\{\cos(2\Pi(f_{IF} - 0.5f_C)t + \theta_C + \theta_U) +$$
$$\cos(2\Pi(f_{IF} - f_1 - 1.5f_C)t + \theta_C + \theta_U - 2\theta(t))\}$$

Because of Expression (26), it is evident that the phase fluctuation signal $\theta(t)$ is cancelled by a high frequency component of $W_2$. The BPF 38-2 allows only the high frequency component of $W_2$ to pass. Therefore, a signal component $Y_2$ after passing through the BPF 38-2 is expressed by the following Expression (27).

$$Y_2 = (\tfrac{1}{2})\{\cos(2\pi(f_{IF}+f_1+0.5f_C)t+\theta_C+\theta_U)\} \quad (27)$$

When $Y_1$ represented by Expression (25) and $Y_2$ represented by expression (27) are compared, it is seen that a fixed shift of $+\theta_C$ remains and the dynamic phase fluctuation component $\theta(t)$ does not remain. Therefore, if this $\theta_C$ is separately corrected and the phases of both the signals are aligned, a signal T obtained by adding together the signals by using the transmission analog switch matrix 37 has double the amplitude as that expressed by the following Expression (28). The signal T has a relation in which a phase is simply offset by $\theta_U$ with respect to the received signal R expressed by Expression (11). A spectrum of the signal T at this point is illustrated in FIG. 15(i).

$$T = \cos(2\pi(f_{IF}+f_1+0.5f_C)t+\theta_r+\theta_U) \quad (28)$$

Note that $\theta_C$ described above can be automatically cancelled using, for example, a method described in a fourth embodiment below.

Even when the band-pass filter 508 illustrated in FIG. 5 is changed to a low-pass filter, the frequency component of $f_2+f_1$ can be removed. Therefore, the band-pass filter 508 can be replaced with a low-pass filter.

As described above, in the embodiment, the process is described as an example for the multiplexing of the waves into one again according to the flow on the transmission side illustrated in FIG. 15, when the non-modulated wave is input to the boundary between the two ports after demultiplexing the non-modulated wave into two in the processing on the reception side as illustrated in FIG. 13. In this process, even if the local phase fluctuation $\theta(t)$, which is the phase fluctuation between the ports, occurs, $\theta(t)$ is cancelled by the reception-phase correcting units 29-1 to 29-N on the reception side and $\theta(t)$ is cancelled by the mixers 36-1 to 36-N on the transmission side. Consequently, the non-modulated wave that is output from the relay satellite is restored without causing an amplitude decrease even if the frequency is at the boundary between the two ports. Note that, for simplification of description, the relay example of the non-modulated wave is described. However, a modulated wave can also be restored in the same manner by the same correction processing.

The processing is actually realized by the digital processing. Therefore, the AD converter 509 analog-digital converts the output signal (frequency: $\Delta f=f_2-f_1$) of the band-pass filter 508 at sampling speed of, for example, $4\Delta f$. A clock for driving the AD converter 509 and the quadrature detection unit 510, the LPF 512, and the limiter 513 that follow the AD converter 509 is supplied from the clock generator 517. The clock is generated in the clock generator 517 on the basis of the original oscillation signal from the original oscillator 26.

In an actual circuit configuration, the baseband phase difference signal $\Delta\theta_{21}$ calculated by Expression (10) is input to the selectors 514, 515, and 516 illustrated in FIG. 5. Each of the selectors selects and outputs, according to selection signals ($S_1, S_2, \ldots,$ and $S_N$) from the outside, any one of the baseband phase difference signal $\Delta\theta_{21}$ and a fixed phase value $\Delta\theta_{11}=\exp[j(0)]$.

In the embodiment, an output of the selector 516 is connected to the reception-phase correcting unit 29-1 and the transmission-phase correcting unit 33-1. Similarly, an output of the selector 515 is connected to the reception-phase correcting unit 29-2 and the transmission-phase correcting unit 33-2. Similarly, an output of the N-th selector 514 is connected to the reception-phase correcting unit 29-N and the transmission-phase correcting unit 33-N.

If the ports of the reception-phase correcting unit and the transmission-phase correcting unit at connection destinations are ports to which the local signal Lf1 is supplied, the selectors select the fixed phase value $\Delta\theta_{11}=\exp[j(0)]$. However, if the ports of the reception-phase correcting unit and the transmission-phase correcting unit at the connection destinations are ports to which the local signal Lf2 is supplied, the selectors select the baseband phase difference signal $\Delta\theta_{21}$.

Note that, in the embodiment, the third ports (the reception port 15-3 and the transmission port 39-3) relay signals with the bandwidth that is within 1 on both of the reception side and the transmission side. Therefore, local phase synchronization with the other ports is unnecessary. It is unnecessary to apply dynamic control to the reception-phase correcting unit 29-3 and the transmission-phase correcting unit 33-3 of the third ports. When certain ports process signals with a bandwidth that it is within 1 in this way, the selectors give the fixed phase values $\Delta\theta_{11}=\exp[j(0)]$ to the reception-phase correcting unit and the transmission-phase correcting unit of the ports.

Furthermore, as described above, when the beam area requiring wide bandwidth exceeding 1 changes from the beam area 100 to the beam area 102 in the uplink, on the reception side, a combination of the reception port 15-1 and the reception port 15-2 is switched to a combination of the reception port 15-2 and the reception port 15-3 in order to relay a wideband signal. In this case, the baseband phase difference signal $\Delta\theta_{21}$ is given to the reception-phase correcting unit of the port to which the local signal having the frequency $f_2$ is supplied. The fixed phase value $\Delta\theta_{11}=\exp[j(0)]$ is given to the other reception-phase correcting units.

Similarly, when the beam area requiring wide bandwidth exceeding 1 changes from the beam area 400 to the beam area 402 in the downlink, on the transmission side, a combination of the transmission port 39-1 and the transmission port 39-2 is switched to a combination of the transmission port 39-2 and the transmission port 39-3 to relay a wideband signal. In this case, similarly, the baseband phase difference signal $\Delta\theta_{21}$ is given to the transmission-phase correcting unit of the port to which the local signal having the frequency $f_2$ is supplied. The fixed phase value $\Delta\theta_{11}=\exp[j(0)]$ is given to the other transmission-phase correcting units.

Note that, if only the local signal Lf1 is a signal with less phase noise, even if a phase noise characteristic of the local signal Lf2 is poor, the local signal Lf2 is phase-synchronized with the local signal Lf1 by the digital correction. Therefore, the phase noise characteristic as low as that of the local signal Lf1 can be realized in a signal relayed by the local signal Lf2. That is, even when signals with low frequency stability are used as the local signals Lf2, Lf3, . . . , and LfN other than the local signal Lf1, phase noise characteristic as low as that of the local signal Lf1, which has high stability, can be realized. Therefore, it is possible to reduce the cost of the frequency synthesizers used for the local signals Lf2, Lf3, . . . , and LfN. In this case, a clock supplied to the digital units of the relay apparatus is generated by the original oscillation used by the local signal Lf1 or by the local signal Lf1 itself.

Further, original oscillation used by the frequency synthesizers used for the local signals Lf2, Lf3, . . . , and LfN does not have to be made common to the original oscillation of the local signal Lf1. In this case, because original oscillations of the local signals are made non-common, the frequency interval of the local signals is not $f_C$ and a frequency offset $\Delta f$ is added to the local signals. However, if a frequency offset amount is not so large, as in the case described above, signals of the ports can be synchronized with the local signal Lf1 having high stability. In this case, because the original oscillations can be made non-common, the relay apparatus configuration is simplified. It is possible to reduce the cost of the frequency synthesizers used for the local signals Lf2, Lf3, . . . , and LfN. Here, in this case, as in the case described above, a clock supplied to the digital units of the relay apparatus in the embodiment is generated by the original oscillation used by the local signal Lf1 or by the local signal Lf1 itself.

In the embodiment, the system is described in which the first ports (the reception ports 15-1 and the transmission port 39-1) and the third ports (the reception port 15-3 and the transmission port 39-3) process the low frequency side ($f_1$), and the second ports (the reception port 15-2 and the transmission port 39-2) process the high frequency side ($f_2$). However, the system can be designed to be capable of selecting any one of the low frequency side ($f_1$) and the high frequency side ($f_2$) for each of the ports.

In order to realize this, a configuration can be adopted that is only capable of selecting $f_1$ or $f_2$ as local frequencies supplied from the local generating unit 25 to the mixers 24-1 to 24-N and 36-1 to 36-N. If such a circuit change is performed, the ports can be freely allocated to any one of the low frequency side ($f_1$) and the high frequency side ($f_2$). Therefore, flexibility to traffic fluctuation is further improved. It is possible to further reduce circuit resources.

Note that, in the embodiment, the combination of the two ports is described as an example. However, the number of ports to be combined can be any number as long as the number is two or more. A configuration capable of selecting not only $f_1$ and $f_2$ but also frequencies $f_1$, $f_2$, . . . , and $f_m$, where as many as a maximum number m of combinable frequencies only has to be adopted.

As described above, in the embodiment, when a wideband signal is processed with a band divided by two or more ports, the local-phase-difference calculating unit 41 calculates a phase difference between the ports and corrects the phase difference between the ports on the basis of the phase difference. Therefore, it is possible to relay a wideband signal even when the performance of a device is limited and reduce deterioration in communication quality due to a failure or interference.

Note that, in the embodiment, as illustrated in FIG. 1, a signal relay based on the flow of the receiving unit 201 to the connecting unit 31 and further to the transmitting unit 202 is described. However, the relay apparatus does not always need to be a specialized relay apparatus. For example, the flow can be stopped in the flow of the receiving unit 201 to the connecting unit 31 and to the multiplexing unit 32. A multiplexed signal can be demodulated and decoded in the apparatus. In this case, the processing speed of only the multiplexing unit 32 needs to be designed to be doubled. However, it is possible to obtain a receiver that realizes demodulation and decoding of a wideband signal exceeding a sampling speed upper limit of a space device such as an A/D.

Similarly, observation data or the like obtained in the apparatus can be supplied in a flow of the demultiplexing unit 30 to the connecting unit 31 and to the transmitting unit 202 excluding the receiving unit 201 after being encoded and modulated. In this case, the processing speed of the demultiplexing unit 30 only needs to be designed to be doubled. However, it is possible to obtain a modulator that realizes encoding and modulation of a wideband signal exceeding a sampling speed upper limit of a device used in space such as an A/D.

Second Embodiment

Figure 16:
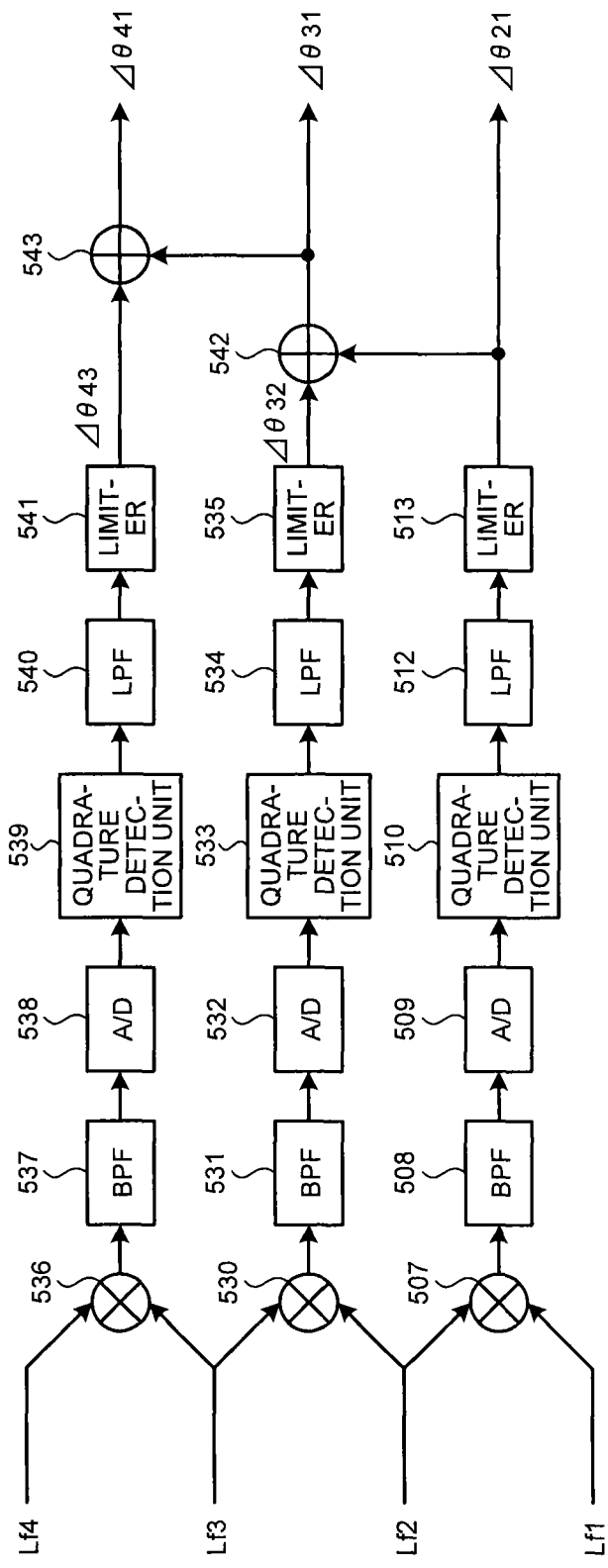
FIG. 16 is a diagram illustrating a configuration example of a local-phase-difference calculating unit in a second embodiment.

FIG. 16 is a diagram illustrating a configuration example of a local-phase-difference calculating unit 41a in a second embodiment according to the present invention. The configuration of a relay satellite in the embodiment is the same as the configuration of the relay satellite in the first embodiment except that the local-phase-difference calculating unit 41 in the first embodiment is replaced with the local-phase-difference calculating unit 41a. In the following description, components having functions the same as the functions in the first embodiment are denoted by reference numerals and signs the same as the reference numerals and signs in the first embodiment. Redundant description of the components is omitted.

The local-phase-difference calculating unit 41a includes mixers (multipliers) 507, 530, and 536; band-pass filters (BPFs) 508, 531, and 537; AD converters (A/Ds) 509, 532, and 538; quadrature detection units 510, 533, and 539; low-pass filters (LPFs) 512, 534, and 540; limiters 513, 535, and 541; and adders 542 and 543.

In the first embodiment, the example is described in which the wideband signal relay at the maximum bandwidth of 2 is realized by using the two ports. However, similarly, a wideband signal having maximum bandwidth of K can also be realized by using K (K is an integer equal to or larger than 3 and equal to or less than N) ports.

In this case, the local generating unit 25 only has to generate local signals Lf1, Lf2, ..., and LfK corresponding to frequencies $f_1, f_2, \ldots,$ and $f_K$, a frequency interval of which is $f_C$. The BPFs 23-1 to 23-N and the BPFs 38-1 to 38-N corresponding to the ports only have to be designed with frequency characteristics corresponding to the frequencies $f_1, f_2, \ldots,$ and $f_K$. For example, when K is set to 4 and a maximum bandwidth of 4 is realized using first to fourth ports, the BPFs 23-1 to 23-4 respectively extract different bands corresponding to any one of the frequencies $f_1, f_2, \ldots,$ and $f_K$.

In the embodiment, as described above, the local generating unit 25 generates the local signals Lf1, Lf2, ..., and Lfk. As in the first embodiment, the local-phase-difference calculating unit 41a extracts phase difference signals $\Delta\theta_{i,i-1}$ (i=1, 2, ..., and k) among the local signals on the basis of Lf1, Lf2, ..., and Lfk.

In the following description, as an example, processing in the case of N=K=4 is described. The configuration example illustrated in FIG. 16 is also an example in the case of K=4. In this case, the local-phase-difference calculating unit 41a extracts phase difference signals among four local signals respectively corresponding to $f_1$, $f_2$, $f_3$, and $f_4$. When Lf3 is directly subjected to phase detection with using the local signal Lf1, a frequency of $f_3-f_1=2f_C$ is generated. Therefore, required sampling clock speed for AD conversion increases to a double of the sampling clock speed in the first embodiment. Similarly, when Lf4 is directly subjected to phase detection using the local signal Lf1, a frequency of $f_4-f_1=3f_C$ is generated. Therefore, the required sampling clock speed for the AD conversion increases to a triple of the sampling clock frequency in the first embodiment. To prevent such an increase in the AD sample clock frequency, the local-phase-difference calculating unit 41a in the embodiment detects phase differences of local signals having adjacent frequencies described by the following Expressions (30) to (32).

$$\Delta\theta_{21}=\exp[j(\theta_{21}(t))] \quad (30)$$

$$\Delta\theta_{32}=\exp[j(\theta_{32}(t))] \quad (31)$$

$$\Delta\theta_{43}=\exp[j(\theta_{43}(t))] \quad (32)$$

Expression (30) is the same as Expression (10). However, expression is re-written to be distinguishable from the other phase difference signals. Expression (31) is a phase difference signal obtained when Lf3 is subjected to phase detection with Lf2. Expression (32) is a phase difference signal obtained when Lf4 is subjected to phase detection with Lf3. Both the phase difference signals are obtained in a process the same as the extraction processing for a phase difference signal obtained when Lf2 is subjected to phase detection with Lf1. Because $f_4-f_3=f_C$ and $f_3-f_2=f_C$, in both the cases, required sampling clock speed for AD conversion is the same as the sampling clock speed in the first embodiment.

The local generating unit 25 in the embodiment performs the addition processing described below after extracted the phase difference signals expressed by the above Expressions (30) to (32). Expression (33) is equivalent to the phase difference signal obtained when Lf3 is subjected to phase detection with the local signal Lf1. Expression (34) is equivalent to the phase difference signal obtained when Lf4 is subjected to phase detection with the local signal Lf1.

$$\Delta\theta_{31}=\Delta\theta_{21}+\Delta\theta_{32}=\exp[j(\theta_{32}(t)+\theta_{21}(t))] \quad (33)$$

$$\Delta\theta_{41}=\Delta\theta_{21}+\Delta\theta_{32}+\Delta\theta_{43}=\exp[j(\theta_{32}(t)+\theta_{21}(t)+\theta_{43}(t))] \quad (34)$$

In the configuration example illustrated in FIG. 16, a phase difference signal $\Delta\theta_{21}$ is extracted from the limiter 513 according to processing the same as the processing in the first embodiment. Similarly, a phase difference signal $\Delta\theta_{32}$ is extracted by the mixer 530, the BPF 531, the AD converter 532, the quadrature detection unit 533, the low-pass filter 534, and the limiter 535. A phase difference signal $\Delta\theta_{43}$ is extracted by the mixer 536, the BPF 537, the AD converter 538, the quadrature detection unit 539, the low-pass filter 540, and the limiter 541.

The adder 542 adds together an output of the limiter 513 and an output of the limier 535 and generates a phase difference signal $\Delta\theta_{31}$ expressed by Expression (33). Further, the adder 543 adds together an output of the limiter 541 and an output of the adder 542 and generates a phase difference signal $\Delta\theta_{41}$ expressed by Expression (34).

The local-phase-difference calculating unit 41a in the embodiment supplies the phase difference signal $\Delta\theta_{41}$ obtained by Expression (34) to a reception-phase correcting unit/a transmission-phase correcting unit of a port that carries out down-convert/up-convert using the local signal Lf4. The reception-phase correcting unit/the transmission-phase correcting unit, to which the local signal Lf4 is input, performs phase correction/reverse correction on the basis of the input local signal Lf4.

Similarly, the local-phase-difference calculating unit 41a in the embodiment supplies the phase difference signal $\Delta\theta_{31}$ obtained by Expression (33) to a reception-phase correcting unit/a transmission-phase correcting unit of a port that carries out down-convert/up-convert using the local signal Lf3. The reception-phase correcting unit/the transmission-phase correcting unit, to which the local signal Lf3 is input, perform phase correction/reverse correction on the basis of the input local signal Lf3.

Similarly, the local-phase-difference calculating unit 41a in the embodiment supplies the phase difference signal $\Delta\theta_{21}$ obtained by Expression (30) to a reception-phase correcting unit/a transmission-phase correcting unit of a port that carries out down-convert/up-convert using the local signal Lf2. The reception-phase correcting unit/the transmission-phase correcting unit, to which the local signal Lf2 is input, perform phase correction/reverse correction on the basis of the input local signal Lf2.

The method of the phase correction/the reverse correction using the phase difference signals is the same as the method in the first embodiment. According to the processing described above, the ports can synchronize all phases with the local signal Lf1. Note that, in the embodiment, the processing in the case of K=4 is described as the example. However, K can be any number as long as the number is equal to or larger than 2. When K is other than 4, K−1 phase difference signals $\Delta\theta_{21}$ to $\Delta\theta_{K,K-1}$ only have to be generated and supplied to reception-phase correcting units/transmission-phase correcting units corresponding thereto.

As described above, in the embodiment, wideband signals are processed at three or more ports with the bands being divided. Therefore, it is possible to relay a wider band signal without deterioration in communication performance than in the first embodiment.

Third Embodiment

Figure 17:
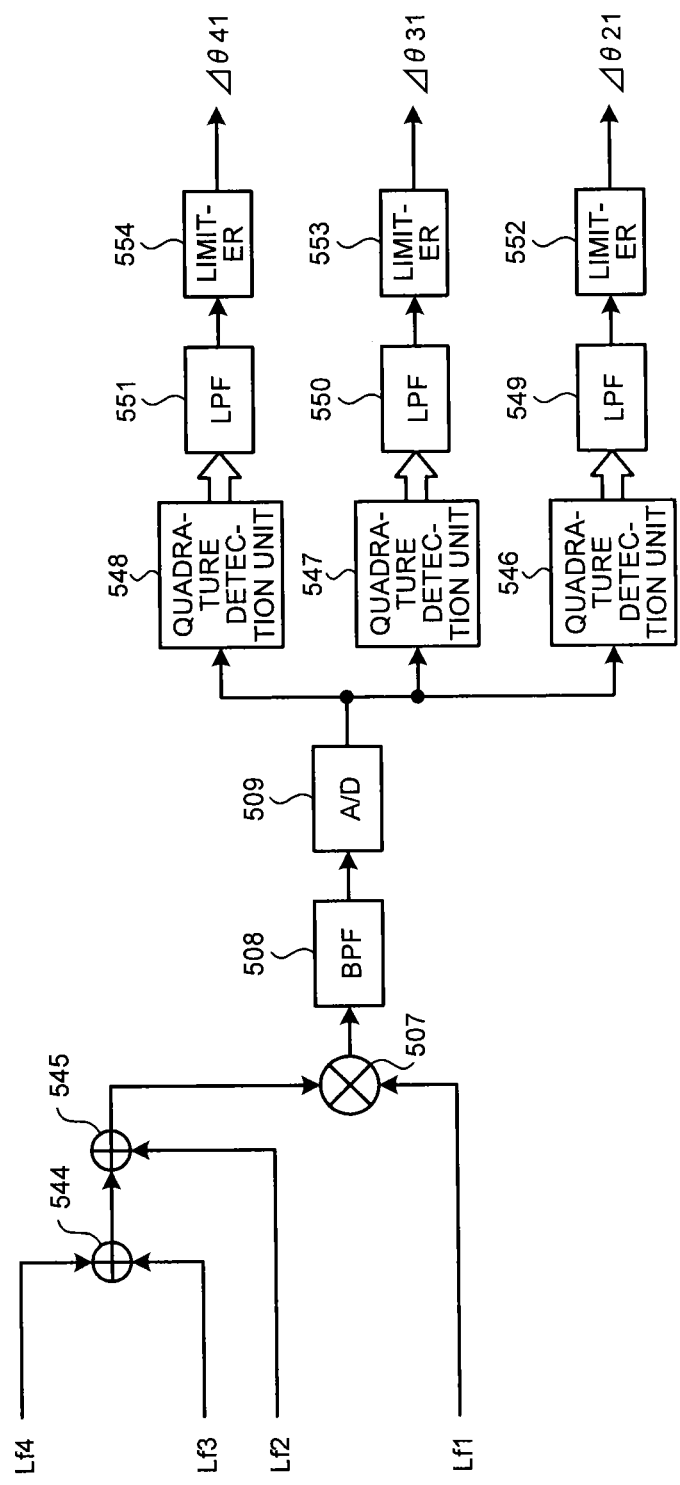
FIG. 17 is a diagram illustrating a configuration example of a local-phase-difference calculating unit in a third embodiment.

FIG. 17 is a diagram illustrating a configuration example of a local-phase-difference calculating unit 41b in a third embodiment according to the present invention. The configuration of a relay satellite in the embodiment is the same as the relay satellite in the first embodiment except that the local-phase-difference calculating unit 41 in the first embodiment is replaced with the local-phase-difference calculating unit 41b. In the following description, components having functions the same as the functions in the first embodiment are denoted by reference numerals and signs the same as the reference numerals and signs in the first embodiment. Redundant description of the components is omitted.

In the local-phase-difference calculating unit 41a in the second embodiment, the mixers, the band-pass filters, and the AD converters in the three systems are necessary. The size of the analog circuit increases according to an increase in K. Therefore, in the embodiment, the configuration is changed to collectively detect, with using Lf1, a signal obtained by adding together local signals other than Lf1 to reduce the numbers of mixers, the band-pass filters, and the AD converters.

As illustrated in FIG. 17, the local-phase-difference calculating unit 41b in the embodiment includes the mixer 507, the BPF 508, the AD converter (A/D) 509, adders 544 and 545, quadrature detection units 546, 547, and 548, low-pass filters (LPFs) 549, 550, and 551, and limiters 552, 553, and 554.

First, the local-phase-difference calculating unit 41b in the embodiment adds together, by using the adders 544 and 545, the local signal Lf2, the local signal Lf3, and the local signal Lf4. A result of this addition is input to the mixer 507. The mixer 507 multipliers together the input addition result and the local signal Lf1. The BPF 508 removes a high frequency component of the multiplied signal and extracts a low frequency component. Note that the BPF 508 can be a low-pass filter. In this processing, frequency components $f_2$, $f_3$, and $f_4$ included in a signal obtained by adding together three local signals are frequency-shifted to a DC (Direct Current) side by $f_1$.

Figure 18:
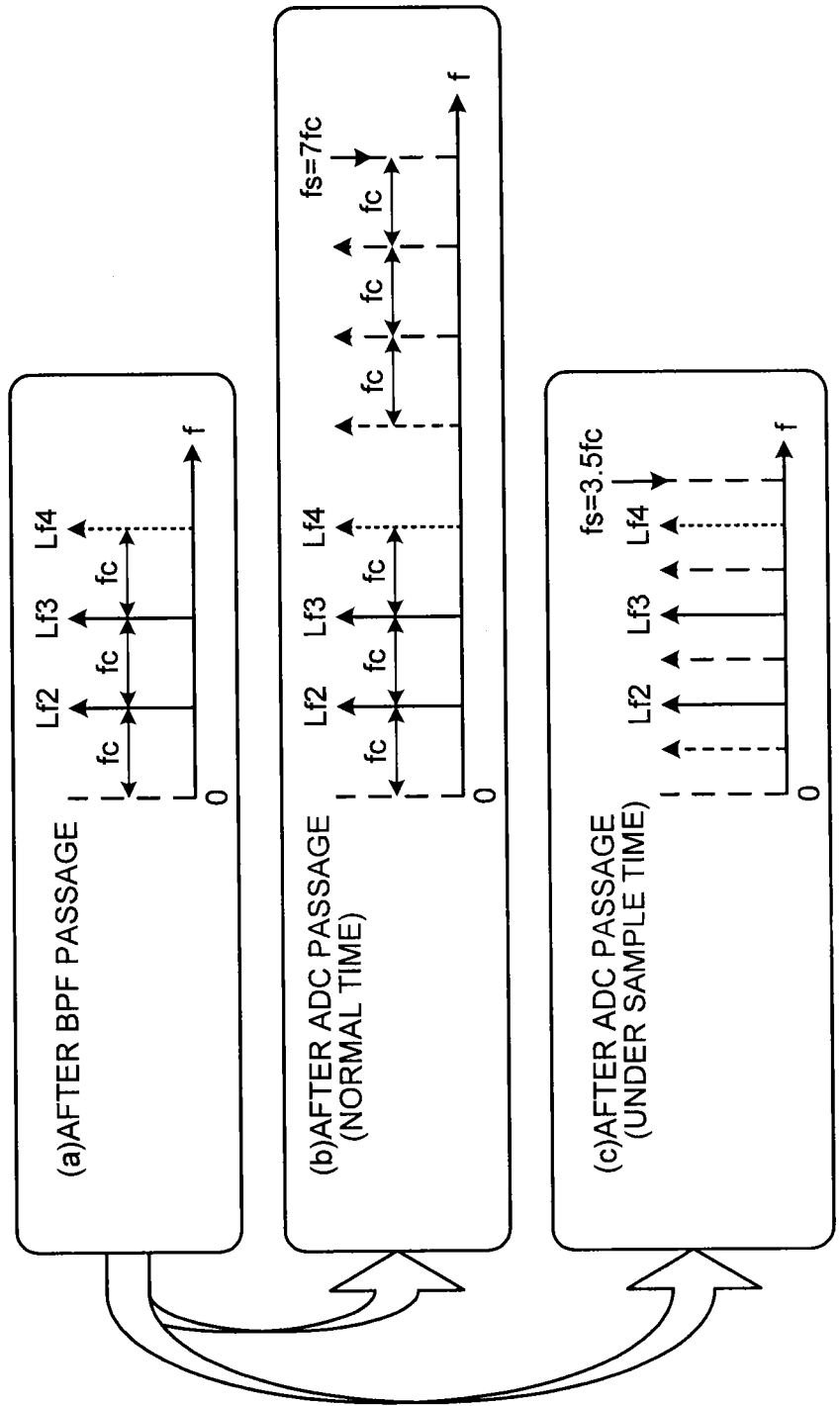
FIG. 18 is a diagram illustrating a sampling process example in the third embodiment.

FIG. 18 is a diagram illustrating a sampling processing example in the embodiment. In FIG. 18(a), an example of a signal spectrum after having passed through the BPF 508 is illustrated. As illustrated in FIG. 18(a), a frequency of Lf2 is converted into $f_C$, a frequency of Lf3 is converted into $2f_C$, and a frequency of Lf4 is converted into $3f_C$. One side bandwidth of a signal after having passed through the BPF 508 is $3f_C$. The AD converter 509 samples a signal illustrated in FIG. 18(a) at sampling speed twice or more as high as the sampling speed in the one side band $3f_C$. In FIG. 18(b), an example of a spectrum in the case of sampling at sampling speed $7f_C$ is illustrated. Dotted line arrows indicate return components of signals.

The quadrature detection unit 546 multiplies Lf2 having the center frequency $f_C$ with a complex local signal $\exp[-j(2\pi f_C t)]$ generated internally and extracts a low frequency component so as to convert Lf2 having the center frequency $f_C$ into a signal having the baseband frequency.

Similarly, the quadrature detection unit 547 multiplies Lf3 having the center frequency $2f_C$ with a complex local signal $\exp[-j(2\pi 2f_C t)]$ generated internally and extracts a low frequency component to convert Lf3 having the center frequency $2f_C$ into a signal having the baseband frequency.

Similarly, the quadrature detection unit 548 multiplies Lf4 having the center frequency $3f_C$ with a complex local signal $\exp[-j(2\pi 3f_C t)]$ generated inside, and extracts a low frequency component to convert Lf4 having the center frequency $3f_C$ into a signal having the baseband frequency.

The local signals converted into the baseband by the local signal Lf1 are output as the phase difference signals $\Delta\theta_{21}$, $\Delta\theta_{31}$, and $\Delta\theta_{41}$ after being reduced in amplitude by the limiters 552, 553, and 554. Operations in the embodiment other than the operations described above are the same as the operations in the second embodiment.

As described above, in the local-phase-difference calculating unit 41b in the embodiment, the sampling speed of the AD converter needs to be set higher than the sampling speed in the first embodiment. However, because the local-phase-difference calculating unit 41b can be configured by one mixer, one band-pass filter (BPF), and one AD converter, it is possible to reduce the analog circuit size. Note that, if an AD converter adaptable to under-sampling mode as well is used, it is also possible to reduce the sampling speed of the AD converter from $7f_C$ to $3.5f_C$ as illustrated in FIG. 18(c). As illustrated in FIG. 18(c), the under-sampling only has to be performed at a frequency at which return components of signals indicated by dotted line arrows do not overlap the main signal components Lf2, Lf3, and Lf4.

Fourth Embodiment

Figure 19:
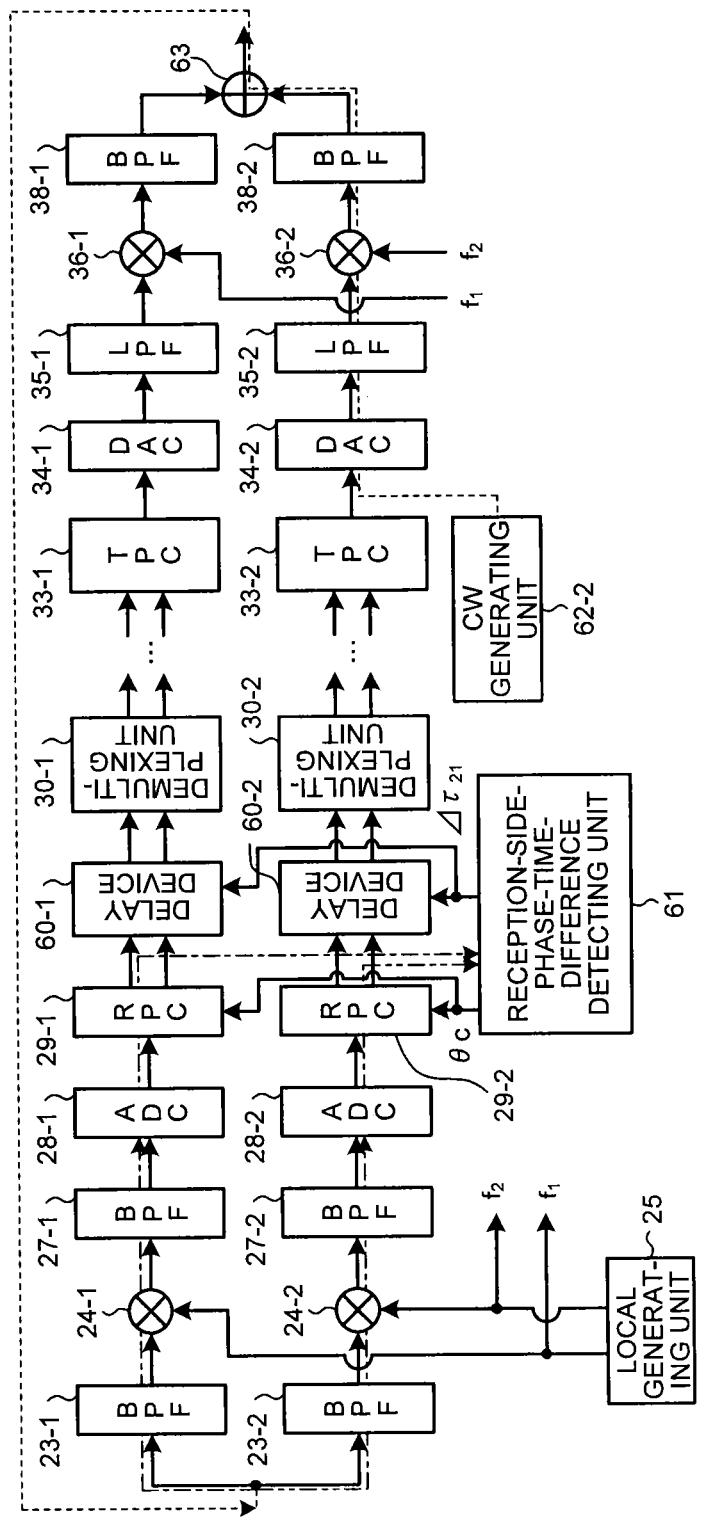
FIG. 19 is a diagram illustrating a configuration example of a relay satellite in a fourth embodiment.
Figure 20:
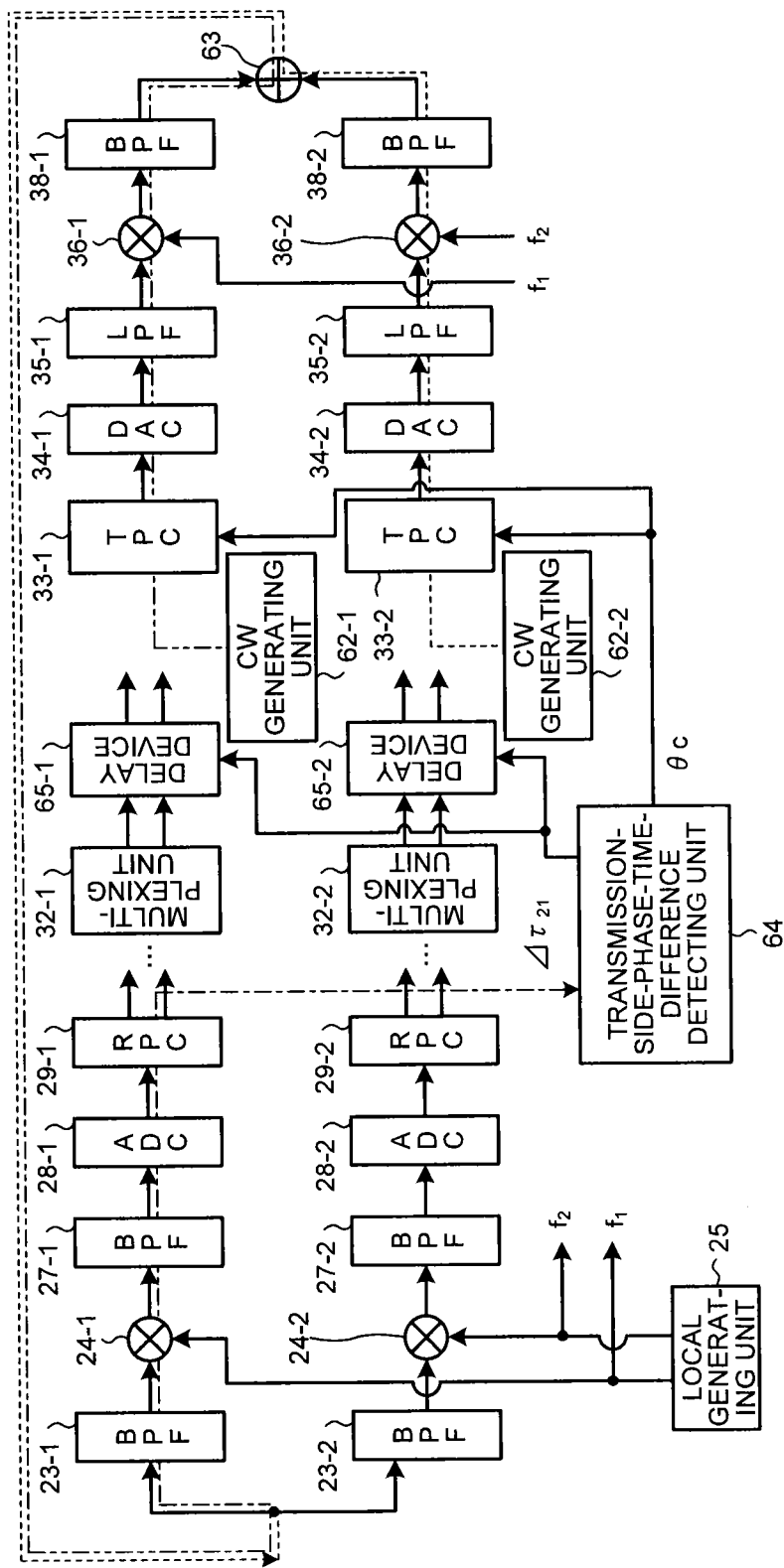
FIG. 20 is a diagram illustrating a configuration example of the relay satellite in the fourth embodiment.

FIGS. 19 and 20 are diagrams of a configuration example of a fourth embodiment of the relay satellite according to the present invention. In FIG. 19, portions related to correction on a reception side are extracted and illustrated. In FIG. 20, portions related to correction on a transmission side are extracted and illustrated. In a relay satellite in the embodiment, the added portions include delay devices 60-1, 60-2, 65-1, and 65-2, a reception-side-phase-time-difference detecting unit (a reception-side-phase-difference detecting unit) 61, non-modulated-signal generating units (CW generating units) 62-1 and 62-2, an adder 63 (in the transmission analog switch matrix 37), and a transmission-side-phase-time-difference detecting unit (a transmission-side-phase-difference detecting unit) 64. Components having functions the same as the functions in the first embodiment are denoted by reference numerals and signs the same as the reference numerals and signs in the first embodiment. Redundant description of the components is omitted.

In the first embodiment to the third embodiment, the configuration for compensating for the dynamic carrier phase fluctuation θ(t) due to phase noise and the like is described. In the embodiment, not only the dynamic carrier phase fluctuation dynamic due to the phase noise and the like but also the phase offset $\theta_C$ described in the first embodiment, a path length difference between ports, and a fixed time difference caused by a delay characteristic and the like are automatically corrected.

Naturally, the fixed time difference can be manually corrected. However, in some case, it is likely that the correction takes time and, even after the fixed time difference is once corrected, phase and time shifts gently occur again in units of hours, months, or years because of aged deterioration and temperature fluctuation. Therefore, in the embodiment, after the dynamic phase fluctuation component θ(t) described in the first embodiment is corrected, the phase and time shifts are automatically corrected.

In the automatic correction, a non-modulated (CW) wave for correction is generated inside the relay apparatus. Therefore, the automatic correction is carried out after an input and an output of a relay signal to and from a relevant port are stopped to put the port in a standby state. In general, the relay satellite does not secure only the number of ports necessary for actual operation. The relay satellite also includes a plurality of auxiliary ports in preparation for a failure. Therefore, when the ports are sequentially put in the standby state to perform correction, the correction is carried out according to a procedure described below to avoid a situation in which a signal relay is suspended by this correction.

(1) A port of a standby system already corrected by correction processing in the embodiment described below is started. A relay signal the same as a relay signal input to a correction target port is input to the port of the standby system according to switch control performed by the reception analog switch matrix 22. The transmission analog switch matrix 37 performs a connection for combining a signal of the correction target port and a signal of the port of the standby system and outputting a combined signal to an antenna. However, the transmission analog switch matrix 37 stops an output of data of the standby system somewhere (e.g., the transmission-phase correcting units 33-1 to 33-N) in digital units to perform control in order to prevent the two signals from being combined.

(2) When the same signal starts to flow to both of the port of the standby system and the correction target port, the transmission analog switch matrix 37 outputs data of the port of the standby system at predetermined timing somewhere (e.g., the transmission-phase correcting units 33-1 to 33-N) in the digital units and stops an output of data of the correction target port. According to this digital switching, signal disconnection does not occur and a signal is shifted from the correction target port to the port of the standby system and relayed.

(3) Thereafter, the reception analog switch matrix 22 selects only the port of the standby system and switches the connection to a connection for not inputting a signal to the correction target port. Similarly, the transmission analog switch matrix 37 switches the connection to a connection for selecting only the port of the standby system.

(4) The correction of the dynamic phase fluctuation θ(t) described in the first embodiment is carried out for the correction target port to which a signal is not input.

(5) Automatic correction for a phase shift and a time shift of the correction target port is carried out on the reception side and the transmission side, respectively, according to a method described below.

(6) After the automatic correction, the same relay signal is relayed to not only the port of the standby system but also to the correction target port according to switch control by the reception analog switch matrix 22. The transmission analog switch matrix 37 performs a connection for combining a signal of the correction target port and a signal of the port of the standby system and outputting a combined signal to the antenna. However, the transmission analog switch matrix 37 stops an output of data of a corrected port somewhere (e.g., the transmission-phase correcting units 33-1 to 33-N) in the digital units to perform control in order to prevent the two signals from being combined.

(7) When the same signal starts to flow to both of the correction target port and the port of the standby system, the transmission analog switch matrix 37 outputs the data of the corrected port at a certain timing inside the digital units (e.g., the transmission-phase correcting units 33-1 to 33-N) and data of the port of the standby system. Due to this digital switching, signal disconnection does not occur and a signal is shifted from the port of the standby system to the corrected port and relayed.

(8) After the process of (7) described above, the reception analog switch matrix 22 selects only the corrected port and switches the connection to connection for not inputting a signal to the port of the standby system. Similarly, the transmission analog switch matrix 37 switches the connection to connection for selecting only the corrected port.

Phase and time differences between the ports are sequentially automatically corrected according to the procedure above. Consequently, it is possible to prevent a signal to be relayed from being interrupted. In the example described above, the procedure for once shifting the relay signal from the correction target port to the standby system port and returning the relay signal after the correction is adopted. However, as the relaying of a signal to the standby system port is already stopped, correction of the standby system port can be carried out anytime irrespective of the procedure.

Note that there is also a method of, on an operation system side, allocating a signal to be relayed to another frequency band or stopping the signal being relayed and eliminating a signal in a signal band treated by the correction target port and then switching the correction target port to the port of the standby system and relaying the signal again. In this case, although operation limitation occurs because the signal to be relayed is once stopped, the switching procedure of the relay can be simplified. Further, even when a port of a main system is broken down and it is necessary to cause the port of the standby system to always operate, the signal to be relayed is once stopped and this automatic correction is performed.

Details of the automatic correction in the embodiment are described below.

A phase difference and a time difference between the ports occur at two places described below.

(P1) A section from an input end of the reception analog switch matrix 22 to the AD converters 28-1 to 28-N

(P2) A section from the DA converters 34-1 to 34-N to an output end of the transmission analog switch matrix 37

For example, between the reception ports 15-1 and 15-2 (or the transmission ports 39-1 and 39-2) illustrated in FIG. 2 and FIG. 3, a phase difference $\theta_C$ and time delay differences $\Delta\tau_{21}$ and $\Delta\tau_{43}$ occur as described in (A) and (B) below. When the phase difference and the time delay differences are large, as a phase difference between signals, a decrease in an S/N (Signal to Noise ratio) is caused when both the signals are combined.

(A) A phase difference ($-\theta_C$) that occurs between the demultiplexing units 30-1 and 30-2 on the reception side after the dynamic phase fluctuation θ(t) is corrected, and a time delay difference $\Delta\tau_{21}$ ($=\tau_1-\tau_2$), which is a difference between a propagation time $\tau_1$ from the input end of the reception analog switch matrix 22 (=BPF 14-1) to the AD converter 28-1 and a propagation time $\tau_2$ from the input end of the reception analog switch matrix 22 (=BPF 14-1) to the AD converter 28-2.

(B) A phase difference ($+\theta_C$) that occurs between the BPFs 38-1 and 38-2 on the transmission side after the dynamic phase fluctuation θ(t) is corrected, and a time delay difference $\Delta\tau_{43}$ ($=\tau_3-\tau_4$), which is a difference between a propagation time $\tau_3$ from the DA converter 34-1 to the output end of the transmission analog switch matrix 37 (=an input end of the transmission antenna 40-1) and a propagation time $\tau_4$ from the DA converter 34-2 to the output end of the transmission analog switch matrix 37 (=the input end of the transmission antenna 40-1).

In the following description, first, a correction method of (A) above is described, and then a correction method of (B) above is described with reference to correction between a first port and a second port as an example.

<Time Delay Difference Correction Between Reception Ports (the Correction Method of (A) Above)>

After the reception ports 15-1 and 15-2 are switched to the standby state according to the procedure (1) to (3) described above, the non-modulated-signal generating unit 62-2 generates a complex non-modulated signal $\exp[j(2\pi(-0.5f_C)t)]$ having $-0.5f_C$. To detect a time difference described below, this complex non-modulated signal having $-0.5f_C$ is a burst-like signal for cyclically stopping a signal output.

Figure 21:
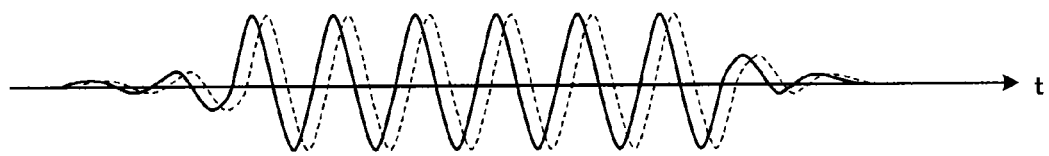
FIG. 21 is a diagram illustrating an example of a complex non-modulated signal waveform.
Figure 22:
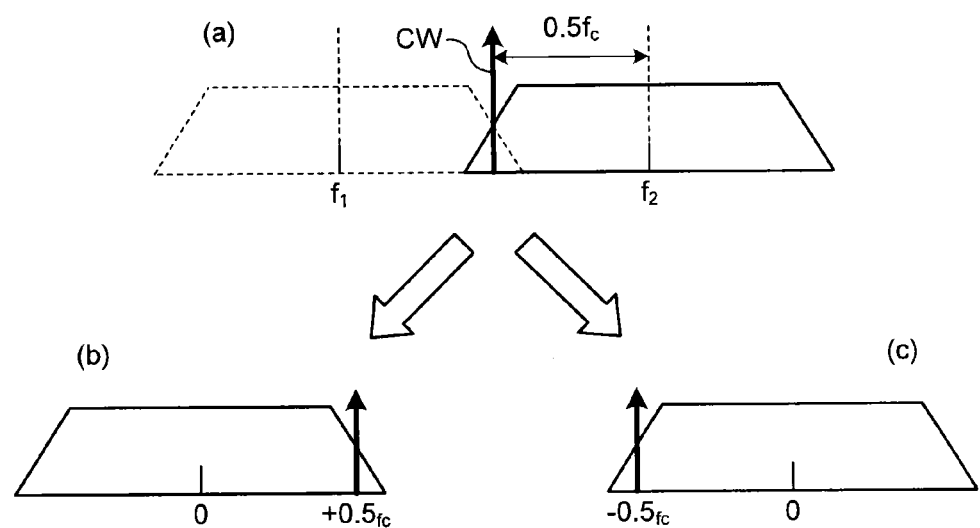
FIG. 22 is a diagram illustrating a flow of processing of a complex non-modulated signal for reception side correction.

FIG. 21 is a diagram illustrating an example of a waveform of this complex non-modulated signal. A solid line indicates a real number component (a cosine component) and a dotted line indicates an imaginary number component (a sine component). As illustrated in FIG. 21, during a signal stop and signal generation, build-up/build-down of signal amplitude can be performed gently so as to reduce harmonics of the signal occurring to some degree. The complex non-modulated signal waveform is not limited to the example illustrated in FIG. 21. FIG. 22 is a diagram illustrating a flow of processing for a complex non-modulated signal for reception side correction.

The complex non-modulated signal generated by the non-modulated signal generating unit 62-2 is up-converted in the mixer 36-2 using the local signal Lf2 and frequency-converted into a center frequency $f_2-0.5f_C$ ($f_1+0.5f_C$) as indicated by a spectrum illustrated in FIG. 22(a) at an output end of the adder 63.

A signal output from the adder 63 on the inside of the transmission analog switch matrix 37 is input to the input end of the reception analog switch matrix 22 (=an output end of the BPF 14-1).

The non-modulated signal having the center frequency $f_2-0.5f_C$ input to the input end of the reception analog switch matrix 22 (=the output end of the BPF 14-1) is divided into two non-modulated signals in the reception analog switch matrix 22. One non-modulated signal passes through a path of the BPF 23-1 to the mixer 24-1, to the BPF 27-1, and to the AD converter 28-1. A signal spectrum at an input point of the AD converter 28-1 at this point is illustrated in FIG. 22(b). The other non-modulated signal passes through a path of the BPF 23-2 to the mixer 24-2, to the BPF 27-2, and to the AD converter 28-2. A signal spectrum at an AD input point at this point is illustrated in FIG. 22(c).

The two non-modulated signals that pass through the two paths are respectively subjected to phase fluctuation correction in the reception-phase correcting units 29-1 and 29-2 and thereafter input to the reception-side-phase-time-difference detecting unit 61. The reception-side-phase-time-difference detecting unit 61 calculates the phase difference $\theta_C$ between the two non-modulated signals and the time difference $\Delta\tau_{21}$ ($=\tau_1-\tau_2$) between the reception port 15-1 and the reception port 15-2.

The delay devices 60-1 and 60-2 perform, on the basis of information concerning the time difference $\Delta\tau_{21}$ obtained by the reception-side-phase-time-difference detecting unit 61, time delay adjustment for a signal for cancelling the time difference between the ports. The phase difference $\theta_C$ obtained by the reception-side-phase-time-difference detecting unit 61 is given to the reception-phase correcting units 29-1 and 29-2 as a correction value for cancelling the phase difference $\theta_C$. Note that time delay processing can be performed using digital signal processing. Therefore, the time delay processing can be easily and accurately realized. Correction of a time delay can be realized by a digital filter such as an interpolation filter that interpolates sampled data to M-fold or a multiphase filter that further curtails interpolated data at the original sampling speed.

Figure 23:
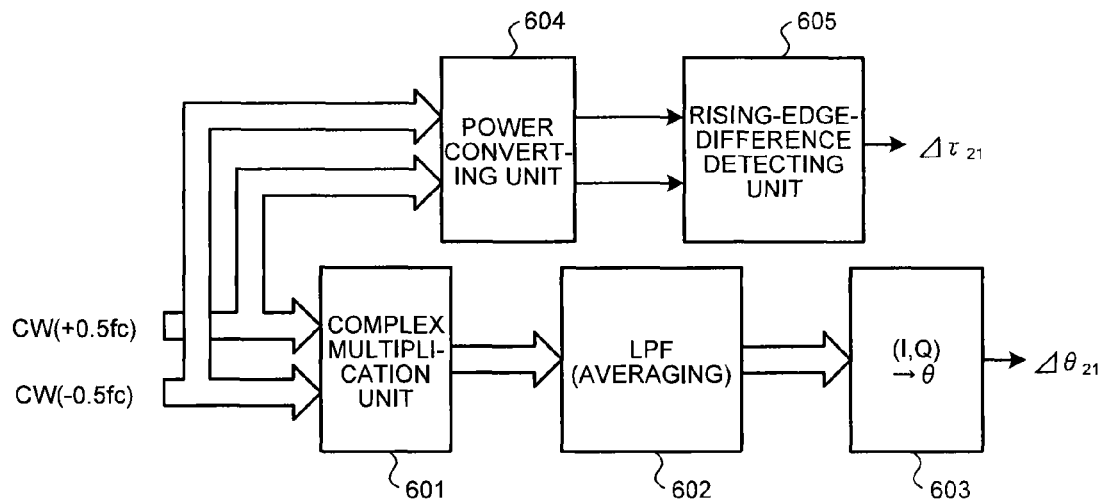
FIG. 23 is a diagram illustrating a configuration example of a reception-side-phase-time-difference detecting unit in a fourth embodiment.

FIG. 23 is a diagram illustrating a configuration example of the reception-side-phase-time-difference detecting unit 61 in the embodiment. As illustrated in FIG. 23, the reception-side-phase-time-difference detecting unit 61 includes a complex multiplication unit 601, a low-pass filter 602, a polar-coordinate converting unit (I, Q to phase $\theta$) 603, a power converting unit 604, and a rising-edge-difference detecting unit 605.

A complex non-modulated signal input from the reception-phase correcting unit 29-1 (the reception port 15-1) to the reception-side-phase-time-difference detecting unit 61 is represented as $CW(+0.5f_C)$; and a complex non-modulated signal input from the RPC 29-2 (the reception port 15-2) to the reception-side-phase-time-difference detecting unit 61 is represented as $CW(-0.5f_C)$.

When there is no phase difference between the ports, a relation between a phase $\theta_1(t)$ of $CW(+0.5f_C)$ and a phase $\theta_2(t)$ of $CW(-0.5f_C)$ is $\theta_1(t)=-\theta_2(t)$. In this case, a signal vector angle after both the phases are multiplied together by the complex multiplication unit 601 and averaged by the low-pass filter 602 indicates 0 (zero).

Figure 24:
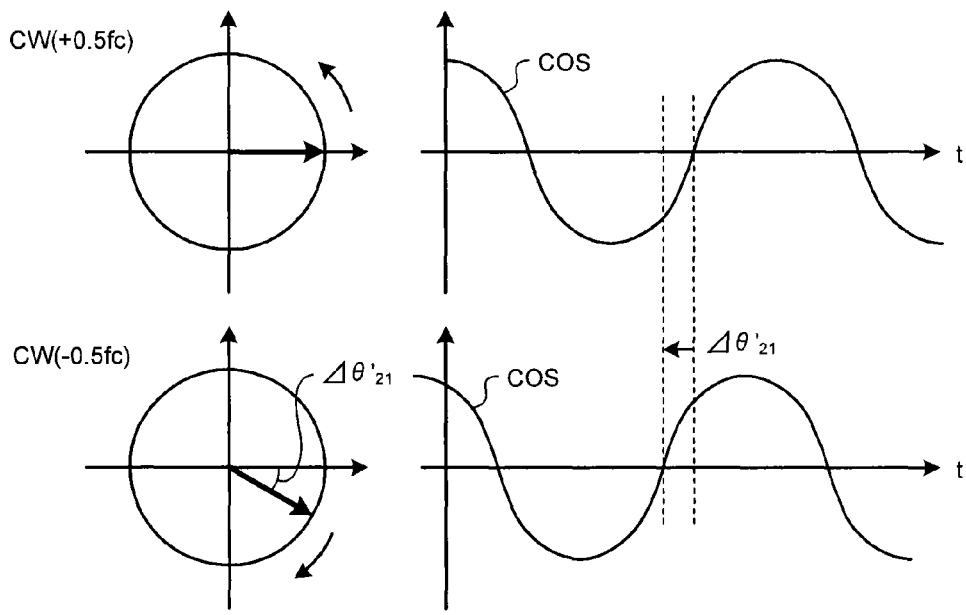
FIG. 24 is a diagram illustrating a waveform example of non-modulated signals in the fourth embodiment.

Alternatively, when a phase difference occurs between the ports and the relation between the phase $\theta_1$ of $CW(+0.5f_C)$ and the phase $\theta_2$ of $CW(-0.5f_C)$ is $\theta_1(t)=-\theta_2(t)+\Delta\theta'_{21}$ as illustrated in FIG. 24, a vector angle of a signal obtained by the reception-side-phase-time-difference detecting unit 61 indicates $\Delta\theta'_{21}$. FIG. 24 is a diagram illustrating a waveform example of non-modulated signals in the embodiment. The phase offset $\theta_C$ on the reception side described in the first embodiment corresponds to this $\Delta\theta'_{21}$.

As described above, the reception-side-phase-time-difference detecting unit 61 calculates the signal vector angle $\Delta\theta'_{21}$ after being averaged by the low-pass filter 602 and outputs the signal vector angle $\Delta\theta'_{71}$ to the reception-phase correcting unit 29-1. Note that the non-modulated signals arrive in a burst-like manner. Therefore, a control for performing the calculation in time when the amplitude of the non-modulated signals is sufficiently large and not performing, because an error occurs, the calculation in time when a signal is absent can be adopted.

Because the complex non-modulated signals $CW(+0.5f_C)$ and $CW(-0.5f_C)$ arrive in a burst-like manner, the reception-side-phase-time-difference detecting unit 61 calculates electric power of the complex non-modulated signals and calculates, as rising edge times, times ($t_1$, $t_2$) when power data exceed a certain threshold to detect time difference information $\Delta\tau 21$ ($=t_2-t_1$) between the times.

Note that it is also possible that, in the detection of a rising edge, power data obtained at a sampling cycle of a clock is digitally interpolated to, for example, dozens of times as high as the clock speed to increase sampling speed and then edge detection of the power data is performed so as to increase accuracy of edge detection time.

As described above, the relay apparatus in the embodiment is configured to perform the compensation of the local phase fluctuation described in the first to third embodiments; and to input a common non-modulated wave to a frequency position in a boundary simultaneously passing two ports on the reception side and detect and correct a phase difference and a time difference between the ports on the reception side in the digital units. Therefore, it is possible to realize automatic correction of a time delay difference between the ports on the reception side with accurate and fine phases and time resolutions by the digital processing while minimizing the addition of analog elements.

In the example described above, the signals before input to the delay devices 60-1 and 60-2 are connected to the reception-side-phase-time-difference detecting unit 61 to calculate $\Delta\tau_{21}$. However, it is also possible that signals output from the delay devices 60-1 and 60-2 are connected to the reception-side-phase-time-difference detecting unit 61; and a time difference detected by the reception-sidephase-time-difference detecting unit 61 is gradually corrected by feedback (loop) control. In this case, as in the case described above, time correction for cancelling $\Delta\tau_{21}$ is finally realized.

<Time Delay Difference Correction Between the Transmission Ports (the Correction Method of (B) Above)>

Figure 25:
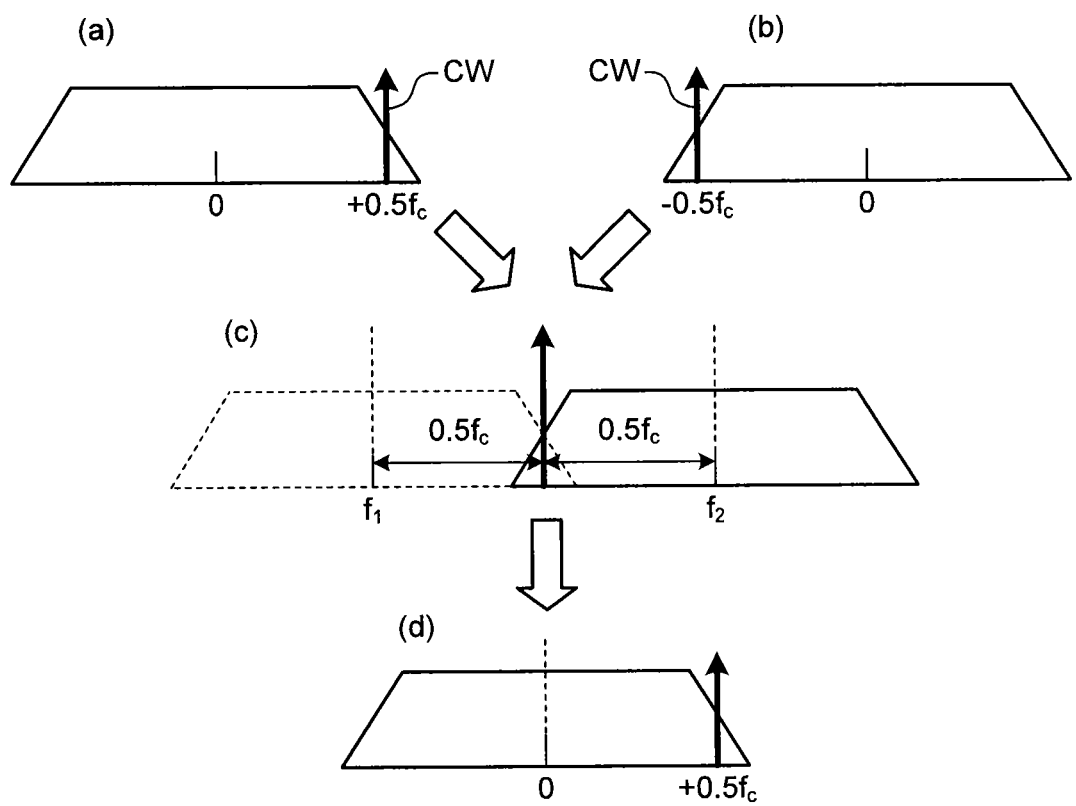
FIG. 25 is a diagram illustrating the flow of the processing of a CW signal for transmission side correction in the fourth embodiment.

FIG. 25 is a diagram illustrating the flow of a process for CW signals for transmission side correction in the embodiment. In the procedure of (1) to (3) above, after the transmission port 39-1 and the transmission port 39-2 are switched to the standby state, the non-modulated-signal generating unit 62-1 generates a complex non-modulated signal $\exp[j(2\pi(+0.5f_C)t)]$ having $+0.5f_C$. In FIG. 25(*a*), a spectrum of this complex non-modulated signal is illustrated. In this case, a signal is not output from the other non-modulated-signal generating unit 62-2.

The complex non-modulated signal having $+0.5f_C$ is also a burst-like signal for cyclically stopping a signal output to detect a time difference described below. The complex non-modulated signal is up-converted using the local signal Lf1 in the mixer 36-1 and input to the adder 63. A spectrum of a complex non-modulated signal after up-convert at an output end of the adder 63 is illustrated in FIG. 25(*c*). As illustrated in FIG. 25(*c*), this complex non-modulated signal is frequency-converted into a center frequency $f_1+0.5f_C$ ($=f_2-0.5f_C$).

In the relay apparatus in the embodiment, in correction on the transmission side, a signal output from the adder 63 on the inside of the transmission analog switch matrix 37 is input to the input end of the reception analog switch matrix 22 (the output end of the BPF 14-1).

The non-modulated signal having the center frequency $f_1+0.5f_C$ input to the input end of the reception analog switch matrix 22 (the output end of the BPF 14-1) is connected to the BPF 23-1 by the reception analog switch matrix 22. Therefore, this non-modulated signal is input to the reception-phase correcting unit 29-1 passing through a path of the BPF 23-1 to the mixer 24-1, to the BPF 27-1, and to the AD converter 28-1. A signal spectrum before input to the AD converter 28-1 is illustrated in FIG. 25(*d*). As illustrated in FIG. 25(*d*), this signal is a signal having a center frequency $+0.5f_C$. Further, this non-modulated signal is input to the transmission-side-time-difference detecting unit 64 after being subjected to phase fluctuation correction in the reception-phase correcting unit 29-1. The transmission-side-time-difference detecting unit 64 performs a complex multiplication with the input signal and a complex non-modulated signal (a free-running complex non-modulated signal) $\exp[j(2\pi(-0.5f_C)t)]$ having the frequency $-0.5f_C$ generated in the transmission-side-time-difference detecting unit 64.

Figure 26:
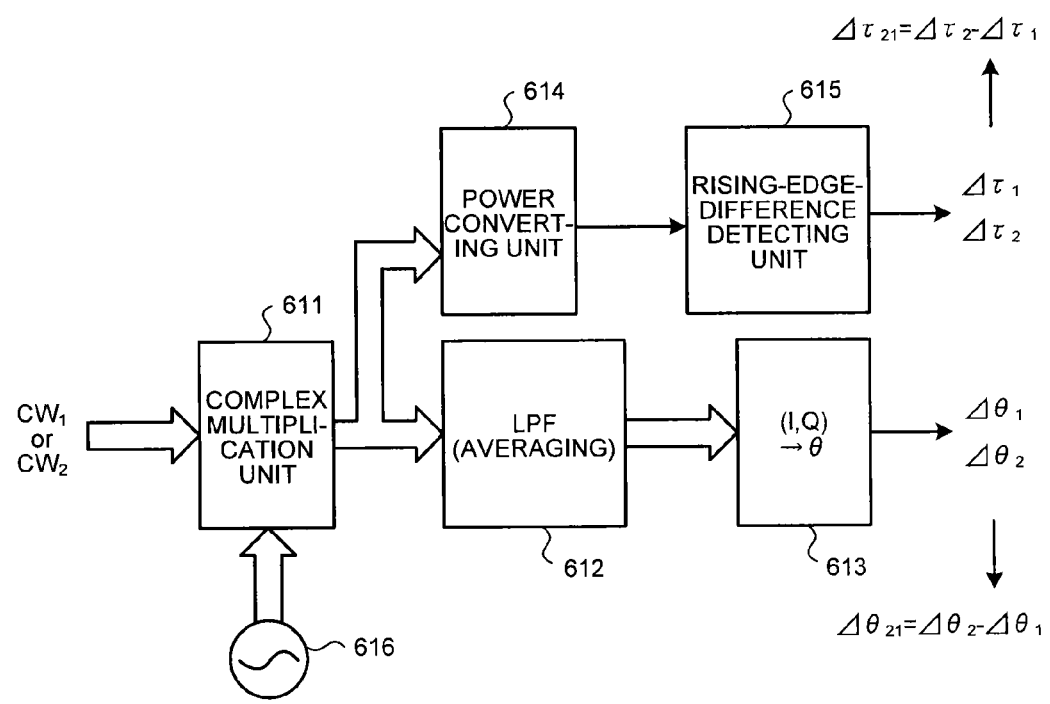
FIG. 26 is a diagram illustrating a configuration example of a transmission-side-phase-time-difference detecting unit in the fourth embodiment.

FIG. 26 is a diagram illustrating a configuration example of the transmission-side-phase-time-difference detecting unit 64 in the embodiment. The transmission-side-phase-time-difference detecting unit 64 in the embodiment includes a complex multiplication unit 611, a low-pass filter 612, a polar-coordinate converting unit (I, Q to phase θ) 613, a power converting unit 614, a rising-edge-difference detecting unit 615, and a free-running-complex-non-modulated-signal generating unit 616.

The complex multiplication unit 611 multiplies together a signal input from the reception-phase correcting unit 29-1 and a free-running complex non-modulated signal generated by the free-running-complex-non-modulated-signal generating unit 616. The low-pass filter 612 averages a signal after the multiplication by the complex multiplication unit 611. A vector angle of the averaged signal corresponds to a difference between a phase of the free-running complex non-modulated signal and a non-modulated signal phase input to the transmission-side-phase-time-difference detecting unit 64 through the transmission port 39-1 to the reception port 15-1. In the transmission-side-phase-time-difference detecting unit 64, the polar-coordinate converting unit 613 calculates this vector angle and retains the vector angle as phase difference information $\Delta\theta_1$. Note that the complex non-modulated signals arrive in a burst-like manner. Therefore, such control can be adopted as to perform the calculation described above when the amplitude of the complex non-modulated signals is sufficiently large but as to not perform the calculation when a signal is absent because an error occurs.

In the transmission-side-phase-time-difference detecting unit 64, the power converting unit 614 subjects an output signal of the complex multiplication unit 611 to power conversion. The rising-edge-difference detecting unit 615 records the time when power data exceeds a certain threshold, as rising edge time $t_1$. At this point, the rising-edge-difference detecting unit 615 also records time $t_0$ when reception of a complex non-modulated signal from the non-modulated-signal generating unit 62-1 is started, calculates a difference between the times $(t_1-t_0)$, and records a result of the calculation as $\Delta\tau_1$.

Subsequently, the non-modulated-signal generating unit 62-1 stops the transmission of the complex non-modulated signal. The other non-modulated-signal generating unit 62-2 generates a complex non-modulated signal of $\exp[j(2\pi(-0.5f_C)t)]$ having $-0.5f_C$. A spectrum of this signal is illustrated in FIG. 25(*b*). This complex non-modulated signal is up-converted by the mixer 36-2 using the local signal LF2 and frequency-converted into a center frequency $f_2-0.5f_C$ at the output end of the adder 63 as illustrated in FIG. 25(*c*).

A signal output from the adder 63 on the inside of the transmission analog switch matrix 37 is input to an input end of the reception analog switch matrix 22 (=the output end of the BPF 14-1).

The relay apparatus in the embodiment connects, to the BPF 23-1 by the reception analog switch matrix 22, a non-modulated signal having the center frequency $f_2-0.5f_C$ ($=f_1+0.5f_C$) input to the input end of the reception analog switch matrix 22 (=the output end of the BPF 14-1) in the correction on the transmission side. Therefore, this non-modulated signal is also input to the RPC 29-1 passing through a path of the BPF 23-1 to the mixer 24-1, to the BPF 27-1, and to the AD converter 28-1. A signal spectrum before input to the AD converter 28-1 is a center frequency $+5f_C$ as illustrated in FIG. 25(*d*). This non-modulated signal is input to the transmission-side-phase-time-difference detecting unit 64 after having been subjected to phase fluctuation correction in the RPC 29-1. The transmission-side-phase-time-difference detecting unit 64 performs a complex multiplication with the input signal with a complex non-modulated signal (a free-running complex non-modulated signal) $\exp[j(2\pi(-0.5f_C)t)]$ having a frequency $-0.5f_C$ generated inside. A vector angle of a signal obtained by averaging a result of the multiplication with the low-pass filter 612 corresponds to a difference between a phase of the free-running complex non-modulated signal and a non-modulated signal phase input to the transmission-side-phase-time-difference detecting unit 64 through the transmission port 39-2 to the reception port 15-1. The transmission-side-phase-time-difference detecting unit 64 retains information concerning this phase difference as $\Delta\theta_2$. Note that the complex non-modulated signals arrive in a burst-like manner. Therefore, a control can be configured such that the calculation is performed when the amplitude of the complex non-modulated signals is sufficiently large but is not performed when a signal is absent because an error occurs.

In the transmission-side-phase-time-difference detecting unit 64, the power converting unit 614 subjects an output signal of the complex multiplication unit 611 to power conversion. The rising-edge-difference detecting unit 615 records the time when power data exceeds a certain threshold as rising edge time $t_3$. At this point, the rising-edge-difference detecting unit 615 also records the time $t_2$ when reception of the complex non-modulated signal from the non-modulated-signal generating unit 62-2 is started; calculates a difference $(t_3-t_2)$ between the times; and records a result of the calculation as $\Delta\tau_2$.

Based on a difference between $\Delta\theta_1$ that is obtained via the transmission port 39-1 and the reception port 15-1 and $\Delta\theta_2$ that is obtained via the transmission port 39-2 and the reception port 15-1 as described above, a phase difference can be obtained between the transmission port 39-1 and the transmission port 39-2. That is, the transmission-side-phase-time-difference detecting unit 64 can obtain, as phase difference information $\Delta\theta_{21}$, a result obtained by performing subtraction of $\Delta\theta_2$ and $\Delta\theta_1$.

The phase offset $\theta_C$ on the transmission side described in the first embodiment corresponds to this $\Delta\theta_{21}$. The transmission-side-phase-time-difference detecting unit 64 gives a value for cancelling this phase difference information $\Delta\theta_{21}$ to the transmission-phase correcting unit 33-2.

The transmission-side-phase-time-difference detecting unit 64 calculates a time difference $\Delta\tau_{21}$ ($=\Delta\tau_2-\Delta\tau_1$) between the port 39-1 and the port 39-2 on the transmission side. The delay devices 65-1 and 65-2 perform, on the basis of the time difference information $\Delta\tau_{21}$ obtained by the transmission-side-phase-time-difference detecting unit 64, time delay adjustment for a signal for cancelling a time difference between the ports. Because the time delay can be performed in digital signal processing, it is possible to easily and accurately realize the time delay adjustment. Note that, like the delay devices 60-1 and 60-2, the delay devices 65-1 and 65-2 are configured by an interpolation filter or a multiphase filter.

As described above, the relay apparatus in the embodiment is configured to perform the compensation for the local phase fluctuation described in the first to third embodiments; to input a non-modulated wave to a frequency located in a boundary that can pass both of the two ports on the transmission side; and to detect and correct a phase difference and a time delay difference between the ports on the transmission side in the digital units. Therefore, it is possible to realize automatic correction of a time delay difference between the ports on the reception side at accurate and fine time resolutions by the digital processing while minimizing the addition of analog elements.

Note that a sign of the phase offset $\theta_C$ is different on the reception side and the transmission side ($-\theta_C$, $+\theta_C$). However, an absolute value of the phase offset $\theta_C$ is the same on the reception side and the transmission side. Therefore, this phase offset can be calculated by any one of the reception-side-phase-time-difference detecting unit 61 and the transmission-side-phase-time-difference detecting unit 64 and can be used in common on the transmission side and the reception side with only the sign reversed. In this case, the circuit size for calculating a phase offset can be reduced.

The non-modulated-signal generating unit 62-1 and the non-modulated signal generating unit 62-2 do not simultaneously generate signals. Therefore, the non-modulated-signal generating units can be integrated as one non-modulated-signal generating unit. In this case, the non-modulated-signal generating unit only has to be extended to a function capable of switching a frequency to $+0.5f_C$ when a complex non-modulated signal is supplied to the transmission port 39-1 and switching the frequency to $-0.5f_C$ when the complex non-modulated signal is supplied to the transmission port 39-2. Note that the frequency is reversed from positive to negative simply by reversing the sign of a quadrature component of the complex non-modulated signal. Therefore, the extension of this function is easy.

Note that, in the above description of this example, in both of the time difference correction on the reception side and the time difference correction on the transmission side, the time delay difference between the first port and the second port is corrected. However, similarly, a time delay difference can be corrected between ports such as the second port (the reception port 15-2 or the transmission port 39-2) and the third port (the reception port 15-3 or the transmission port 39-3), or the third port and the fourth port. In this case, a delay device is necessary for each of the ports. However, the non-modulated-signal generating units 62-1 and 62-2 and the reception-side-phase-time-difference detecting unit 61 can be used in common.

Given that a certain port (e.g., the reception port 15-1) is set as a reference and the time differences between the certain port and each ports can be calculated on the basis of the time difference information $\Delta\tau_{21}$, $\Delta\tau_{32}$, $\Delta\tau_{43}$, . . . . Therefore, it is possible to control the time differences regarding all the ports such that they are zero.

Note that, in the example described in the embodiments, the phase difference and the time delay difference between the ports on the reception side or the transmission side are detected and corrected by the digital units. However, it is not always necessary to detect and correct both of the phase difference and the time delay difference. When the time delay difference is sufficiently small, only a phase has to be corrected. In this case, because the circuit for calculating the time delay difference and the delay devices can be reduced, it is possible to further reduce the circuit size.

In the first to fourth embodiments, the application example to the relay satellite is described. However, it is possible to realize an increase in a band of a radio device by applying the relay apparatus in the embodiment to a radio relay device, a radio base station, or a radio terminal on the ground in the same manner.

Fifth Embodiment

A relay apparatus in a fifth embodiment is described here. In the embodiments described above, the connecting unit 31 is described as the digital switch matrix. However, the relay apparatus can be configured to include a reception digital beam forming (DBF) function and a transmission DBF function in front of or behind the connecting unit 31. By adopting this configuration, in addition to the effect of relaying a wideband signal, it is also possible to realize high antenna directivity that prevents signals having the same frequency from interfering with each other even if beam areas are brought close to each other.

Figure 27:
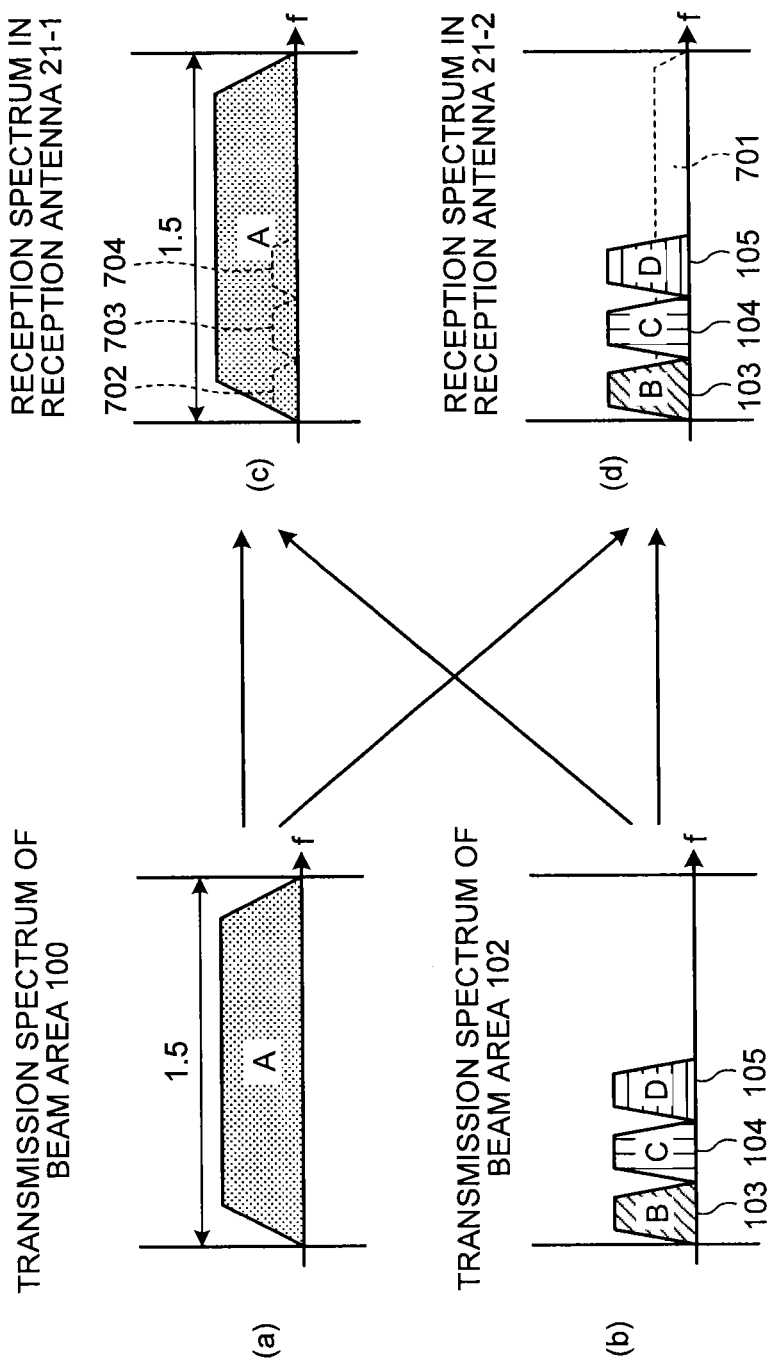
FIG. 27 is a diagram illustrating a state of the same frequency interference that occurs when beam areas are brought close to each other.

FIG. 27 is a diagram illustrating a state where the interference is due to the same frequencies and that occurs when the two beam areas 100 and 102 (the wideband beam area 100 and the narrowband beam area 102) described in the second embodiment are brought close to each other. In FIG. 27, the wideband signal A from the beam area 100 indicated by (a) and narrowband signals {B, C, D} from the beam area 102 indicated by (b) use the same frequency band. Therefore, when the beam area 100 and the beam area 102 are brought close to each other, as illustrated in (c) in FIG. 27, the antenna 21-1 of the relay satellite 200 not only receives the wideband signal A but also receives the narrowband signals {B, C, D} from the beam area 102 at low levels.

Signals 702, 703, and 704 illustrated in (c) in FIG. 27 are components of the narrowband signals {B, C, D} from the beam area 102 and are received at low levels in the antenna 21-1. The signals 702, 703, and 704 are interference components for the wideband signal A and cause deterioration in communication quality.

Similarly, when the beam area 100 and the beam area 102 are brought close to each other, as illustrated in (d) in FIG. 27, the antenna 21-2 of the relay satellite 200 not only receives the narrowband signals {B, C, D} from the beam area 102 but also receives the wideband signal A from the beam area 100 at a low level.

A signal 701 illustrated in (d) in FIG. 27 is a component of the wideband signal A from the beam area 100 received at a low level in the antenna 21-2. The signal 701 is an interference component for the narrowband signals {B, C, D} and causes deterioration in communication quality.

Figure 28:
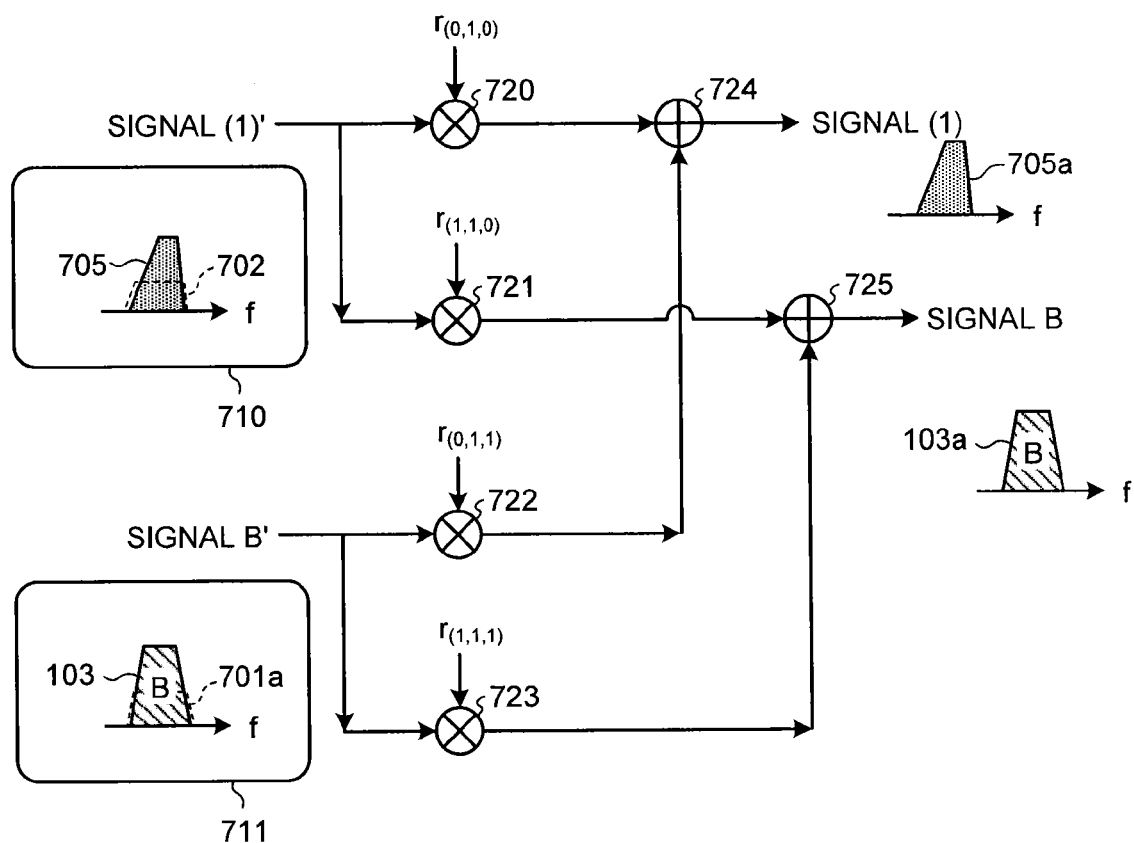
FIG. 28 is a diagram illustrating an example of reception DBF processing in a fifth embodiment.

The problems described above are solved by providing the reception DBF function. Reception DBF processing by the reception DBF function is applied to signals decomposed by the demultiplexing units 30-1 to 30-N. FIG. 28 is a diagram illustrating an example of reception DBF processing in the embodiment.

In FIG. 28, an input signal (1)' (=a signal 710 in FIG. 28) is a signal input from the demultiplexing unit 30-1 to the reception DBF function and is a signal obtained by adding a low-level signal B (the signal 702) to the signal (1) (=a part of the wideband signal A) illustrated in FIG. 7 in the first embodiment.

An input signal B' (=a signal 711 in FIG. 28) is a signal input from the demultiplexing unit 30-3 to the reception DBF function and is a signal obtained by adding the low-level signal (1) (=a part of the wideband signal A) (a signal 701a) to the narrowband signal B.

Here, given that beam numbers input to the reception DBF function are represented as k(∈{0, 1, 2, . . . , K−1}); numbers of sub-channel signals demultiplexed by the demultiplexing units are represented as j(∈{0, 1, 2, . . . , J−1}); beam numbers at output destinations are represented as i{∈{0, 1, 2, . . . , I−1}}; baseband input signals are represented as $D_{(j,k)}$; and reception complex DBF coefficients are represented as $r_{(i,j,k)}$. Then, baseband signals $R_{(i,j)}$ after the reception DBF processing are expressed by the following Expression (35):

$$R_{(i,j)} = \sum_{k=0}^{K-1} (D_{(j,k)} \times r_{(i,j,k)}) \quad (35)$$

In an example illustrated in FIG. 28, reception DBF processing (two inputs and two outputs) of a signal (1)' equivalent to a sub-channel number j=1 from the beam area 100 and a signal B' equivalent to the sub-channel number j=1 from the beam area 102 is illustrated.

When a number of the beam area 100 is represented as k=0 and a number of the beam area 102 is represented as k=1, signals after the reception DBF processing are expressed by the following Expressions (36) and (37).

$$R_{(0,1)} = D_{(1,0)} \times r_{(0,1,0)} + D_{(1,1)} \times r_{(0,1,1)} \quad (36)$$

$$R_{(1,1)} = D_{(1,0)} \times r_{(1,1,0)} + D_{(1,1)} \times r_{(1,1,1)} \quad (37)$$

In the expressions, $D_{(1,0)}$ corresponds to the signal (1)', $D_{(1,1)}$ corresponds to the signal B', $R_{(0,1)}$ corresponds to the signal (1) after the DBF processing indicated by 705a in FIG. 28, and $R_{(1,1)}$ corresponds to the signal B after the DBF processing indicated by 103a in FIG. 28.

The operation principle of the reception DBF processing in the embodiment is described with reference to the example illustrated in FIG. 28. In FIG. 28, an example is illustrated in which the signal 702, which is a small component of the signal B and mixed in the signal (1)', is cancelled using the signal B included in the signal B'. Specifically, the signal (1)' and the signal B' are respectively multiplied with reception DBF coefficients by complex multipliers 720 and 722. Signals after the multiplication are subjected to vector combination by an adder 724. Consequently, as indicated by a signal 705a in FIG. 28, the signal 702, which is a small component of the signal B, is removed from the signal (1)'. Note that, in a process of this interference removal, the reception DBF coefficients are set such that the signal (1) of 705a has amplitude and a phase that is the same as the amplitude and the phase of the signal 705 included in the signal 710.

Similarly, in FIG. 28, an example is illustrated in which the signal 701a, which is a small component of the signal (1), mixed in the signal B' is cancelled using the signal (1) included in the signal (1)'. Specifically, the signal (1)' and the signal B' are respectively multiplied with reception DBF coefficients by complex multipliers 721 and 723 and then subjected to vector combination by an adder 725. Consequently, as indicated by a signal 103a illustrated in FIG. 28, the signal 701a, which is a small component of the signal (1), is removed from the signal B. Note that, in a process of this interference removal, the reception DBF coefficients are set such that the signal B of the signal 103a has amplitude and a phase that are the same as the amplitude and the phase of the signal 103 included in the signal 711.

A system can be adopted in which these reception DBF coefficients $r_{(i,j,k)}$ are calculated by the control station 110 on the ground, which obtains the positions of ground stations and the position of the relay satellite, and are given to the relay satellite 200 through a separate line. In that case, the control station 110 can collect input data before the DBF processing partially from the relay satellite 200 through a separate line and use the input data for coefficient calculation of the reception DBF.

Alternatively, rather than the control station 110, the relay satellite 200 itself can carry out the coefficient calculation of the reception DBF. In this case, the computational complexity of the relay satellite 200 increases. However, compared with controlling the coefficient calculation with the control station 110 on the ground, it is possible to realize real-time (quick) interference removal.

Figure 29:
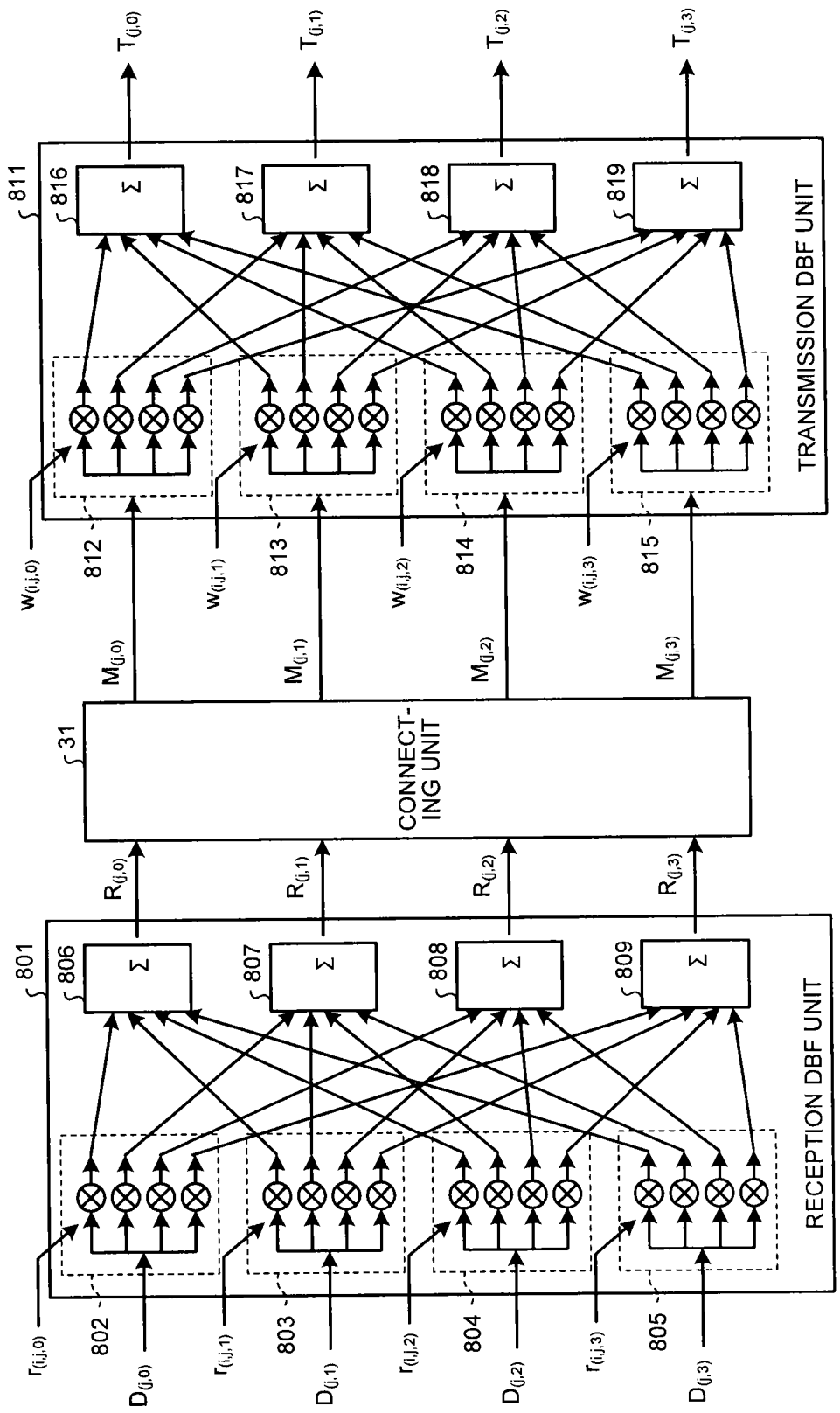
FIG. 29 is a diagram illustrating a configuration example of a relay apparatus having a reception DBF function and a transmission DBF function.

FIG. 29 is a diagram illustrating a configuration example of a relay apparatus having the reception DBF function and the transmission DBF function. In FIG. 29, an example during four-beam input and four-beam output is illustrated. Illustration of components other than the reception DBF function, the connecting unit 31, and the transmission DBF function is omitted. The components other than the reception DBF function, the connecting unit 31, and the transmission DBF function are the same as the components in the first embodiment.

A reception DBF unit 801 performs the processing of the above Expression (35). Note that, in FIG. 29, in order to reduce the number of signal lines to be connected, 0-th to J−1-th sub-channel data after demultiplexing are time-division-multiplexed. Consequently, the number of input signals $D_{(j,k)}$ is one for each beam. Similarly, the number of output signals $R_{(j,k)}$ is also one for each beam. Note that the sub-channel data after the demultiplexing do not have to be time-division-multiplexed. Even when the sub-channel data after the demultiplexing are time-division-multiplexed, sets of sub-channels to be multiplexed in the time division multiplexing are not limited to the example illustrated in FIG. 29.

Coefficient multiplying units for reception DBF 802, 803, 804, and 805 perform complex-multiplications on the beam signals $D_{(j,k)}$ with the reception DBF coefficients $r_{(i,j,k)}$ in units of the input beam numbers k∈{0, 1, 2, 3}. Adding units for reception DBF 806, 807, 808, and 809 perform vector addition of all sub-channel signals multiplied by the reception DBF coefficients in units of the output beam numbers i∈{0, 1, 2, 3}.

The sub-channel signals of the beams, from which the interference components are removed by this series of reception DBF processing, are allocated to the multiplexing units on the transmission side by the connecting unit 31 that performs an operation the same as the operation described in the first embodiment.

On the transmission side, the same as on the reception side, it is possible to reduce, with transmission DBF processing, same-frequency interference in the ground receiving station that occurs when downlink beam areas (e.g., the beam areas 400 and 402) are brought close to each other. That is, during the transmission DBF processing, the relay satellite mixes signals from adjacent beams in a main signal and transmits the signals in advance to cancel out same-frequency interference signals from the adjacent beams.

Figure 30:
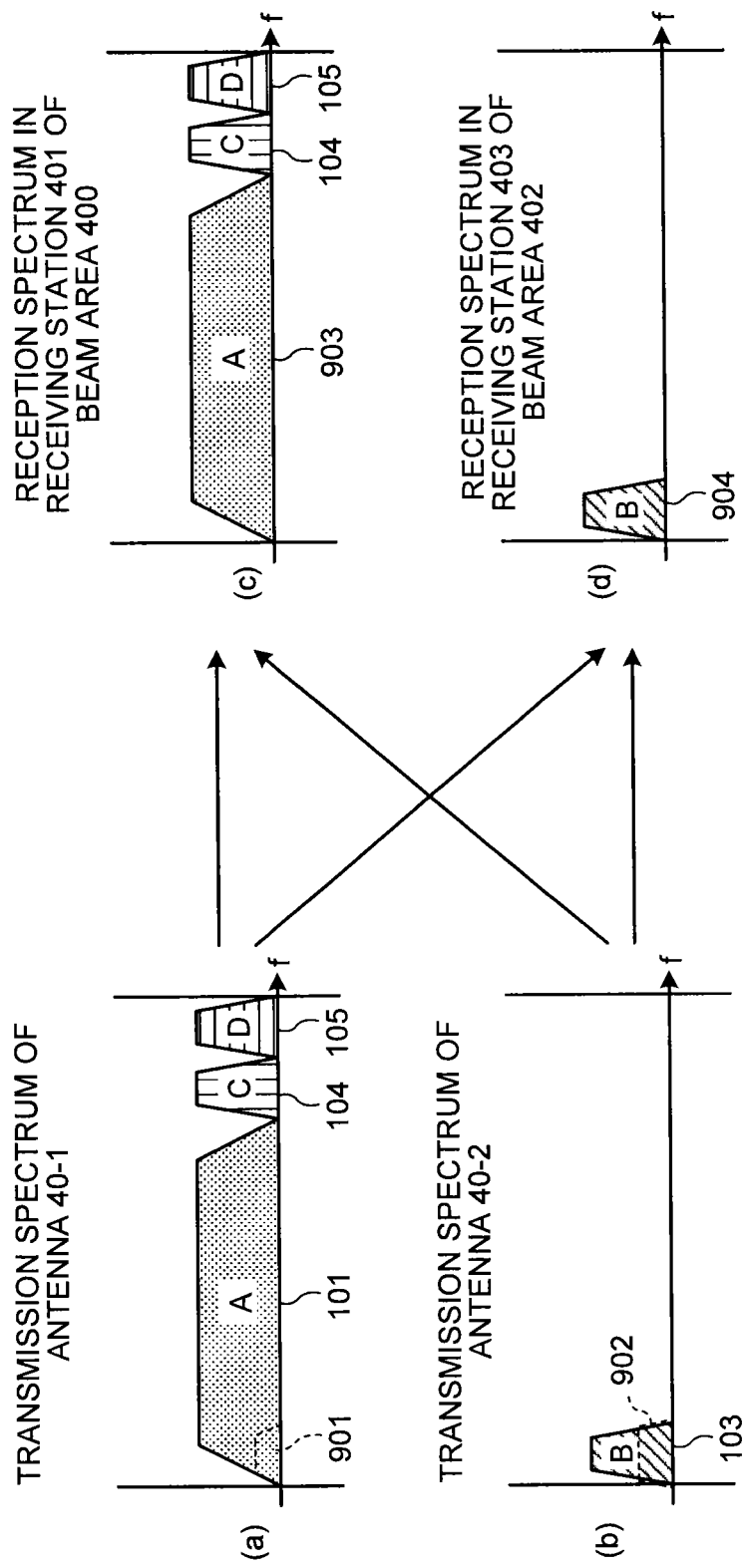
FIG. 30 is a diagram illustrating a transmission DBF processing example and an effect.

FIG. 30 is a diagram illustrating a transmission DBF processing example and effects. As illustrated in FIG. 30(a), for a transmission spectrum of the transmission antenna 40-1 illustrated in FIG. 3, a transmission DBF unit 811 adds a signal 901 for interference removal in which the signal B is used to a frequency interference portion of a spectrum of a signal A. Note that, when interference removal of the wideband signal A is performed, a reception DBF coefficient calculated not to disorder the frequency-to-amplitude characteristic and the frequency-to-phase characteristic of the wideband signal A after cancellation of the signal B is set.

As illustrated in FIG. 30(b), for a transmission spectrum of the transmission antenna 40-2 illustrated in FIG. 3, the transmission DBF unit 811 adds a signal for interference removal 902, in which a partial band of the signal A is used, to a spectrum of the signal B.

Consequently, as illustrated in FIG. 30(c), in the receiving station 401, the signal B from the antenna 40-2 is cancelled by the signal 901 from the antenna 40-1, and the wideband signal A, which is substantially the same as the original signal, can be received. Similarly, as illustrated in FIG. 30(d), in the receiving station 403, the signal A from the antenna 40-1 is cancelled by the signal 902 from the antenna 40-2. The narrowband signal B, which is substantially the same as the original signal, can be received.

Given that beam numbers input to the transmission DBF 811 are represented as k(∈{0, 1, 2, . . . , K−1}), numbers of sub-channel signals are represented as j(∈{0, 1, 2, . . . , J−1}), beam numbers at output destinations are represented as i{∈{0, 1, 2, . . . , I−1}}, baseband input signals are represented as $M_{(j,k)}$, and reception complex DBF coefficients are represented as $w_{(i,j,k)}$; then, baseband signals $T_{(i,j)}$ after the reception DBF processing are expressed by the following Expression (38):

$$T_{(i,j)} = \sum_{k=0}^{K-1} (M_{(j,k)} \times w_{(i,j,k)}) \quad (38)$$

In FIG. 29, a configuration example of the transmission DBF unit 811 with four inputs and four outputs is also illustrated. The transmission DBF unit 811 performs the processing of the above Expression (38). Note that, in order to reduce the number of signal lines to be connected, 0-th to J−1-th sub-channel data are time-division-multiplexed so that the data can be input from the connecting units 31 at the pre-stage. Consequently, the number of input signals (baseband input signals) $M_{(j,k)}$ is one for each beam. Similarly, the number of output signals $T_{(j,k)}$ is also one for each beam.

Coefficient multiplying units for transmission DBF 812, 813, 814, and 815 perform complex multiplications on the input signals $M_{(j,k)}$ with the transmission DBF coefficients $w_{(i,j,k)}$ in units of the input beam numbers k∈{0, 1, 2, 3}. The adding units for transmission DBF 816, 817, 818, and 819 perform vector addition of all sub-channel signals multiplied with the transmission DBF coefficients in units of the output beam numbers i∈{0, 1, 2, 3}.

Another system can be adopted in which, like the coefficients $r_{(i,j,k)}$ of the reception DBF, the coefficients $w_{(i,j,k)}$ of the transmission DBF are calculated by the control station 110 on the ground, which obtains the positions of ground stations and the position of the relay satellite so as to transmit to the relay satellite 200 through a separate line. Alternatively, another system can be adopted in which the coefficients $w_{(i,j,k)}$ of the transmission DBF are calculated by the ground stations and a calculation result is transmitted to the relay satellite 200 through a separate line.

Note that, in the example described above, both of the reception DBF and the transmission DBF are performed. However, any one of the reception DBF and the transmission DBF can be performed. In the example described in the embodiment, the interference components from an adjacent one beam area are removed. However, it can be configured that interference components from two or more beam areas can be removed.

As described above, in the embodiment, interference from contiguous beam areas is removed by the reception DBF processing and the transmission DBF processing. Therefore, in addition to the effect of relaying a wideband signal, it is also possible to realize high antenna directivity that prevents signals having the same frequency from interfering with each other even if beam areas are brought close to each other. Consequently, the rate of repeated use of the same frequency is improved. It is possible to realize a further increase in capacity of the satellite system in conjunction with the effect of relaying a wideband signal.

Note that, in the embodiment, the application example to the relay satellite is described. However, it is possible to realize an increase in a band of a radio device and high antenna directivity by applying the relay apparatus in the embodiment to a radio relay device, a radio base station, or a radio terminal including a plurality of directional antennas on the ground in the same manner.

Sixth Embodiment

A relay apparatus in a sixth embodiment is described here. In the example described in the fourth embodiment, in order to correct the phase offset $\theta_C$, a path length difference between ports, and a fixed time difference caused by a delay characteristic and the like; the correction is carried out after an input and an output of a relay signal to and from a relevant port have been temporarily stopped and then been set to a standby state.

In the embodiment, although the correction is limited to inter-port adjustment on the reception side, the phase offset $\theta_C$ and a fixed time difference are corrected using CWs without putting the ports on standby and while keeping the relay signal to input and output. Consequently, labor and time for switching the ports to the standby state are saved. Therefore, system operation is facilitated.

Note that the embodiment is effective in the inter-port adjustment on the reception side. Therefore, the embodiment can be applied, for example, when a wideband signal is demodulated on a relay satellite or when a wideband signal is demodulated at a ground station.

Figure 31:
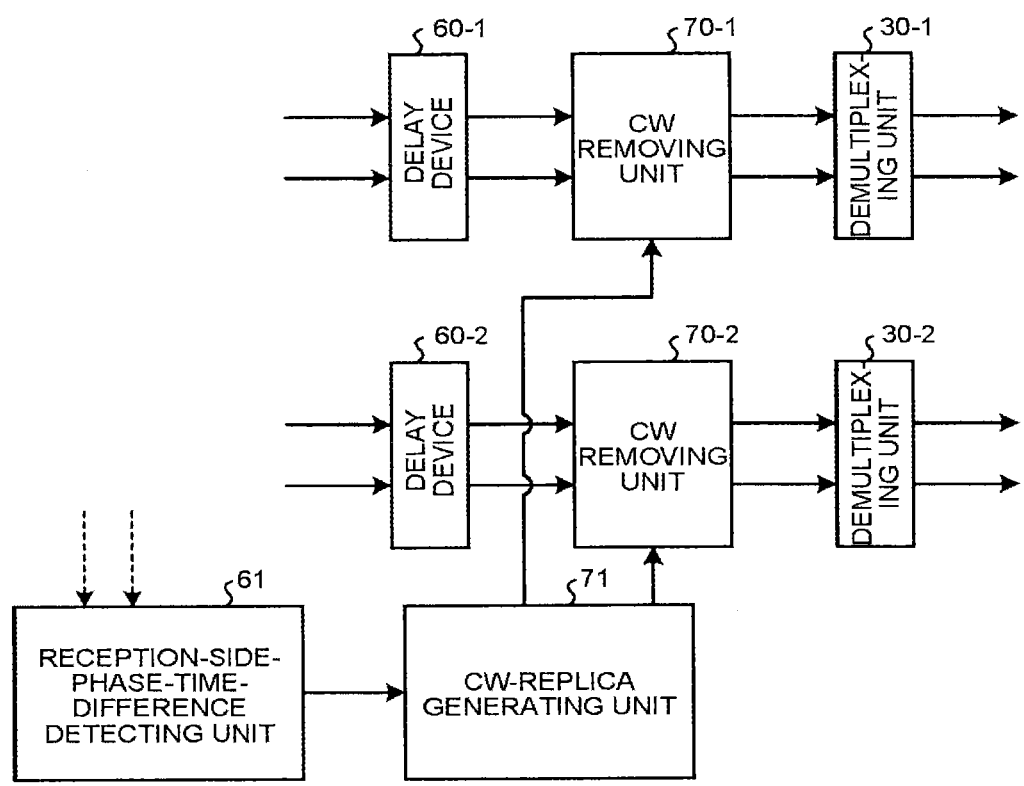
FIG. 31 is a diagram illustrating a configuration example of a relay apparatus in a sixth embodiment.

FIG. 31 is a diagram illustrating a configuration example of the relay apparatus in the embodiment. The basic configuration of the relay apparatus in the embodiment is similar to the configuration illustrated in FIG. 19. Here, a CW-replica generating unit 71 and CW removing units 70-1 and 70-2 are added to the configuration example illustrated in FIG. 19. Note that, in FIG. 31, components related to added portions are illustrated. The other components are not illustrated.

As in the fourth embodiment, the non-modulated-signal generating unit 62-2 generates a non-modulated signal. The reception ports 15-1 and 15-2 are not switched to the standby state and are kept in a state in which a relay signal is input and output. A non-modulated signal generated by the non-modulated-signal generating unit 62-2 is up-converted by 36-2 and input to the reception ports 15-1 and 15-2 via the adder 63. As in the fourth embodiment, the reception-side-phase-time-difference detecting unit 61 detects a phase difference and a time difference between non-modulated signals (CW waves) input to the two reception ports. Specifically, given that a non-modulated signal input to the input to the reception port 15-1 and input to the reception-side-phase-time-difference detecting unit 61 from the RPC 29-1 is represented as a first non-modulated signal; and a non-modulated signal input to the reception port 15-2 and input to the reception-side-phase-time-difference detecting unit 61 from the RPC 29-2 is represented as a second non-modulated signal; then, the reception-side-phase-time-difference detecting unit 61 detects a phase difference ($\theta_C$) and a time difference between the reception ports 15-1 and 15-2 on the basis of the first non-modulated signal and the second non-modulated signal. Further, the reception-side-phase-time-difference detecting unit 61 calculates a delay correction value $\Delta\tau_{21}$ on the basis of the detected time difference. Note that, actually, reception signals are also included in signals input to the reception-side-phase-time-difference detecting unit 61. However, as in the fourth embodiment, the phase difference and the time difference are detected using characteristics (rising edges, etc.) of components of the first non-modulated signal and the second non-modulated signal. Electric power (electric power information) of two CWs is also detected in the detection processes. The CW-replica generating unit (a replica generating unit) 71 generates CW replicas having a phase 180 degrees different from the phase of CW waves mixed in the reception signals and having electric power equal to the electric power of the CW waves. The CW-replica generating unit (a replica generating unit) 71 generates CW replicas on the basis of the phase difference, the power information, and the delay correction value $\Delta\tau_{21}$ detected by the reception-side-phase-time-difference detecting unit 61.

The generated CW replicas are input to the CW removing units (non-modulated-signal removing units) 70-1 and 70-2 and vector-added to reception baseband signals, in which CW waves are mixed and output from the delay devices 60-1 and 60-2. In this process, the CW-replica generating unit 71 also performs timing adjustment for the CW replicas using time delay corrected by the delay devices using the delay correction value $\Delta\tau_{21}$ such that timings of CWs for correction mixed in the signals and the CW replicas are aligned.

Note that, the example described here is one in which a phase difference and the like are calculated between the reception ports 15-1 and 15-2 into which the signal that is input is divided into two signals. However, when a phase difference and the like between reception ports in which an input signal is not divided are calculated, as on the transmission side in the fourth embodiment, the two non-modulated-signal generating units 62-1 and 62-2 can be used.

According to this series of processing, the CW waves for correction are cancelled by the CW replicas. Only reception signals necessary for original signal relay are input to the demultiplexing units. Therefore, it is possible to correct a phase difference (the phase offset $\theta_C$) and a fixed time difference using CWs while keeping the relay signal input and output.

Note that the reception-side-phase-time-difference detecting unit 61 needs to detect the CWs in a state in which the original relay signal is mixed. Therefore, it is likely that the relay signal becomes an interference component and causes an increase in detection errors. Therefore, when there is a concern about an increase in errors, it is also possible that a narrowband digital filter that extracts only CW components is provided at a pre-stage, relay signal components are removed, and then the signal processing for calculating a time difference and a phase difference described in the fourth embodiment is carried out.

INDUSTRIAL APPLICABILITY

As described above, the relay apparatus, the relay satellite, and the satellite communication system according to the present invention are useful for a relay system that relays a wideband signal and, in particular, are suitable for a satellite relay system.

REFERENCE SIGNS LIST

10 Uplink/downlink-frequency converting unit
21-1 to 21-N Reception antennas
22 Reception analog switch matrix
12-1 to 12-N, 14-1 to 14-N, 23-1 to 23-N, 27-1 to 27-N, 38-1 to 38-N, 508, 531, 537 Band-pass filters
13-1 to 13-N, 36-1 to 36-N, 507, 530, 536 Mixers
25 Local generating unit
26 Original oscillator
28-1 to 28-N, 509, 532, 538 AD converters
29-1 to 29-N Reception-phase correcting units
30-1 to 30-N Demultiplexing units
31 Connecting unit
32-1 to 32-N Multiplexing units
33-1 to 33-N Transmission-phase correcting units
34-1 to 34-N DA converters
35-1 to 35-N, 512, 534, 540, 549, 550, 551, 602, 612 Low-pass filters
37 Transmission analog switch matrix
40-1 to 40-N Transmission antennas
41, 41a, 41b Local-phase-difference calculating units
60-1, 60-2, 65-1, 65-2 Delay devices 61 Reception-side-phase-time-difference detecting unit
62-1, 62-2 Non-modulated-signal generating units (CW generating units)
63, 542, 543, 544, 545 Adders
64 Transmission-side-phase-time-difference detecting unit
100 Wideband beam area
102 Narrowband beam area
101, 103, 104, 105 Transmitting stations
110 Control station
200 Relay satellite
201 Receiving unit
202 Transmitting unit
400, 402 Beam areas
401, 403 Receiving stations
510, 533, 539, 546, 547, 548 Quadrature detection units
511 Local generating unit
513, 535, 541, 552, 553, 554 Limiters
514, 515, 516, 505, 506 Selectors
517 Clock generator
504-1 to 504-N Frequency synthesizers
601, 611 Complex multiplication units
603, 613 Polar-coordinate converting units
604, 614 Power converting units
605, 615 Rising-edge-difference detecting unit
616 Free-running-complex-non-modulated-signal generating unit
720 to 723 Complex multipliers
724, 725 Adders
802 to 805 Coefficient multiplying units for reception DBF
806 to 809 Adding units for reception DBF
811 Transmission DBF unit
812 to 815 Coefficient multiplying units for transmission DBF
816 to 819 Adding units for transmission DBF

The invention claimed is:

1. A relay apparatus comprising:
a local generating unit that generates a plurality of local signals having different frequencies;
a local phase calculating unit that detects, for two local signals having frequencies that are adjacent to each other among the local signals, with reference to one local signal of the two local signals, a phase of the other local signal and extracts a phase difference between the two local signals;
a first reception processing unit that receives an input of a reception signal and applies, to the input reception signal, processing including frequency conversion in which the reference local signal is used;
a second reception processing unit that receives the input of the reception signal and applies, to the input reception signal, processing including frequency conversion in which the phase-detected local signal is used and phase correction based on the phase difference; and
a multiplexing unit that multiplexes a signal processed by the first reception processing unit and a signal processed by the second reception processing unit.

2. The relay apparatus according to claim 1, wherein the relay apparatus
sets, as a first local signal and a second local signal, two local signals having frequencies not adjacent to each other among the local signals,
sets, as a third local signal, a local signal that is one of the local signals and a frequency which is not adjacent to the frequency of the first local signal, and
calculates a phase difference between the third local signal and the first local signal by using a phase difference between the first local signal and the second local signal.

3. The relay apparatus according to claim 1, further comprising:
a plurality of reception antennas; and
a switch unit that
inputs reception signals received by the reception antennas to one or more of the first reception processing unit and the second reception processing unit and,
when a wideband reception signal having a band wider than a bandwidth processable by the first reception processing unit and the second reception processing unit is input, inputs the wideband reception signal to the first reception processing unit and the second reception processing unit, wherein
the first reception processing unit and the second reception processing unit, when the wideband reception signal is input therein, extract a part of the wideband reception signal on the basis of the local signal and perform the processing on an extracted signal.

4. A relay satellite comprising the relay apparatus according to claim 1.

5. A satellite communication system comprising:
the relay satellite according to claim 4; and
a receiving station that receives a signal relayed by the relay satellite.

6. A relay apparatus comprising:
a local generating unit that generates a plurality of local signals having different frequencies;
a local phase calculating unit that detects, for two local signals having frequencies adjacent to each other among the local signals, with reference to one local signal of the two local signals as a reference local signal, a phase of the other local signal and extracts a phase difference between the two local signals;
a first reception processing unit that receives an input of a reception signal and performs, on the input reception signal, processing including frequency conversion in which the reference local signal is used;
a second reception processing unit that receives the input of the reception signal and performs, on the input reception signal, processing including frequency conversion in which the phase-detected local signal is used and phase correction based on the phase difference;
a first transmission processing unit that performs, on an input signal, transmission processing including the frequency conversion in which the reference local signal is used; and
a second transmission processing unit that performs, on the input signal, transmission processing including the frequency conversion in which the phase-detected local signal is used and the phase correction based on the phase difference.

7. The relay apparatus according to claim 6, wherein the relay apparatus
sets, as a first local signal and a second local signal, two local signals having frequencies not adjacent to each other among the local signals,
sets, as a third local signal, a local signal that is one of the local signals and a frequency which is not adjacent to the frequency of the first local signal, and calculates a phase difference between the third local signal and the first local signal by using a phase difference between the first local signal and the second local signal.

8. The relay apparatus according to claim 6, further comprising:
   a non-modulated-signal generating unit that generates a non-modulated signal; and
   a reception-side-phase-difference detecting unit that calculates a quasi-fixed phase difference between the first reception processing unit and the second reception processing unit on the basis of the non-modulated signal that passed through the first or second transmission processing units, the first reception processing unit, and the second reception processing unit, wherein
   the second reception processing unit carries out phase correction on the basis of the phase difference calculated by the reception-side-phase-difference detecting unit.

9. The relay apparatus according to claim 8, wherein
   the reception-side-phase-difference detecting unit further calculates a time difference between the first reception processing unit and the second reception processing unit on the basis of the non-modulated signal that passed through the first or second transmission processing units, the first reception processing unit, and the second reception processing unit, and
   the second reception processing unit further corrects a time delay on the basis of the time difference.

10. The relay apparatus according to claim 6, further comprising:
    a non-modulated-signal generating unit that generates a non-modulated signal; and
    a transmission-side-phase-difference detecting unit that calculates a quasi-fixed phase difference between the first transmission processing unit and the second transmission processing unit on the basis of the non-modulated signal that passed through the first transmission processing unit, the second transmission processing unit, and the first reception processing or the second reception processing units, wherein
    the second transmission processing unit carries out phase correction on the basis of the phase difference calculated by the transmission-side-phase-difference detecting unit.

11. The relay apparatus according to claim 10, wherein
    the transmission-side-phase-difference detecting unit further calculates a time difference between the first transmission processing unit and the second transmission processing unit on the basis of the non-modulated signal that passed through the first transmission processing unit, the second transmission processing unit, and the first reception processing or the second reception processing units, and
    the second transmission processing unit corrects a time delay on the basis of the time difference.

12. The relay apparatus according to claim 6, further comprising:
    a plurality of reception antennas;
    a plurality of transmission antennas;
    a first switch unit that
        inputs reception signals received by the reception antennas to one or more of the first reception processing unit and the second reception processing unit and,
        when a wideband reception signal having a band wider than a bandwidth processable by the first reception processing unit and the second reception processing unit is input, inputs the wideband reception signal to the first reception processing unit and the second reception processing unit;
    a second switch unit that outputs, to the transmission antennas, the wideband reception signal subjected to the transmission processing by the first transmission processing unit and the second transmission processing unit;
    a first demultiplexing unit that demultiplexes a signal processed by the first reception processing unit;
    a second demultiplexing unit that demultiplexes a signal processed by the second reception processing unit;
    a plurality of transmission processing units including the first transmission processing unit and the second transmission processing unit; and
    a connecting unit that inputs signals demultiplexed by the first demultiplexing unit and signals demultiplexed by the second demultiplexing unit to one or more of the transmission processing units, wherein
    the first reception processing unit and the second reception processing unit, when the wideband reception signal is input, extract a part of a band of the wideband reception signal on the basis of the local signal and perform the processing on an extracted signal.

13. The relay apparatus according to claim 10, wherein
    the non-modulated signal generating unit includes:
        a first non-modulated-signal generating unit that generates a first non-modulated signal; and
        a second non-modulated-signal generating unit that generates a second non-modulated signal, and
    the transmission-side-phase-difference detecting unit calculates a quasi-fixed phase difference between the transmission processing units on the basis of a signal obtained by adding together a signal that passed through the transmission processing unit to which the first non-modulated signal is input and a signal that passed through the transmission processing unit to which the second non-modulated signal is input.

14. The relay apparatus according to claim 12, wherein
    the reception antennas form reception beams by beam forming,
    the transmission antennas form transmission beams by beam forming,
    the reception signals are reception signals that are received corresponding to the same reception beam as is formed by the beam forming,
    the relay apparatus comprises a plurality of reception processing units including the first reception processing unit and the second reception processing unit,
    the relay apparatus further comprises a reception-digital-beam forming unit that multiplies signals output from two more reception processing units among the reception processing units, respectively, with coefficients and adds together two or more signals among the signals after the coefficient multiplication,
    the connecting unit outputs the signals after processing by the reception-digital-beam forming unit to the transmission processing units, and
    the coefficients are set to cancel out signals from beam areas other than a beam area in which a main signal is received.

15. The relay apparatus according to claim 12, wherein
    the reception antennas form reception beams by beam forming,
    the transmission antennas form transmission beams by beam forming, the reception signals are reception signals that are received corresponding to the same reception beam as is formed by the beam forming, the relay apparatus comprises a plurality of reception processing units including the first reception processing unit and the second reception processing unit, the relay apparatus further comprises a transmission-digital-beam forming unit that multiplies signals output to two or more transmission processing units among the transmission processing units, respectively, with coefficients and adds together two or more signals among the signals after the coefficient multiplication, the connecting unit outputs an input signal to the transmission processing units via the transmission-digital-beam forming unit, and the coefficients are set such that transmission signals of beams other than a beam corresponding to a main signal are cancelled out in a receiving station.

16. The relay apparatus according to claim 8, wherein
the reception-side-phase-difference detecting unit calculates, on the basis of a first non-modulated signal that is the non-modulated signal that passed through the first reception processing unit and a second non-modulated signal that is the non-modulated signal that passed through the second reception processing unit, electric powers of the first non-modulated signal and the second non-modulated signal and a phase difference and a time difference between the first reception processing unit and the second reception processing unit, and the relay apparatus comprises:
a replica generating unit that generates, on the basis of the phase difference, the electric powers, and the time difference,
  a first replica signal having electric power equal to the electric power of the first non-modulated signal and having a phase 180 degrees different from a phase of the first non-modulated signal and
  a second replica signal having electric power equal to the electric power of the second non-modulated signal and having a phase 180 degrees different from a phase of the second non-modulated signal;
a first non-modulated-signal removing unit that removes, on the basis of a reception signal input to the first reception processing unit and the first replica signal, the first non-modulated signal from the reception signal; and
a second non-modulated-signal removing unit that removes, on the basis of a reception signal input to the second reception processing unit and the second replica signal, the second non-modulated signal from the reception signal.

17. A relay satellite comprising the relay apparatus according to claim 6.

18. A satellite communication system comprising:
the relay satellite according to claim 17; and
a receiving station that receives a signal relayed by the relay satellite.

* * * * *